United States Patent [19]

Garrett et al.

[11] Patent Number: 4,749,402

[45] Date of Patent: Jun. 7, 1988

[54] METHOD AND COMPOSITION FOR ENHANCEMENT OF MYCORRHIZAL DEVELOPMENT BY FOLIAR FERTILIZATION OF PLANTS

[75] Inventors: Harold E. Garrett; Gene S. Cox, both of Columbia; Robert K. Dixon, St. Paul, all of Mo.

[73] Assignee: The Curators of the University of Missouri, Columbia, Mo.

[21] Appl. No.: 581,871

[22] Filed: Feb. 21, 1984

Related U.S. Application Data

[63] Continuation-in-part of Ser. No. 388,137, Jun. 14, 1982, abandoned, which is a continuation of Ser. No. 160,976, Jun. 19, 1980, abandoned.

[51] Int. Cl.$^4$ .................. C05C 9/00; C05C 11/00; C05C 13/00
[52] U.S. Cl. .................. 71/28; 71/24; 71/30; 71/64.1; 71/33; 71/59; 71/60
[58] Field of Search .................. 71/28, 29–30, 71/27, 31, 33, 59, 60, 64.1; 47/57.6, 58

[56] References Cited

U.S. PATENT DOCUMENTS

| | | | |
|---|---|---|---|
| 3,087,806 | 4/1963 | Martin | 71/29 |
| 3,640,698 | 2/1972 | Backlund | 71/29 |
| 4,025,330 | 5/1977 | Storey | 71/30 |
| 4,033,746 | 7/1977 | Young | 71/30 |
| 4,033,747 | 7/1977 | Young | 71/30 |
| 4,038,064 | 7/1977 | Clapp et al. | 71/29 |
| 4,146,383 | 3/1979 | Hanway et al. | 71/29 |
| 4,191,550 | 3/1980 | Hawkins et al. | 71/30 |
| 4,283,423 | 8/1981 | Watkins et al. | 71/28 X |
| 4,294,037 | 10/1981 | Mosse et al. | 47/59 |

OTHER PUBLICATIONS

Liquid Fertilizer Manual, 1967, National Fertilizer Solutions Association.

Primary Examiner—Ferris H. Lander
Attorney, Agent, or Firm—Senniger, Powers, Leavitt and Roedel

[57] ABSTRACT

A method for enhancing the development of mycorrhizae in the root system of a plant. A quantity of a nutrient mixture is applied to the outside surfaces of the foliage of a plant rooted in a growth medium containing propagules of a fungus capable of mycorrhizal infection of the roots, the nutrient mixture containing a source of nitrogen and a source of at least one other element selected from among potassium, phosphorus, zinc, magnesium, boron, manganese, molybdenum, copper, and iron, in an aqueous vehicle. Such application is repeated at intervals over a period of time during which the supply of nutrients by fertilization is provided predominantly through such foliar application. The sugar content of the roots is thus increased by comparison to that obtained by application of the nutrient mixture to the growth medium during the aforesaid period in quantities sufficient to provide a fertilization nutrient supply at the surface of the roots equivalent to the supply effected by such repetitive applications to the foliage. The development of the mycorrhizae in the root system is thereby enhanced.

The disclosure is further directed to novel compositions useful in foliar fertilization of plants and methods for the application of nutrient systems containing plant growth regulators to plant foliage.

3 Claims, 13 Drawing Sheets

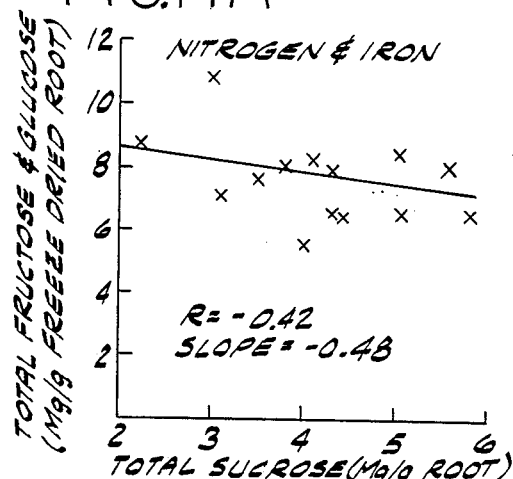
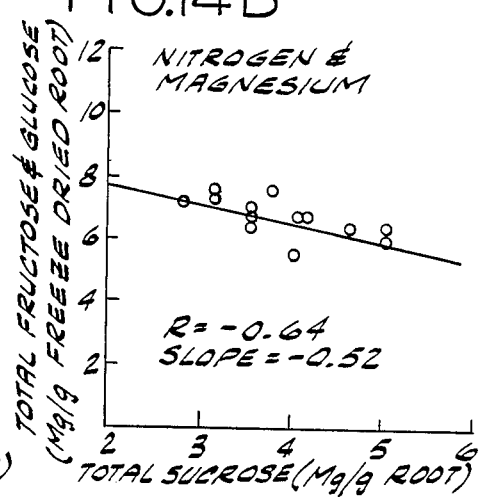
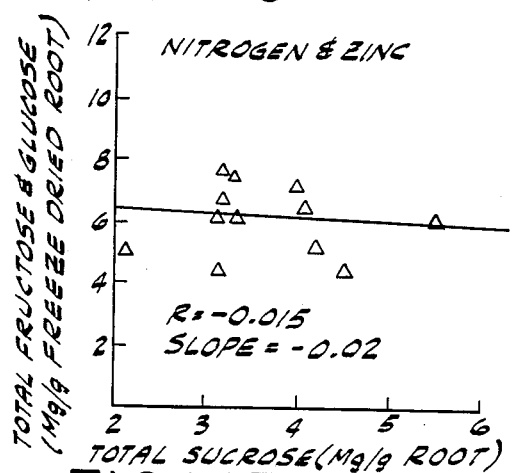
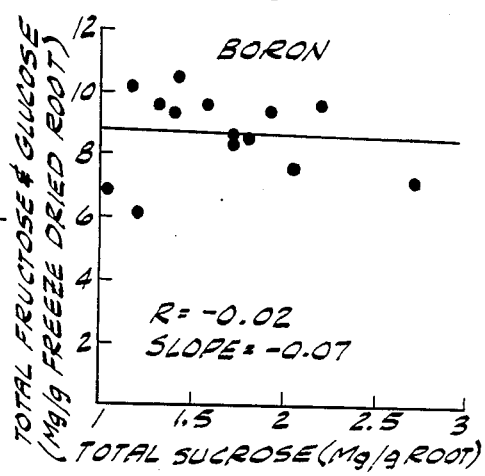
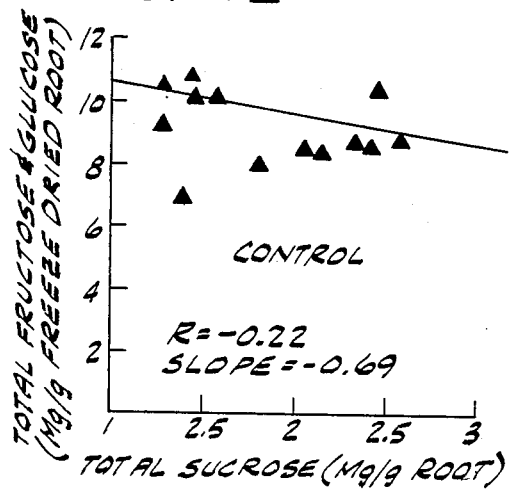

METHOD AND COMPOSITION FOR ENHANCEMENT OF MYCORRHIZAL DEVELOPMENT BY FOLIAR FERTILIZATION OF PLANTS

This application is a continuation-in-part of application Ser. No. 388,137, filed June 14, 1985, abandoned Mar. 1, 1985, which was a continuation of application Ser. No. 160,976, filed June 19, 1980, abandoned June 17, 1982.

BACKGROUND OF THE INVENTION

This invention relates to the field of plant husbandry and more particularly to an improved method and composition for promoting plant growth and health by enhancement of mycorrhizal infection of the plant root system. The invention also relates to the enhancement of plant development by foliar application of plant growth regulator solutions.

In order to promote plant growth in soil of low to moderate fertility, a variety of nutrients are added by fertilization, most prominently nitrogen, potassium and phosphorus. Fertilizers are also used to add various trace elements that may be important to plant development including zinc, iron, magnesium, boron, manganese, molybdenum and copper. Although nutrients are normally supplied to plants through fertilization of the soil or other growth medium, alternative techniques are known wherein nutrients are foliarly applied, i.e., to the leaves or needles of a plant. Whatever the route employed, supply of nutrients entirely by artificial fertilization is expensive, increasingly so in view of the rapid increases in the prices of the raw materials from which fertilizers are derived.

Mycorrhizae are symbiotic associations in which a plant's secondary root system is invaded by a specific fungi during periods of active root growth. Hyphae of the fungus penetrate the roots and effectively increase the root absorptive area, which leads to increased water uptake along with increased selective absorption and accumulation of nutrients from the soil. Mycorrhizal association is so prevalent in nature that nonmycorrhizal plants represent an exception rather than the rule. Only a relatively small number of plant genera are known to develop normally in the absence of mycorrhizal involvement while others appear to be obligately dependent upon this interaction for their orderly growth and development. In the case of plant seedlings such as, for example, tree seedlings produced in artificial growth media, inoculation of the medium with mycorrhizal fungi has been known in the art for the purpose of promoting mycorrhizal infection and development of a mycorrhizal root system. The availability of inorganic ions, particularly those containing nitrogen and phosphorus, is also known to have a critical effect on mycorrhizal formation. To a lesser degree potassium is also important for this purpose.

Excess soil fertility is known to have an adverse effect on mycorrhizal development. In fact, if fertility is too great, mycorrhizal development may be eliminated. Other recognized disadvantages of excessive soil fertilization are high cost and environmental degradation.

There is thus a need in the art for methods which will provide adequate supplies of nutrients to plants without the various disadvantageous effects of high levels of soil fertilization. In the case of containerized seedlings, there is a particular need for a method which will establish mycorrhizal root systems which are important for successful outplanting.

Various studies have been made on the effect of the treatment of plants with plant growth regulators. Certain of these studies have related to the application of growth regulators both to intact plants and to freshly cut surfaces of pruned plants. Others have dealt, for example, with the application of synthetic auxins such as the potassium salt of 3-indolebutyric acid to plants by various methods, the most effective of which have been reported to be root soaking, gel dipping, and insertion of auxin-impregnated toothpicks crosswise into the root.

SUMMARY OF THE INVENTION

Among the several objects of the present invention, therefore, may be noted the provision of improved methods of fertilization to enhance the root development of plants; the provision of such methods which enhance mycorrhizal development in the root system; the provision of such methods which ultimately contribute to increased plant size, weight and health; the provision of such methods which contribute to the growth of containerized seedlings which are well adapted for outplanting; the provision of such methods which afford a high rate of nutrient supply to the plant without adverse effect on mycorrhizae; the provision of such methods which afford a high rate of nutrient supply to the plant without environmental degradation; the provision of such methods which afford a high rate of nutrient supply without excessive cost; and the provision of compositions which are advantageously adapted for use in such methods.

Further objects of the invention include the provision of methods for enhancing plant development with plant growth regulators; the provision of such methods which provide significant increases in seedling root collar diameter, total dry weight, and shoot length in plants treated with the plant growth regulators; and the provision of combined methods of nutrient supply and plant growth regulator treatment which afford enhanced plant development.

Briefly, therefore, the present invention is directed to a method for enhancing development of mycorrhizae in the root system of a plant. In this method, a quantity of a nutrient mixture is applied to the outside surfaces of the foliage of a plant rooted in a growth medium containing a propagule of a fungus capable of mycorrhizal infection of the roots. The nutrient mixture contains a source of nitrogen and a source of at least one other element selected from the group consisting of potassium, phosphorus, zinc, magnesium, boron, manganese, molybdenum, copper and iron in an aqueous vehicle. Such application is repeated at intervals over a period of time during which the supply of nutrients by fertilization is provided predominantly through such foliar application. Thus, the glucose, fructose and sucrose contents of the roots of the plant are increased by comparison to those obtained by application of the same nutrient mixture to the growth medium during such period in quantities sufficient to provide a fertilization nutrient supply at the surface of the roots equivalent to the supply provided by such repetitive application to the foliage. Development of mycorrhizae in the root system is thereby enhanced.

The invention is further directed to a novel nutrient mixture adapted for foliar fertilization of a plant to enhance the development of mycorrhizae in the root system thereof. This composition comprises between about 0.2 and about 5 parts by weight of a zinc salt selected from the group consisting of zinc sulfate and zinc nitrate, between about 0.2 and about 5 parts by weight of a magnesium salt selected from the group consisting of magnesium sulfate and magnesium nitrate, between about 1 and about 7 parts by weight of ammonium nitrate, between about 1 and about 7 parts by weight of monobasic potassium phosphate and up to about 1000 parts by weight water.

The invention is further directed to nutrient composition adapted for foliar fertilization of a plant to enhance the development of mycorrhizae in the root system thereof. The composition has a pH of between about 5.5 and about 6.5, and comprises at least 0.01 parts by weight magnesium in the form of elemental magnesium, magnesium sulfate, or chelated magnesium ions, at least about 0.01 parts by weight boron in the form of borax, another alkali metal borate, or an alkali metal boride, between about 0.04 and about 1.75 parts by weight nitrogen in the form of urea, an ammonium sulfate, an ammonium phosphate or an ammonium nitrate, between about 0.01 and about 1.4 parts by weight phosphorus in the form of a potassium phosphate or an ammonium phosphate, between about 0.02 and about 2.8 parts by weight potassium in the form of a potassium phosphate or an ammonium phosphate, at least about 0.01 parts by weight sulfur in the form of an ammonium sulfate, potassium sulfate, or elemental sulfur, and up to about 1000 parts by weight water.

Also contemplated by the invention is an aqueous nutrient solution adapted for use in the foliar fertilization of plants. This aqueous nutrient solution has a pH of between about 5.5 and about 6.5 and comprises between about 0.1% and about 5.0% by weight nitrogen, between about 0.25% and about 10.0% by weight phosphorus, between about 0.1% and about 5.0% by weight potassium, between about 0.01% and about 1.8% by weight sulfur, and a micronutrient selected from the group consisting of boron, iron, and magnesium.

The invention is further directed to an aqueous composition adapted for application to a plant for promoting the development thereof. This composition comprises about 0.4% and 5.0% by weight nitrogen, between about 0.18% and about 10.0% by weight phosphorus, between about 0.18% and about 5.0% by weight potassiuam and between about 10 and about 150 ppm $^6$N-benzyladenine.

Further contemplated by the invention is a method for promoting the development of a plant seedling comprising applying to the foliage of the plant a source of nitrogen, a source of phosphorus, a source of potassium, $^6$N-benzyladenine, and water. The proportion of water should be sufficient to prevent damage to the foliage from any of the sources of nitrogen, phosphorus or sulfur. Increase in root collar diameter and root weight are promoted.

BRIEF DESCRIPTION OF THE DRAWINGS

FIG. 14 a-e comprise a series of cross-plots showing total sucrose content vs. total glucose plus fructose content of the roots of shortleaf pine seedlings subjected to control and various foliar fertilization treatments.

DESCRIPTION OF THE PREFERRED EMBODIMENTS

Figure 1:
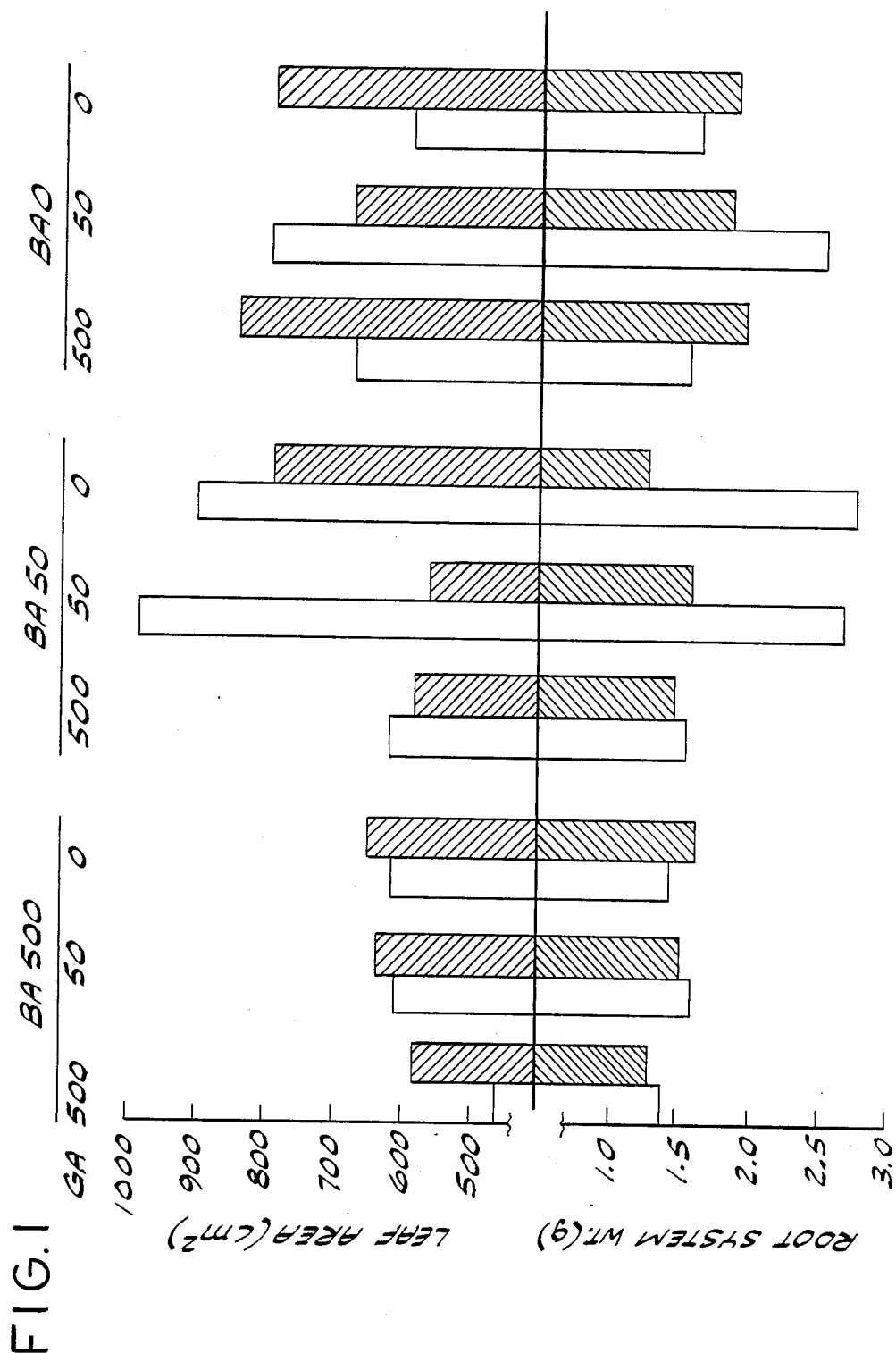
FIG. 1 is a bar graph illustrating the effect of various combinations of foliar fertilization and foliar application of plant growth regulators on the leaf area and total system weight of white oak seedlings.

In accordance with the present invention a method of plant fertilization has been discovered which dramatically enhances mycorrhizal development in the root system of plants. By foliar application of appropriate combinations of nutrients, the carbohydrate content of the plant's roots is sharply increased, promoting both mycorrhizal infection of the roots and rapid development of the mycorrhizae. This in turn results in a marked increase in both the uptake of water and the selective uptake of nutrients from the growth medium into the roots. Thus, the method is effective for promoting absorption of nutrients from soil of even low to moderate fertility. Development of roots and hyphae are progressively enhanced by the symbiotic association therebetween.

In carrying out the method of the invention a nutrient mixture is prepared which contains elements essential to increasing the carbohydrate content, particularly the glucose, fructose and sucrose contents, of the plant's roots and, thus, to infection of the roots by fungal hyphae and development of the mycorrhizal root systems that are thereby formed. Such compositions necessarily contain a source of nitrogen and should contain sources of one or more other elements which are important to plant cell formation or the generation of plant growth hormones. Thus, for example, the composition may typically include combinations of nitrogen, phosphorus and potassium. Combinations of nitrogen and magnesium or nitrogen and zinc are also advantageous. Other elements which may be used include boron, iron, manganese, molybdenum and copper. It has been found that particularly useful compositions contain nitrogen, phosphorus, potassium and sulfur, together with the micronutrients iron, magnesium, boron, or most advantageously, a combination of magnesium and boron. An aqueous medium is employed in which the source of each nutrient element is either dissolved or suspended.

A quantity of the nutrient mixture is applied to the foliage of a plant rooted in a growth medium containing hyphae and/or spores of a fungus capable of mycorrhizal infection of the roots. Either natural soil or an artificial growth medium may be used.

The nutrient mixture is preferably applied in the form of a fine spray, for example by means of a conventional pump spray. Application in such form provides essentially complete coverage of the plant leaves or needles with the nutrient mixture but avoids excessive overspray or runover that may otherwise result in the diversion of significant quantities of nutrient mixture to the growth medium. Preferably, the mixture is atomized to a mist whose constituent droplets have a size of between approximately 40 μm and approximately 200 μm and application of the mixture to the foliage is terminated before any substantial runoff of nutrient mixture from the foliage surface occurs.

Application of the nutrient mixture is repeated at intervals over a period of time during which the supply of nutrients by fertilization is predominantly provided through such foliar application. Absorption of nutrients through the foliage contributes to an increase in the sugar content of the roots by comparison to the content obtained during the same period by equivalent application of nutrient mixture to the growth medium in which the plant is rooted. By equivalent application is meant application in quantities sufficient to provide a fertilization nutrient supply at the surface of the roots equivalent to the supply effected by repetitive application to the foliage.

The optimum length of the intervals between foliar application of tne nutrient mixture depends on the nature of the plant, its age and stage of phenological development and the nature of the growth medium within which it is rooted. Typically, however, foliar application of nutrient mixture should be made approximately every three to four days. Preferably, the initial application of nutrient mixture should be made about three to four weeks after full leaf or needle development. Earlier application may cause necrosis of or damage to the immature foliage. Also, development of the leaves depletes the sugar content in the roots so that the conditions for fungal infection are not optimal until the leaves are fully developed. In order for application of nutrients to promote the infection of the root system by hyphae and the development of the mycorrhizae, the fungal propagule should be adjacent the root when the foliar fertilization schedule begins. To maximize growth and mycorrhizal development, the plant should be exposed to essentially full sunlight during the daylight hours.

During the period in which the plant is subjected to a schedule of a repetitive foliar application of nutrients, fertilization should be provided predominantly through such application. By limiting fertilization of the growth medium, the adverse effects of excessive soil fertilization on mycorrhizal development is avoided. Because of the relatively high efficiency of foliar absorption of nutrients, environmental degradation may be avoided and fertilization costs minimized by application of a fine spray in the manner described above. Where the soil within which the plant is rooted is of moderate fertility, it may be desirable to substantially avoid any addition of nutrients to the growth medium. Where an artificial growth medium is eaployed or soil is of low fertility, supplemental addition of nutrients to the growth medium may be desirable. In this instance, however, the quantity, and especially the nitrogen content, of the nutrients added to the medium should be low enough so as not to adversely affect mycorrhizal development. Minimizing nitrogen addition is especially important since excess nitrogen has a depressant effect on root carbohydrate content, apparently because of the energy required for reduction of nitrogen absorbed by the roots. Excess nitrogen may also inhibit generation of auxin by the fungus.

During the period in which the plant is subjected to foliar fertilization, the growth medium should be irrigated on a regular schedule between applications of the nutrient mixture. In each instance, irrigation should be carried out at a sufficient interval subsequent to the most recent application of nutrient mixture so that the nutrients supplied have been substantially absorbed by the foliage. Since absorption of nutrients by the foliage is normally complete within 24 hours following application, the optimum time for irrigation is typically between about 24 and about 48 hours subsequent to the most recent application of nutrient mixture.

Because of the importance of the development of a mycorrhizal root system to the success of outplanting, the cultivation of tree seedlings is an important application of the method of the invention. In such application and in the cultivation of other young plants and seedlings, it has been discovered that substantially improved mycorrhizal development can be achieved by the combination of foliar application of nutrients and inoculation of the growth medium with an inoculum containing the fungal spores or hyphae. Use of this combined method has a particularly dramatic and synergistic effect in an artificial growth medium but may also be highly advantageous in a natural soil where the fungal content is below that which we have discovered to be optimal for maximum mycorrhizal development.

Standard methods are known for the preparation of inocula containing the hyphae and/or spores of ectomycorrhizal or endomycorrhizal fungi. Among the suitable ectomycorrhizal fungi are those of the basidiomycetes which include, for example, *Pisolithus tinctorius, Thelephora terrestris, Paxillus involutus, Hebeloma crustuliniforme, H. pusillum, Luecopaxillus cerealis, Suillus americanus, S. pictus, S. luteus, S. lakei, S. granulatus, Corticum bicolor, Amanita pantherina, A. muxcaria, Boletus edulis, B. bicolor, Lactaria rufus, L. sanguifluus, Russala major, R. emetica, Tricholoma cortinatellum, T. sapanoceum, Cortinarius semisanguineus, Poria terrestris, Inocybe xanthomelas and Rhizopogen roseulus;* and the ascomycetes *Elaphomyces granulatas, Cenococcum geophilum, Tuber maleanosporum, Ceopora cooperi, Balsami nigrens, ano Tuber borchii.* Suitable endomycorrhizal fungi include the zygomycetes *Gisgaspora calospora, G. gigantea, G. margarita, G. rosea, Glomus caledonius, Gl. fasiculatum, Gl. mosseae, Gl. macrocarpum, Gl. etunicatum, Gl. epigaeum, Gl tenuis, Gl. constrictus, Gl. heterogama, Gl. pellucida, Endogone eucalypti, E. sphagrophila,* and *Sclerocystis rubiformis.* Generally, ectomycorrhizal and endomycorrhizal fungi are utilized in association with the roots of various tree species while endomycorrhizal fungi are adapted for infection of the roots of agronomic crops.

An inoculum of ectomycorrhizal hyphae is produced in a conventional manner by isolating the hyphae from a root system, culturing them in a nutrient broth grown on agar on a petri plate, and introducing the pure culture on agar into a peat-vermiculite medium that is enriched with a Melin-Norkrans solution. The hyphae are allowed to grow for 90 days to permeate the medium, and the peat-vermiculite so permeated with hyphae is the inoculum that is used in the method of the invention. To produce an endomycorrhizal inoculum, a hypae isolate is added to a sterile growth medium, the medium is seeded with a plant such as soybean and the plant is permitted to become infected with the organism over a span of approximately 60 days. The tops of the soybeans are clipped and the soil containing the root matter and propagules is ground to yield a mix that constitutes the inoculum. Spores may also be added.

Inoculation is carried out by mixing the inoculum with the growth medium in a zone adjacent the roots of the plant to be inoculated. The inoculum should be added in an amount sufficient that the medium contains between about 1% and about 15% by volume inoculum in the aforesaid zone.

A variety of aqueous nutrient mixtures containing nitrogen and other elements may be used in carrying out the method of the invention. Nitrogen is incorporated in the aqueous vehicle in the form of nitrate salts, ammonium salts or urea. Phosphorus is incorporated in the form of various phosphate salts. Potassium may be present as a phosphate, nitrate, sulfate, or other salt. Metals such as magnesium, zinc, iron, manganese, molybdenum and copper may be present as sulfate or nitrate salts or suspended in the aqueous vehicle in metallic, metallic oxide or phosphate form. Where utilized, boron is present as boric acid or a borate salt.

Remarkably improved mycorrhizal development is obtained with nutrient mixtures containing magnesium. A nitrogen/magnesium mixture may advantageously contain between about 500 ppm and about 3000 ppm nitrogen; and between about 100 ppm and about 600 ppm magnesium. Higher proportions are preferred for leathery or heavily wax laden foliage while lower proportions are preferred for leaves capable of rapid absorption and susceptible to burning. A composition containing about 1600 ppm nitrogen and 400 ppm magnesium is appropriate for many applications. Suitable nitrogen/zinc mixtures have approximately the same compositions, but with zinc substituted for magnesium. Zinc is an important nutrient since it is a component of certain plant growth hormones and precursors thereof.

In the case of a nitrogen/phosphorus/potassium nutrient mixture there should be approximately two parts by weight nitrogen and one part by weight potassium for each part by weight of phosphorus.

An especially suitable nutrient mixture for foliar application and enhancement of mycorrhizal development contains sources of nitrogen, potassium, phosphorus, zinc and magnesium. It preferably has a pH of between about 3.8 and about 6.2 and comprises:

| | |
|---|---|
| $ZnSO_4$ or $Zn(NO_3)_2$ | 0.2–5.0 parts by weight |
| $MgSO_4$ or $Mg(NO_3)_2$ | 0.2–5.0 parts by weight |
| $NH_4NO_3$ | 1–7 parts by weight |
| $KH_2PO_4$ | 1–7 parts by weight |

-continued

| | |
|---|---|
| $H_2O$ | Up to 1000 parts by weight |

Preferably, the zinc salt content is between about 1 pbw and about 2 pbw and the magnesium salt content is between about 0.8 pbw and about 1.9 pbw.

For treatment of soybeans, pine, oak and citrus, nutrient compositions containing nitrogen, phosphorus, potassium, sulfur, and a micronutrient are especially preferred. It has been found that iron, magnesium, boron, and combinations of magnesium and boron, are most effective. Particularly suitable aqueous NPKS/micronutrient solutions may have a pH of between about 5.5 and about 6.5 and contain between about 0.1% and about 5.0% by weight nitrogen, between about 0.25% and about 10.0% by weight phosphorus, between about 0.1% and about 5.0% by weight potassium, and between about 0.1% and 1.8% by weight sulfur, together with a micronutrient whose range of concentration may vary somewhat with its identity. Generally, where boron is present, its concentration should be in the range of 0.01% to 0.6% by weight; iron should be present in the range of 0.02% to about 2.0% by weight; and magnesium should be present in the range of 0.01% to 0.6% by weight.

For application to pine, oak and similar coniferous and deciduous trees, exemplary ectomycorrhizal species, it is especially preferred that the nutrient composition contain between about 1.5% and about 3.5% by weight nitrogen, between about 0.5% and about 3.0% by weight phosphorus, between about 0.5% and about 3.0% by weight potassium, and between about 0.02% and about 1.0% by weight sulfur. Where magnesium is present as a micronutrient, it preferably has a concentration of between about 0.2% and about 1.0% by weight. Where boron is used as a micronutrient, it preferably has a concentration of between about 0.02% and about 0.1% by weight; and, where iron is a micronutrient it is preferably present in a concentration of between about 0.05% and about 0.5% by weight.

For application to soybeans or citrus trees, exemplary endomycorrhizal species, the preferred ranges of proportions for micronutrients are generally lower than those stated above for oak and pine. Thus, for soybeans and citrus, the concentration of nitrogen is preferably between about 0.25% and about 3.0% by weight, potassium is preferably between about 0.1% and about 1.0% by weight, and sulfur is preferably between about 0.02% and about 0.7% by weight.

A novel and highly effective NPKS-MgB nutrient composition contains at least about 0.01 pbw magnesium in the form of elemental magnesium, magnesium sulfate, or chelated magnesium ions, at least about 0.01 parts by weight boron in the form of borax, another alkali metal borate, or an alkali metal boride, between about 0.03 and about 1.7 parts by weight nitrogen in the form of urea, an ammonium sulfate, an ammonium phosphate or ammonium nitrate, between about 0.01 and about 1.4 parts by weight phosphorus in the form of potassium phosphate or an ammonium phosphate, between about 0.02 and about 2.8 parts by weight potassium in the form of a potassium phosphate or ammonium phosphate, at least about 0.01 parts by weight sulfur in the form of an ammonium sulfate, potassium about 7 parts by weight of urea, ammonium nitrate and/or ammonium phosphate, a total between about 0.05 and about 7 parts by weight of potassium phosphate, and between about 0.05 and about 3 parts by weight of ammonium sulfate. The pH of this nutrient mixture should be between about 5.5 and about 6.5.

As a result of foliar application of nutrients in accordance with the method of the invention, the carbohydrate content, and especially the sugar content, of the plant's root system is greatly increased. This is in sharp contrast to results encountered with heavy soil fertilization where the carbohydrate content of the roots is lowered. Where the carbohydrate content of the roots is high, there is an increase in the rate of release from the roots of exudates containing sugars, hormones, vitamins and amino acids. These exudates stimulate development of the propagules in the soil and the infection of the roots thereby to form a mycorrhizal root system. In the case of ectomycorrhizal fungi, the hyphae form a mantle around the small roots and penetrate between the cell walls. In the case of endomycorrhizal fungi the hyphae penetrate directly into the cells. After a mycorrhizal system is formed by extensrve infection of the roots, the absorptive area of the root system is markedly increased, thereby substantially increasing the uptake of water into the roots. Absorptive area is increased not only by the effective extension of the root system by the hyphae which permeate the growth medium, but also by alteration of the microstructure of the roots in the areas of infection so as to increase their permeability to soil moisture. Mycorrhizal infection also promotes selective uptake of nutrients from the medium. This results not only from the increased effective absorptive area but also from the activity of fungal enzymes in breaking down certain soil components into more readily absorbable form.

As a result of the increased rate of water and nutrient absorption the root system grows and, in the case of ectomycorrhizal infection, bifurcates and otherwise subdivides to further increase root area and penetration into the growth medium. Hyphal infection results in hormone synthesis, which promotes root growth. Additionally, the high rate of nutrient uptake conduces to the maintenance of a high carbohydrate level in the roots, further promoting rapid growth of the hyphae and providing additional routes for absorption of water and nutrients. Avoidance of fertilization of the growth medium with excessive quantities of nitrogen provides favorable conditions for the growth of the hyphae. Thus, root and fungus symbiotically reinforce each other's growth, leading to rapid progressive growth of the entire mycorrhizal root system with further enhancement of the absorptive area.

Foliar fertilization in accordance with the method of the invention thus leads directly to root development and maintenance of high carbohydrate contents in the root. Through a synergistic interaction between foliar fertilization and mycorrhizal infection, leaf area is also markedly greater than that observed in plants receiving only soil fertilization under otherwise identical growth conditions. Such rapid root ano leaf development does not necessarily result in an immediate significant impact on the overall size of the plant. Ultimately, however, the effect of a highly developed mycorrhizal root system for absorption of nutrients and extensive leaf area for photosynthesis leads to a marked increase in root weight, plant weight and plant height.

Further in accordance with the invention, it has been found that the development of plant seedlings is enhanced by the combined effect of foliar application of nutrient mixture and foliar application of a solution of the plant growth regulator $^6$N-benzyladenine. Preferably, the growth regulator solution is applied as a fine mist to the leaves of the seedling at frequencies of between about twice weekly and once per month, while foliar spray fertilization and plant irrigation are carried out of essentially the schedule described hereinabove. Irrigation within about 48 hours is desirable for removal of unabsorbed nutrients from the leaf surface.

The plant growth regulator solution may contain from about 10 ppm to about 150 ppm $^6$N-benzyladenine, with a range of 25 ppm to 75 ppm being preferred. Application of such a solution by foliar spray in conjunction with foliar fertilization has been observed to increase root dry weight and leaf area of the seedlings as compared to plants that are subjected to the same foliar fertilization schedule but not application of plant growth regulator.

In further combination with foliar fertilization and application of $^6$N-benzyladenine, it has been found desirable to repetitively apply a foliar spray of a solution of certain gibberellic acids. In particular, it has been found useful to apply a mixture of the gibberellic acids GA-4 and GA-7, for example, a mixture of equal proportions of each. As in the case of $^6$N-benzyladenine, the solution of gibberellic acid should contain 10 ppm to 150 ppm, preferably 25 ppm to 75 ppm, of the latter plant growth regulator.

It has been found that the effect of applying plant growth regulators is significantly augmented by the use of a foliar nutrient solution having a relatively high total NPK nutrient content, i.e., of 1200 ppm or higher. A preferred nutrient mixture for this purpose contains 0.4% to 5.0% by weight nitrogen, 0.18% to 10.0% by weight phosphorus, and 0.18% to 5.0% by weight potassium. In the latter instance, it is preferred to utilize relatively strong plant growth regulator solutions, for example, containing 400 ppm to 600 ppm of growth regulator.

In accordance with the invention, the nutrients, $^6$N-benzyladenine, and giberellic acid may be applied in separate solutions, or any two or all three of these can be combined in a single foliar spray. Whether formed by mixing the nutrient solution and plant growth regulators remote from the plant or on the foliage thereof, a plant growth solution is provided on the leaf surfaces which contains nutrients and plant growth regulators in the proportions specified hereinabove.

The following examples illustrate the invention.

EXAMPLE 1

Black Oak seeds were sterilized with a 10% Clorox bleach solution and planted in Spencer-LeMaire book planters each of which contained three 45 in3 seedling cavities. All cavities were filled with a 1:1 homogeneous mixture of steam sterilized peat moss and pure construction grade vermiculite. Two groups of the planters were inoculated in the zone adjacent the root system with 12% by volume of a vegetative mycelial inoculum of *Pisolithus tinctorius* (Pers.) Coker and Couch. The inoculum was grown using techniques described by Marx and Bryan "Growth and Ectomycorrhizal Development of Loblolly Pine Seedlings in Fumigated Soil Infested with the Fungal Symbiont *Pisolithus tinctorius*", Forest Science 21:245–254. The medium in which the hyphae were cultivated was treated with a Melin-Norkrans agar solution containing 0.05 gpl $CaCl_2$, 0.023 gpl NaCl, 0.05 gpl $KH_2PO_4$, 0.15 gpl $MgSO_4 \cdot 7H_2O$ 0.012 gpl $FeCl_3$, 0.10 gpl thiamine hydrochloride, 3.00 gpl malt extract, 10.00 gpl dextrose and 15.00 gpl bacto agar in an aqueous vehicle.

Two additional groups of planters were left uninoculated.

Of the two groups of inoculated seedlings, one was maintained in a greenhouse with soil temperature maintained at 26° C. and the other was maintained in the greenhouse with a soil temperature of 31° C. The two groups of noninoculated seeolings were also maintaine in the greenhouse and respectively subjected to the same two soil temperature conditions. All four groups of seedlings were subjected to foliar fertilization commencing approximately four weeks subsequent to full leaf oevelopment. In each instance foliar fertilization was carried out every three days using an aqueous nutrient mixture containing the following concentrations of nutrients:

| Nutrient | Concentration |
|---|---|
| Nitrogen | 750 ppm |
| Phosphorus | 375 ppm |
| Potassium | 375 ppm |

The nutrient mixture was applied as a fine mist from a pump spray and misting was discontinued at the first occurrence of drip from the foliage. The aforesaid nutrient mixture was entirely withheld from the growth medium, but the medium was supplied weekly with a supplemental nutrient solution consisting of 7 ppm nitrogen, 15 ppm phosphorus, 18 ppm calcium, 75 ppm magnesium, 0.03 ppm copper, 0.03 ppm zinc, 0.07 ppm molybdenum, 0.27 ppm iron, and 0.24 ppm manganese. The growth medium was irrigated periodically so as to maintain its moisture at field capacity, i.e., approximately one third atmosphere.

After 150 days of growth (in November of the year), the seedlings were outplanted in an experimental farest, at which time they were sampled to determine stem length, root collar diameter, percent mycorrhizal infection, root length, root weight, stem weight, leaf weight, leaf area and total weight. The results of these observations for each combination of seedling treatment conditions is set forth in Table I.

TABLE I

Morphological Development of a Sample of Container-Grown Black Oak Seedlings Before Outplanting in Sinkin Experimental Forest

| Treatment | Stem Length (cm) | Root Collar Diam. (mm) | Ectomycorrhizal Infection (%) | Root Length (cm) | Root Weight (g) | Stem Weight (g) | Leaf Weight (g) | Leaf Area (cm$^2$) | Total Weight (g) |
|---|---|---|---|---|---|---|---|---|---|
| P.t. inoc. 26° C. | 12.7a[1] | 4.3a | 21.0a | 910.8b | 3.76cd | 0.92b | 1.26d | 184.2d | 5.93c |
| P.t. inoc. 31° C. | 12.4a | 4.3a | 53.9a | 1141.8a | 3.52cd | 0.93b | 1.41d | 221.2d | 5.85c |
| Noninoc. 26° C. | 12.2a | 4.3a | 0.0c | 853.7b | 3.61cd | 0.84b | 1.16d | 165.0d | 5.60c |
| Noninoc. 31° C. | 12.1a | 4.4a | 0.0c | 934.8b | 2.55d | 0.85b | 0.94d | 186.9d | 4.34c |

[1]Parameters means within columns followed by a common letter are not significantly different at the 0.05 level by Duncan's Multiple Range Test.

Seedlings were again sampled in the following July to determine the number of new roots, the length of new unsuberized roots, the new root weight, the proportion of *Pisolithus tinctorius* laterals and the proportion of unidentified ectomycorrhizal laterals. The results of these observations for each type of seedling treatment is set forth in Table II.

TABLE II

Root Regeneration and Ectomycorrhizal Development on July 15 of Container-Grown, Black Oak Seedlings Outplanted in Sinkin Experimental Forest.

| Treatment | Total Number New Roots | Length New Unsub. Roots (cm) | New Root Weight (g) | P.t. Lats. (%) | Unidentified Ecto. Lats. (%) |
|---|---|---|---|---|---|
| Container Grown | | | | | |
| P.t. inoc., 26° C. | 17.3a[1] | 190.0ab | 0.07b | 17.5b | 0.0b |
| P.t. inoc., 31° C. | 20.7a | 267.7a | 0.11b | 27.4a | 0.2a |
| Noninoc., 26° C. | 12.7b | 122.8b | 0.05bc | 0.1c | 4.5ab |
| Noninoc., 31° C. | 12.5b | 148.7ab | 0.04c | 0.0c | 2.9ab |

[1]Parameter means within columns followed by a common letter are not significantly different at the 0.05 level by Duncan's Multiple Range test.

At the end of the first growing season after outplanting, samples were again taken to determine root weight, suberized root system length, stem weight, leaf weight, leaf area and total weight. The results of these observations are set forth in Table III.

TABLE III

Morphological development on August 30 of a sample of container grown black oak seedlings outplanted in Sinkin Experimental Forest.

| Treatment | Root Weight (g) | Suberized Root Sys. Length (cm) | Stem Weight (g) | Leaf Weight (g) | Leaf Area (cm$^2$) | Total Weight (g) |
|---|---|---|---|---|---|---|
| Container Grown | | | | | | |
| P.t. inoc., 26° C. | 6.77b[1] | 1044.5a | 3.35b | 1.18a | 278.2a | 11.30b |
| P.t. inoc., 31° C. | 5.15b | 1045.3a | 2.79b | 0.71b | 177.4bc | 8.65b |
| Noninoc., 26° C. | 6.05b | 784.1b | 2.85b | 0.75ab | 216.9ab | 9.64b |
| Noninoc., 31° C. | 5.27b | 811.9b | 2.76b | 0.59b | 128.5c | 8.26b |

[1]Parameter means within columns followed by a common letter are not significantly different at the 0.05 level by Duncan's Multiple Range test.

At the end of the same period subsequent to outplating, measurements were also taken on new roots, length of new unsuberized roots, new root weight, percent *Pisolithus tinctorius* lateral roots and percent unidentified ectomycorhizal lateral roots. The results of these observations are set forth in Table IV.

TABLE IV

Root regeneration and ectomycorrhizal development on August 30 of container grown black oak seedlings outplanted in Sinkin Experimental Forest.

| Treatment | Total Number New Roots | Length New Unsub. Roots (cm) | New Root Weight (g) | P.t. Lats. (g) | Uniden- tified Ecto. Lats. (%) |
|---|---|---|---|---|---|
| Container Grown | | | | | |
| P.t. inoc., 26° C. | 17.3a[1] | 238.6a | 0.12a | 19.2b | 1.3bc |
| P.t. inoc., 31° C. | 20.7a | 290.8a | 0.07ab | 27.2a | 0.8bc |
| Noninoc., 26° C. | 11.9b | 152.3b | 0.05b | 1.0b | 4.5b |
| Noninoc., 31° C. | 12.0b | 149.8b | 0.06ab | 0.2b | 4.2bc |

[1] Parameter means within columns followed by a common letter are not significantly different at the 0.05 level by Duncan's Multiple Range test.

Slightly more than two weeks subsequent to the observations recorded in Tables III and IV, observations were made to determine the survival rate, stem length, and root collar diameter of all of the outplanted seedlings. The results of these observations are set forth in Table V.:

TABLE V

Survival and stem length on September 15 of container grown black oak seedlings outplanted in Sinkin Experimental Forest.

| Treatment | Survival (%) Site 1 | Survival (%) Site 2 | Current stem (cm) | Root collar diameter (mm) |
|---|---|---|---|---|
| P.t. inoc., 26° C. | 95.3a[1] | 97.2a | 18.2b | 5.9b |
| P.t. inoc., 31° C. | 90.3a | 94.4a | 17.6b | 5.2b |
| Noninoc., 26° C. | 93.1a | 91.7a | 15.6c | 5.1b |
| Noninoc., 31° C. | 91.7a | 87.5a | 16.2bc | 5.2b |

[1] Parameter means within columns followed by a common letter are not significantly different at the 0.05 level by Duncan's Multiple Range test.

EXAMPLE 2

Sterilized black oak seeds were planted in fumigated nursery soil which was surface inoculated with a vegetative mycelial inoculum of *Pisolithus tinctorius* prepared in the manner described in Example 1. Inoculation was accomplished by broadcasting the inoculum over the soil at a rate 2 1/m² tilling the inoculum into the soil to a depth of six inches. One group of seedings was subjected to foliar ferilization, using an aqueous nutrient mixture containing the following concentrations of nutrients:

| Nutrient | Concentration |
|---|---|
| Nitrogen | 1088 ppm |
| Phosphorus | 325 ppm |
| Potassium | 325 ppm |
| Sulfur | 300 ppm |
| Zinc | 270–275 ppm |
| Magnesium | 255 ppm |

Application of the nutrient mixture was commenced four weeks after full leaf development and then continued on a regular schedule at intervals of three days. A second group of seedlings which received no supplemental fertilization served as controls. Seed beds in which both groups of seedlings were grown had been fertilized two years previously with 500 pounds per acre of 8-24-40 fertilizer. All of the seedlings of both groups were irrigated on a regular schedule so as to maintain soil moisture at field capacity. In the case of foliar fertilization, irrigation was carried out at 24 to 48 hours subsequent to the most recent application of nutrient mixture so as to permit essentially complete absorption of nutrients by the foliage and prevent washing the nutrient mixture into the soil.

Foliar application was in the form of a fine mist from a pump sprayer as described in Example 1. Application was discontinued at the first occurrence of drip from the foliage. After five months in the nursery, the seedlings were sampled and observations made on percentage mycorrhizal infection, root length, root dry weight, shoot length, shoot dry weight, shoot diameter, leaf area, leaf dry weight and total plant weight. Results of these observations are set forth in Table VI.

TABLE VI

Development Parameters for Black Oak Seedlings After Five Months Growth in Nursery Soil

| Parameter | NKPSMgZn Foliar Application | NKPSMgZn Growth Medium Application | % Increase |
|---|---|---|---|
| Mycorrhizal Infection % | 41.73 | 31.30 | 33.3 |
| Root Length (cm) | 469.2 | 407.00 | 15.3 |
| Root Dry Wt. (g) | 8.68 | 7.20 | 20.6 |
| Shoot Length (cm) | 30.01 | 26.96 | 11.3 |
| Shoot Dry Wt. (g) | 3.09 | 2.36 | 30.9 |
| Shoot Dia. (mm) | 5.58 | 4.85 | 15.1 |
| Leaf Area (cm²) | 633.75 | 582.10 | 8.9 |
| Leaf Dry Wt. (g) | 7.01 | 5.82 | 19.8 |
| Total Plant Wt. (g) | 18.85 | 15.41 | 22.3 |

The two groups of seedlings were outplanted. At the end of the first year of field growth, measurements were taken of various growth parameters. It was found that those seedlings subjected to foliar fertilization had 15% greater root weight, 32% greater root length, 37% greater stem weight, 72% greater leaf weight, 83% greater leaf area and 30% greater total weight than the seedlings which were subjected to fertilization through the growth medium. All of these parameters, especially leaf weight and leaf area which affect photosynthetic potential, portend greatly enhanced plant growth and development during subsequent growing seasons.

EXAMPLE 3

Stratified shortleaf pine (*Pinus echinata Mill.*) were sterilized with a 10 percent Clorox bleach solution tion and planted in 63 Spencer-LeMaire book planters each of which contained three 45 cubic inch seedling cavities. All cavities were filled with a 1:1 homogeneous mixture of steam-sterilized peat moss and pure construction grade vermiculite. Of the 63 planters, 35 were inoculated with a vegetative mycelial inoculum of *Pisolithus tinctorius* prepared as described in Example 1. Each planter cavity was inoculated with 1 cubic inch of the inoculum in the zone adjacent to the plant root system. Twenty-eight book planters were left uninoculated.

The total of 189 seedlings was divided into 9 groups of 21 seedlings each. Each group was subjected to a different combination of treatments. Of the five groups consisting of inoculated seedlings, two were subjected to treatment with a nitrogen/magnesium fertilizer and two were subjected to treatment with a nitrogen/ zinc fertilizer. Of the two groups subjected to each nutrient mixture, one group was fertilized by application of nutrient mixture to the growth medium and the other was fertilized by foliar application of the mixture. The four groups of noninoculated seedlings were subjected to the same combinations of nutrient mixture and means of application.

Seedling growth data and ectoxycorrhizal development were analyzed using analysis of variance and the least significant difference test at the 99% confidence level. Results of the tests of this example are set forth in Table VII.

TABLE VII

Ectomycorrhizal Root Formation and Growth of Shortleaf Pine Seedlings Fertilized by Two Methods and Inoculated With *Pisolithus tinctorius* (Pt).

|  | Inoculated | | | | | Noninoculated | | | |
|---|---|---|---|---|---|---|---|---|---|
|  | Medium Fertilized | | Foliar Fertilized | | | Medium Fertilized | | Foliar Fertilized | |
| Myc. | NZn | NMg | NZn | NMg | Control | NZn | NMg | NZn | NMg |
| Height (inches) | 3.1a | 3.3a | 3.5ab | 4.1b | 2.9a | 3.2ab | 3.4ab | 3.3a | 3.0a |
| Stem dry weight (mg)[a] | 103a | 128a | 127a | 175a | 61b | 111a | 142a | 129 | 109a |
| Total dry weight (mg) | 149abc | 164ab | 193ad | 223d | 110c | 148abc | 190ad | 163ab | 137bc |
| % Pt lateral roots | 50.9a | 49.3a | 55.1a | 65.9b | 49.8a | — | — | — | — |
| Number of Pt short roots/lateral | 4.4a | 3.8a | 5.3b | 5.2b | 3.3c | — | — | — | — |

[a]Weights are given in mg rather than ounces to avoid small decimal expressions mg $\times$ (3.5274 $\times$ 10$^{-5}$) = ounces.
Numbers followed by common letters (a, b, c, or d) within a parameter are not significantly different at the 99% confidence level.

The fifth group of inoculated seedlings was used as a control group and received no fertilization. However, the growth media of all seedlings, including the unfertilized inoculated group, were supplemented once a week with a nutrient solution consisting of 7 ppm nitrogen, 15 ppm phosphorus, 18 ppm calcium, 75 ppm magnesium 0.03 ppm copper, 0.03 ppm zinc, 0.07 ppm molybdenum, 0.27 ppm iron and 0.24 ppm manganese.

The nitrogen/zinc and nitrogen/magnesium nutrient mixtures consisted of 1600 ppm nitrogen and 400 ppm zinc or magnesium. Both the nitrogen/zinc and nitrogen/magnesium mixtures contained nitrate, ammonium and urea nitrogen combined with zinc and magnesium as metals and oxides.

Fertilization with the nitrogen/zinc and nitrogen/magnesium mixtures was commenced four weeks after seed germination. In the case of growth medium fertilization, 1.4 ounces of the mixture was applied weekly. For foliar fertilization, the nutrient mixture was applied twice weekly with a pump sprayer which coated each seedling with a fine mist. Misting was discontinued at the first occurrence of drip from the foliage. All seedlings were irrigated from above every 48 hours.

Eleven weeks after fertilization began all seedlings were removed from the containers and the soil was washed from the roots. Stem length was measured and recorded for each seedling. Each root system was examined to assess the total number of ectomycorrhizal lateral roots greater than 0.4 inches in length and for the total ectoxycorrhizal short roots per lateral root. The criteria used for identifying ectomycorrhizal short roots were dichotomous branching or forking, swelling and discoloration of the short roots. Wherever doubt existed as to mycorrhizal status, the short roots were regarded as unifected since dichotomy and short roots may occur without ectomycorrhizal infection. Seedlings were excised at the root collar, oven dried at 158° F. for 48 hours, and weighed.

EXAMPLE 4

Black Oak (*Quercus velutina* Lam) seedlings planted in an artificial growth medium of the type described in Example 3 were inoculated with *Pisolithus tinctorius* in the manner further described in the aforesaid example. The inoculated seedlings were divided into five groups. Two groups were fertilized with a nutrient mixture containing nitrogen, phosphorus and potassium in a weight ratio of 2:1:1 and two other groups were fertilized with a nutrient mixture containing 1600 ppm nitrogen in the form of nitrates, ammonium salts and urea, and 400 ppm magnesium in the form of dispersed magnesium metal and magnesium oxide. An aqueous vehicle was used for both nutrient mixtures. Of the two groups fertilized with the NPK mixture, one was fertilized in the growth medium and the other by application of the mixture to the foliage as a fine mist produced by a pump spray. In the same manner, one of the groups fertilized with the NMg nutrient mixture was fertilized through the growth medium and the other by foliar application. The fifth group of inoculated seedlings was left unfertilized as a control.

Five additional groups of black oak seedlings were planted in the same growth ium but not inoculated with mycorrhizal hyphae. Each group of noninoculated seedlings received one of the same combinations of treatment as a corresponding group of inoculated seedlings, providing in all a total of ten different combinations of treatment.

Ethanol soluble carbohydrates were isolated from the short roots of these plants and glucose, fructose, and sucrose analyzed enzymatically. After 16 weeks the total seedling ory weight, stex length, root system length, and leaf area of each group of seedlings were measured. The results of the tests of this example are set forth in Table VIII.

TABLE VIII

Morphological Characteristics, Ectomycorrhizal Development by *Pisolithus tinctorius* (Pt), and Root Carbohydrate Levels of Container-Grown Black Oak Seedlings.

| | Pisolithus Inoculated | | | | | Noninoculated | | | | |
|---|---|---|---|---|---|---|---|---|---|---|
| | NPK | | | NMg | | NKP | | | NMg | |
| | Medium | Foliar | Control | Medium | Foliar | Medium | Foliar | Control | Medium | Foliar |
| Morphological Characteristics: | | | | | | | | | | |

TABLE VIII-continued

Morphological Characteristics, Ectomycorrhizal Development by *Pisolithus tinctorius* (Pt), and Root Carbohydrate Levels of Container-Grown Black Oak Seedlings.

|  | Pisolithus Inoculated | | | | | Noninoculated | | | | |
|---|---|---|---|---|---|---|---|---|---|---|
|  | NPK | | Control | NMg | | NKP | | Control | NMg | |
|  | Medium | Foliar |  | Medium | Foliar | Medium | Foliar |  | Medium | Foliar |
| Total Weight (g) | 4.74a | 4.89a | 2.91ef | 3.96bc | 3.76bcd | 4.12b | 3.22def | 2.69f | 3.40cde | 3.03e |
| Root Weight (g) | 2.22ab | 2.36a | 1.79bcd | 2.12abc | 2.09abc | 2.23ab | 1.70cd | 1.71cd | 1.97abcd | 1.61d |
| Stem length (cm) | 13.2a | 12.4a | 9.09bcd | 10.5b | 9.2bcd | 10.3bc | 8.9cd | 8.9cd | 9.5bcd | 8.1d |
| Leaf area (cm$^2$) | 210.9a | 242.1a | 85.9c | 118.4bc | 123.5bc | 149.4b | 158.2b | 92.4c | 91.4c | 126.9bc |
| Root length (cm) | 866.6bc | 1229.8a | 683.4cde | 728.5bcd | 939.7b | 714.5bcd | 536.8de | 570.0de | 679.8cde | 464.6e |
| Ectomycorrhizal Infection by *Pisolithus tinctorius*: | | | | | | | | | | |
| % Pt. laterals | 32.5b | 68.0a | 42.1b | 39.3b | 59.7a | — | — | — | — | — |
| Number ectomycorrhizal short roots/ectomycorrhizal lateral | 1.54b | 2.67a | 2.04a | 1.94ab | 2.45a | — | — | — | — | — |
| Root Carbohydrate Analyses on Day 42 (mol/gram of short root) | | | | | | | | | | |
| Sucrose | — | — | — | — | — | 53.75b | 71.00ab | 79.75a | 53.25b | 63.75ab |
| Fructose | — | — | — | — | — | 24.50b | 58.75a | 15.00b | 15.50b | 38.75ab |
| Glucose | — | — | — | — | — | 84.25ab | 175.00a | 144.75ab | 17.00b | 192.75a |

*Each number followed by a common letter (a, b, c, d, e, or f) within a parameter is not significantly different at the P = 0.05 confidence level.

EXAMPLE 5

*Citrus jambhiri* (rough lemon) seeds were planted in 750 cc book planters containing a potting medium constituted of a 3:1 (v/v) mixture of sand and clay loam. The medium in one set of planters was inoculated with *G. fasiculatum* and another with *G. mosseae*. A control set was not inoculated. Inoculation was carried out by blending 500–600 chlamydospores of inoculum into the growth medium. Seedlings emerged from the media in the planters and were maintained in a greenhouse under a 16-hour photoperiod (600 E m$^2$/sec)

Three different nutrient solutions were prepared, including an NPKS, NPKSB and NPKSBMg. Each solution contained 483 ppm N, 215 ppm P, 409 ppm K, and 62 ppm S. The NPKSB and NPKSBMg solutions contained 50 ppm B, while the NPKSBMg solution contained 100 ppm Mg. These nutrient solutions were used for foliar fertilization of both inoculated and noninoculated *C. jambhiri*, the sets of planters containing each type of inoculum and the noninoculated set being each divided into subsets receiving foliar spray applications of one of the three nutrient solutions.

The subsets of seedlings treated with each combination of foliar fertilization and inoculation (or noninoculation) were further divided into groups receiving four different levels of phosphorus treatment. The potting medium initially had an organic matter content of 0.8%, a pH of 6.2, and the following initial concentrations (Kg/ha) of extractable elements or ions: Nitrate - N, 11; Bray II P$_2$O$_5$, 86; Ca, 1246; Mg, 108; K, 119; and B, 2. Phosphorus (as triple superphosphate) was incorporated into the potting medium at loadings of 0, 50, 100, and 200 Kg/ha, thus providing growth medium phosphorus corresponding to low, medium, and high phosphorus levels found in typical citrus nursery soils. The growth medium of each seedling was supplemented weekly with 50 ml of dilute (one-half concentration) Hoagland's solution.

After 25 weeks, the plants were harvested. Shoot length, leaf area, component dry weights of roots, shoots and leaves, root system length, and percentage mycorrhizal infection were measured. Growth medium samples from each treatment combination were analyzed for extractable ions and fungal spores. Results of the tests of this example are set forth in Tables IX, X, and XI.

TABLE IX

| | Growth of *C. jambhiri* Inoculated With *G. mosseae* | | | | |
|---|---|---|---|---|---|
| | 1<br>0 ppm P<br>Foliar<br>Fertilization | 2<br>140 ppm P<br>Foliar<br>Fertilization | 3<br>30 ppm P<br>Foliar<br>Fertilization | 4<br>60 ppm P<br>Foliar<br>Fertilization | 5<br>60 ppm P<br>No Foliar<br>Fertilization |
| NPKS | | | | | |
| Stem length (cm) | 35.5 | 40.7 | 38.9 | 37.4 | 38.0 |
| Leaf Area (cm$^2$) | 352.7 | 444.3 | 475.5 | 394.0 | 436.8 |
| Total Dry Weight (g) | 10.4 | 12.8 | 10.9 | 11.9 | 10.2 |
| Percent Endo Laterals (%) | 79.9 | 10.8 | 80.7 | 26.8 | 7.1 |
| NPKSBMg | | | | | |
| Stem length (cm) | 27.0 | 24.3 | 26.2 | 24.9 | 29.3 |
| Leaf Area (cm$^2$) | 258.2 | 158.7 | 301.7 | 247.7 | 281.6 |
| Total Dry Weight (g) | 7.1 | 3.4 | 6.0 | 5.5 | 6.7 |
| Percent Endo Laterals (%) | 61.9 | 6.3 | 65.7 | 25.3 | 18.8 |
| NPKSBMg | | | | | |

TABLE IX-continued

Growth of *C. jambhiri* Inoculated With *G. mosseae*

|  | 1<br>0 ppm P<br>Foliar<br>Fertilization | 2<br>140 ppm P<br>Foliar<br>Fertilization | 3<br>30 ppm P<br>Foliar<br>Fertilization | 4<br>60 ppm P<br>Foliar<br>Fertilization | 5<br>60 ppm P<br>No Foliar<br>Fertilization |
| --- | --- | --- | --- | --- | --- |
| Stem length (cm) | 33.7 | 23.8 | 23.0 | 31.6 | 28.5 |
| Leaf Area (cm$^2$) | 321.1 | 205.2 | 259.1 | 300.3 | 313.2 |
| Total Dry Weight (g) | 8.6 | 4.1 | 5.4 | 24.4 | 7.8 |
| Percent Endo Laterals (%) | 81.6 | 12.9 | 81.3 | 7.1 | 22.0 |

TABLE X

Growth of *C. jambhiri* in Uninoculated Soil

|  | 1<br>0 ppm P<br>Foliar<br>Fertilization | 2<br>140 ppm P<br>Foliar<br>Fertilization | 3<br>30 ppm P<br>Foliar<br>Fertilization | 4<br>60 ppm P<br>Foliar<br>Fertilization | 5<br>60 ppm P<br>No Foliar<br>Fertilization |
| --- | --- | --- | --- | --- | --- |
| NPKS | | | | | |
| Stem length (cm) | 9.1 | 25.1 | 21.6 | 25.8 | 24.3 |
| Leaf Area (cm$^2$) | 40.4 | 286.1 | 184.8 | 262.4 | 230.2 |
| Total Dry Weight (g) | 1.2 | 7.5 | 6.6 | 5.8 | 7.4 |
| Percent Endo Laterals (%) | 2.5 | 0.8 | 3.1 | 0.3 | 0.4 |
| NPKSMg | | | | | |
| Stem length (cm) | 7.4 | 15.2 | 15.1 | 18.6 | 23.2 |
| Leaf Area (cm$^2$) | 16.1 | 120.5 | 105.8 | 148.7 | 168.1 |
| Total Dry Weight (g) | 1.2 | 2.4 | 3.9 | 3.2 | 3.8 |
| Percent Endo Laterals (%) | 2.1 | 0.4 | 2.5 | 0.1 | 0.2 |
| NPKSBMg | | | | | |
| Stem length (cm) | 8.0 | 15.6 | 15.8 | 20.5 | 21.1 |
| Leaf Area (cm$^2$) | 17.8 | 156.9 | 115.4 | 149.0 | 184.4 |
| Total Dry Weight (g) | 0.7 | 2.8 | 2.4 | 3.2 | 4.2 |
| Percent Endo Laterals (%) | 1.0 | 0.9 | 6.2 | 0.4 | 0.0 |

TABLE XI

Growth of *C. jambhiri* Inoculated With *G. fasiculatus*

|  | 1<br>0 ppm P<br>Foliar<br>Fertilization | 2<br>140 ppm P<br>Foliar<br>Fertilization | 3<br>30 ppm P<br>Foliar<br>Fertilization | 4<br>60 ppm P<br>Foliar<br>Fertilization | 5<br>60 ppm P<br>No Foliar<br>Fertilization |
| --- | --- | --- | --- | --- | --- |
| NPKS | | | | | |
| Stem length (cm) | 40.2 | 44.1 | 49.9 | 49.3 | 39.2 |
| Leaf Area (cm$^2$) | 360.5 | 500.2 | 546.1 | 473.1 | 475.0 |
| Total Dry Weight (g) | 10.2 | 14.3 | 15.0 | 15.4 | 12.9 |
| Percent Endo Laterals (%) | 87.0 | 12.6 | 84.3 | 33.8 | 9.5 |
| NPKSMg | | | | | |
| Stem length (cm) | 31.6 | 21.3 | 31.7 | 31.7 | 32.9 |
| Leaf Area (cm$^2$) | 361.6 | 216.2 | 334.7 | 333.4 | 335.9 |
| Total Dry Weight (g) | 8.3 | 4.4 | 6.7 | 7.2 | 7.9 |
| Percent Endo Laterals (%) | 60.1 | 12.6 | 55.0 | 15.5 | 16.6 |
| NPKSBMg | | | | | |
| Stem length (cm) | 30.1 | 25.6 | 32.1 | 36.4 | 24.3 |
| Leaf Area (cm$^2$) | 286.7 | 208.3 | 348.5 | 332.0 | 218.0 |
| Total Dry Weight (g) | 7.4 | 4.7 | 8.7 | 7.6 | 3.6 |
| Percent Endo Laterals (%) | 82.2 | 17.8 | 76.7 | 36.4 | 14.3 |

From the above results, it may be seen that at a soil phosphorus level of 30 ppm, foliar fertilization stimulated mycorrhizal development comparable to that achieved when soil phosphorus was less than 5 ppm. Mycorrhizal development, as measured by percent endoxycorrhizal laterals was over 75% where soil phosphorus was 30 ppm or below for seedlings foliarly fertilized with NPKS or NPKSBMg. Mycorrhizal development resulting from contaxination was also observed on the noninoculated control seedlings when soil phosphorus was below 30 ppm. Within the noninoculated treatments, the plants foliarly fertilized with NPKS and NPKSMg achieved the best mycorrhizal development.

Mycorrhizal inoculation significantly increased stem length, leaf area, and total dry weight of *C. jambhiri*. Inoculation with *G. fasiculatum* and foliar fertilization with NPKS resulted in a 131 percent increase in stem length, a 195 percent increase in leaf area, and a 127 percent increase in total dry weight over noninoculated control seedlings when soil phosphorus was 30 ppm. Similar, but smaller increases in stem length, leaf area, and total dry weight were also found in the inoculated plants foliar fertilized with NPKSMg and NPKSBMg. The slightly smaller growth response of plants receiving the B and Mg foliar fertilizer solutions may be attributable to a reduction in photosynthetic area resulting from leaf "burn" or necrosis. While concentrations were selected on the basis of earlier work on pine and oak, it would appear that the concentrations of boron and magnesium used in this study were too high as some phytotoxicity was observed.

Application of soil phosphorus at rates of 30 ppm or above also stimulated an increase in the shoot growth of noninoculated *C. jambhiri*. Apparently, moderate to heavy soil phosphorus applications may act as a partial substitute for mycorrhizal colonization in stimulating a shoot growth response. Nonetheless, shoot growth of the noninoculated plants at the heaviest soil phosphorus application (140 ppm) was less than half that of the *G. fasiculatum* plants at the 5 and 30 ppm soil phosphorus application.

EXAMPLE 6

Soybeans (Missouri Maturity Group IV), which had been surface sterilized in a 10% sodium hypochlorite solution, were planted in 8" pots. To minimize any possible competition encountered by the mycorrhizal fungi, the seeds were not inoculated with *Rhizobium japonicum*. The potting medium was a 2:1 v/v mixture of sand and clay loam which had been sterilized with methyl bromide for 24 hours.

An inoculum for the potting medium was developed by growing *Glomus fasiculatum* on soybean roots for three months. The tops of the soybean plants were removed and the soil and roots passed through a sieve to produce the inoculum which comprised soil, spores, and vegetative mycelia. Each 8" pot used in the tests of this example was inoculated with a 100 g portion of the inoculum. The potting medium contained 0.8% organic matter, 1800 lbs/acre calcium, 125 lbs/acre $P_2O_5$, 255 lbs/acre magnesium and 120 lbs/acre potassium, and had a pH of 6.4.

The soybean (*Glycine max L.*) plants in the aforesaid potting medium were grown for 20 weeks in a greenhouse under a 16-hour photoperiod and watered daily. The soil in each pot was fertilized once a week with Hoagland's solution (100 ml). Hoagland's solution contains calcium nitrate tetrahyorate (1.18 g/l), potassium nitrate (0.51 g/l), magnesium sulfate heptahydrate (0.49 g/l), and potassium dihydrogen phosphate (0.14 g/l).

One group of plants was subjected to foliar fertilization utilizing a NPKSMg nutrient solution. Another group was foliarly fertilized with an NPKSB nutrient solution, and a third group was foliarly fertilized with an NPKSBMg solution. In each case, the solution was applied as a fine mist once a week following the onset of flowering. Compositions of the nutrient solutions of this example are set forth in Table XII.

TABLE XII

Composition of Nutrient Solutions Utilized in Foliar Spray Fertilization Studies for Glycine Max L. in Eight Inch Pots

|   | No. 1 | No. 2 | No. 3 |
|---|---|---|---|
| N | 493 ppm | 493 ppm | 493 ppm |
| P | 215 | 215 | 215 |
| K | 409 | 409 | 409 |
| S | 62 | 62 | 62 |
| Mg | 200 | — | — |
| B | — | 50 | 50 |

After twenty weeks of growth, the plants were removed from the pots, and shoot length, stem diameter at the root collar and leaf area were measured. Dry weights of roots, stem, leaves, bean pods and total plant were also determined. The number of bean pods was counted and the percentage mycorrhizal infection of the roots was ascertained. Growth data were subjected to analysis of variance.

The results of the tests of this example are set forth in Table XIII.

TABLE XIII

Growth and Yield of *G. fasiculatum* Inoculated and Noninoculated Soybean (*Glycine max.* L) Plants Foliar Fertilized with Three Fertilizers

|   | Noninoculated | | | | Inoculated | | | | |
|---|---|---|---|---|---|---|---|---|---|
|   | Control | NPKSMg | NPKSB | NPKSBMg | Control | NPKSMg | NPKSB | NPKSBMg | LSD |
| Stem Diameter (cm) | 4.86 | 4.22 | 4.36 | 3.85 | 5.17 | 5.35 | 5.79 | 5.74 | 0.68 |
| Stem Length (cm) | 64.10 | 61.30 | 69.20 | 54.80 | 80.10 | 81.90 | 84.60 | 83.20 | 7.70 |
| Stem Weight (gm) | 2.66 | 2.38 | 2.63 | 1.65 | 4.33 | 3.74 | 4.48 | 4.10 | 0.44 |
| Leaf Area (cm$^2$) | 274 | 436 | 312 | 291 | 404 | 348 | 445 | 373 | 8960 |
| Leaf Weight (g) | 1.14 | 1.64 | 1.49 | 1.25 | 1.71 | 1.40 | 1.74 | 1.48 | 0.31 |
| Root Weight | 0.96 | 0.91 | 0.87 | 0.89 | 1.53 | 1.64 | 1.74 | 1.79 | 0.16 |
| Number of Bean Pods per Plant | 2.1 | 2.1 | 2.0 | 2.3 | 3.6 | 3.6 | 4.0 | 2.9 | 0.5 |
| Bean and Pod Weight (g) | 0.26 | 0.23 | 0.27 | 0.24 | 0.38 | 0.40 | 0.54 | 0.53 | 0.06 |
| Total Plant Weight (g) | 4.76 | 4.93 | 4.99 | 3.79 | 7.57 | 6.78 | 7.96 | 7.37 | 0.62 |
| Mycorrhizal Infection (%) | 0.01 | 0.9 | 2.2 | 3.4 | 67.6 | 94.5 | 92.5 | 96.1 | 7.10 |

From the results set forth above, it may be seen that NPKSB and NPKSBMg treatments significantly increased the root weights and bean weights of the inoculated plants. For a given fertilizer treatment, inoculation was found to significantly increase bean weight and certain other measures of plant development in comparison with uninoculated plants. Increases in leaf area and weight were also observed but were not found to be significant at the 95% confidence level.

EXAMPLE 7

Because the limited dimensions of the 8" planters used in the tests of Example 6 resulted in internal plant moisture stress which was difficult to control, and in root-bound plants which led to virtually 100% infection of mycorrhizae in the root system, further foliar fertilization tests of endomycorrhizal soybeans were carried out in 5-gallon containers.

Soybeans (Missouri Maturity Group IV) were surface sterilized with sodium hypochlorite and planted in the 5-gallon containers under greenhouse conditions. The potting medium was a 1:1 v/v mixture of sand/soil, with a pH of 6.0 to 6.3, that had been sterilized for 24 hours with methyl bromide. All pots were inoculated with *Rhizobium japonicum* and two-thirds of the pots were inoculated with *G. fasiculatum* by thoroughly mixing with the growth medium therein 100 g of inoculum soil containing approximately 3000 mycorrhizal spores per container. The inoculum was prepared in the manner described above in Example 6.

Among the pots inoculated with *G. fasiculatum*, two soil fertility levels were maintained as follows:

| High Soil Test | Average Soil Test |
|---|---|
| 160 lbs/AC P$_2$O$_5$ | 130 lbs/AC P$_2$O$_5$ |
| 500 lbs/AC K$_2$O | 140 lbs/AC K$_2$O |
| 250 lbs/AC Mg | 250 lbs/AC Mg |
| 2000 lbs/AC Ca | 2000 lbs/AC Ca |

Noninoculated plants were studied only at high soil fertility.

Foliar fertilization of the soybean plants of this example was commenced at the outset of flowering and continued on a weekly basis until symptoms of senescence were observed. One group of plants was foliarly fertilized with an NPKSFe nutrient solution, another with an NPKSB nutrient solution, a third with an NPKSZn solution, and the fourth with an NPKSMg solution. In each case the nutrient solution was applied as a fine mist to the plant leaves. Compositions of the nutrient solutions are set forth in Table XIV.

TABLE XIV

| Foliar Fertilization Concentrations for Soybean Fertilization Trials | | | | | |
|---|---|---|---|---|---|
| | N | P | K | S | Other |
| NPKS Solution | | | | | |
| Base | 0.27 | 1.00 | 0.99 | 0.01 | — |
| Urea | 1.42 | — | — | — | — |
| (NH$_4$)$_2$SO$_4$ | 0.31 | — | — | 0.36 | — |
| K$_2$SO$_4$ | — | — | 0.51 | 0.21 | — |
| | 2.00 | 1.00 | 1.50 | 0.58 | — |
| NPKSB Solution | | | | | |
| NPKS | 2.00 | 1.00 | 1.50 | 0.58 | — |
| Solubor | — | — | — | — | 0.05 B |
| | 2.00 | 1.00 | 1.50 | 0.58 | 0.05 B |
| NPKS Fe Solution | | | | | |
| NPKS | 2.00 | 1.00 | 1.50 | 0.58 | — |
| Fe Citrate | 0.23 | — | — | — | 0.20 Fe |
| | 2.23 | 1.00 | 1.50 | 0.58 | 0.20 Fe |
| NPKS Zn Solution | | | | | |
| NPKS | 2.00 | 1.00 | 1.50 | 0.58 | — |
| Zn Citrate | 0.24 | — | — | — | 0.35 Zn |
| | 2.24 | 1.00 | 1.50 | 0.58 | 0.35 Zn |
| NPKS Mg Solution | | | | | |
| NPKS | 2.00 | 1.00 | 1.50 | 0.58 | — |
| | 0.003 | — | — | — | 0.30 Mg |
| MgNa$_2$ EDTA | — | — | — | — | 0.60 Na |
| | 2.00 | 1.00 | 1.50 | 0.58 | 0.30 Mg |
| | | | | | 0.60 Na |

After 18 weeks, all plants were harvested and the percent mycorrhizal infection, number of *G. fasiculatum* spores (spores per 100 g soil), total dry weight of plant, root system length, bean pods per plant, and number of nodules of *Rhizodium japonicum* per root system were determined. Results of the measurement of mycorrhizal infection are set forth in Table XV. Measurements of spore production are set forth in Table XVI. Determinations of plant dry weight are set forth in Table XVII. Measurements of soybean root length are set forth in Table XVIII. Observations of nodule development are set forth in Table XIX. And results of bean pod development are set forth in Table XX.

TABLE XV

The Effects of Foliar Fertilizers on Soybean Colonization by *Glomus fasiculatum* (LSD at 5% = 6.0%)

| Fertilizer Treatment | % infection | |
|---|---|---|
| | Inoculated | Noninoculated |
| *High Soil Fertility* | | |
| NKPSZn | 88 | 11 |
| NKPSFe | 81 | 9 |
| NKPSMg | 87 | 19 |
| NPKSB | 85 | 9 |
| *Low Soil Fertility* | | |
| NKPSZn | 84 | — |
| NKPSFe | 92 | — |
| NKPSMg | 90 | — |
| NPKSB | 86 | — |

TABLE XVI

Mycorrhizal Spore Production Following Inoculation and Foliar Fertilization of Soybeans (LSD at 5% = 30 spores)

| Fertilizer Treatment | Spores/100 g Soil | |
|---|---|---|
| | Inoculated | Noninoculated |
| *High Soil Fertility* | | |
| NPKSZn | 130 | 7 |
| NPKSFe | 71 | 8 |
| NPKSMg | 91 | 6 |
| NPKSB | 114 | 3 |
| *Low Soil Fertility* | | |
| NPKSZn | 211 | — |
| NPKSFe | 195 | — |
| NPKSMg | 178 | — |
| NPKSB | 170 | — |

TABLE XVII

Soybean Plant Dry Weight as Influenced by Mycorrhizae and Foliar Fertilization (LSD at 5% = 5.1 gm)

| Fertilizer Treatment | Dry weight (g) | |
|---|---|---|
| | Inoculated | Noninoculated |
| *High Soil Fertility* | | |
| NPKSZn | 54.1 | 39.7 |
| NPKSFe | 55.0 | 33.1 |
| NPKSMg | 36.1 | 23.7 |
| NPKSB | 45.9 | 24.3 |
| *Low Soil Fertility* | | |
| NPKSZn | 48.1 | — |
| NPKSFe | 66.2 | — |
| NPKSMg | 61.8 | — |

TABLE XVII-continued

Soybean Plant Dry Weight as Influenced
by Mycorrhizae and Foliar Fertilization
(LSD at 5% = 5.1 gm)

| Fertilizer Treatment | Dry weight (g) | |
|---|---|---|
| | Inoculated | Noninoculated |
| NPKSB | 60.9 | — |

TABLE XVIII

The Effects of Mycorrhizal Inoculation and
Foliar Fertilization on Soybean Root Length
(LSD at 5% = 2179 cm)

| Fertilizer Treatment | Root length (cm) | |
|---|---|---|
| | Inoculated | Noninoculated |
| *High Soil Fertility* | | |
| NPKSZn | 4854 | 4607 |
| NPKSFe | 3909 | 5836 |
| NPKSMg | 1611 | 1626 |
| NPKSB | 2947 | 5541 |
| *Low Soil Fertility* | | |
| NPKSZn | 7624 | — |
| NPKSFe | 8646 | — |
| NPKSMg | 11312 | — |
| NPKSB | 7537 | — |

TABLE XIX

Foliar Fertilization, Mycorrhizal
Inoculation and Nodule Development on Soybeans
(LSD at 5% = 5.1 g)

| Fertilizer Treatment | Number of root nodules | |
|---|---|---|
| | Inoculated | Noninoculated |
| *High Soil Fertility* | | |
| NPKSZn | 152 | 81 |
| NPKSFe | 209 | 179 |
| NPKSMg | 93 | 45 |
| NPKSB | 152 | 149 |
| *Low Soil Fertility* | | |
| NPKSZn | 144 | — |
| NPKSFe | 260 | — |
| NPKSMg | 246 | — |
| NPKSB | 185 | — |

TABLE XX

The influence of Foliar Fertilization and
Mycorrhizal Inoculation on Number of Bean Pods per Plant
(LSD at 5% = 10 Pods)

| Fertilizer Treatment | Number of Bean Pods | |
|---|---|---|
| | Inoculated | Noninoculated |
| *High Soil Fertility* | | |
| NPKSZn | 101 | 46 |
| NPKSFe | 87 | 67 |
| NPKSMg | 94 | 40 |
| NPKSB | 103 | 43 |
| *Low Soil Fertility* | | |
| NPKSZn | 105 | — |
| NPKSFe | 115 | — |
| NPKSMg | 112 | — |
| NPKSB | 102 | — |

Where inoculum is used, it may be seen that the mycorrhizal colonization, spore production, plant dry weight, root length, nodule development and bean proliferation are all generally higher in low fertility than in high fertility soil. These differences were found to be significant at the 95% confidence level for spore production and root length under treatment with each of the four nutrient solutions. Statistically significant advantages were also observed in low fertility versus high fertility soil for: mycorrhizal colonization utilizing NPKSFe and NPKSMG; plant dry weight using NPKSFe, NPKSMg and NPKSB; and nodule development utilizing NPKSFe, NPKSMg and NPKSB. Although the data did not provide a measure of the effect of inoculation in low fertility soil, a significant improvement in all plant growth parameters was observed to result from inoculation in high fertility soils is with regard to all nutrient mixtures.

EXAMPLE 8

Shortleaf pine seedlings were grown in 450 cc book planters filled with a 1:1 peat/vermiculite growth medium. Half of the seedlings were inoculated with *Pisolithus tinctorius* utilizing 15 cc of vegetative inoculum per container. The other half were left uninoculated. All seedlings received ½ strength Hoagland's solution added to the growth medium at a rate of 35 ml per seedling weekly. The seedlings were divided into twelve fertilizer treatments and replicated three times. Compositions of the nutrient solutions utilized in the test of this example are set forth in Table XXI.

TABLE XXI

Pine Foliar Fertilizer Trials
Foliar Nutrient Solution Composition ppm

| Treatment | N | P | K | S | Mg | B |
|---|---|---|---|---|---|---|
| 1 | 493 | 215 | 409 | 62 | | |
| 2 | 493 | 215 | 409 | 62 | 200 | |
| 3 | 493 | 215 | 409 | 62 | 100 | |
| 4 | 493 | 215 | 409 | 62 | | 25 |
| 5 | 493 | 215 | 409 | 62 | | 50 |
| 6 | 493 | 215 | 409 | 62 | 200 | 50 |
| 7 | 493 | 215 | 409 | 62 | 100 | 50 |
| 8 | 493 | 215 | 409 | 62 | 200 | 25 |
| 9 | 493 | 215 | 409 | 62 | 100 | 25 |
| 10 | 493 | 215 | 409 | 62 | 200 | 50 + (a) |
| 11 | 493 | 215 | 409 | 62 | 200 | 25 + (b) |

| | Zn | Fe | Mn | Cu | Mo |
|---|---|---|---|---|---|
| (a)10 | 187 | 164 | 164 | 23 | 23 |
| (b)11 | 94 | 82 | 82 | 12 | 12 |

As a result of disease which developed and forced premature harvest during the fifteenth week of growth, growth response and percentage infection were not maximized in the study of this example. Nonetheless, upon harvest, measurements were made of stem length and percentage *Pisolithus tinctorius* laterals. This data is set forth in Tables XXII and XXIII.

TABLE XXII

Foliar Fertilization - Pine
Stem Length (cm), 5% LSD = 1.82

| Fertilizer treatment[1] | Inoculated | Noninoculated |
|---|---|---|
| 1 | 13.83 | 10.32 |
| 2 | 13.00 | 10.58 |
| 3 | 12.82 | 9.46 |
| 4 | 12.33 | 10.46 |
| 5 | 13.10 | 11.82 |
| 6 | 14.52 | 11.06 |
| 7 | 12.93 | 11.27 |
| 8 | 13.84 | 11.26 |
| 9 | 14.02 | 9.54 |
| 10 | 14.14 | 12.31 |
| 11 | 13.51 | 11.84 |

[1]Treatments identified in Table XXI.

TABLE XXIII

Foliar Fertilization - Pine
Percent P.t. laterals, 5% LSD = 12.4%

| Fertilizer treatment[1] | Inoculated | (range) | Noninoculated* |
|---|---|---|---|
| 1 | 46.4 | 18–78 | 0.0 |
| 2 | 43.9 | 11–80 | 0.0 |
| 3 | 52.7 | 19–94 | 0.0 |
| 4 | 54.3 | 31–93 | 0.0 |
| 5 | 51.1 | 0–91 | 0.0 |
| 6 | 75.2 | 38–94 | 0.0 |
| 7 | 50.6 | 19–67 | 0.0 |
| 8 | 59.0 | 21–96 | 0.0 |
| 9 | 61.2 | 37–91 | 0.0 |
| 10 | 70.7 | 41–94 | 0.0 |
| 11 | 45.2 | 18–82 | 0.0 |

*Individual plants exhibited scattered mycorrhizal development by unknown "white" mycorrhizal fungus. No P.t. was observed on uninoculated plants.
[1]Treatments identified in Table XXI From this data it will be noted that nutrient solution #6 was associated with a percentage of infection which was significantly greater than any other treatment with the exception of nutrient solution #10.

EXAMPLE 9

Seventy-two Spencer-LeMaire planters, each of which contained four 500 cc seedling cavities, were arranged in four replications on greenhouse benches. Each seedling cavity was filled with a steam-sterilized 1:1 homogeneous mixture of peat moss and vermiculite. Half-sib acorns of white oak (*Quercus alba* L.) were surface sterilized with a 10% (v/v) sodium hypochlorite solution and planted one per cavity at a depth of 1 cm. Germination was complete one week after planting. The seedlings were grown under approximately 65% full sunlight, supplemented with incandescent lights to give a photoperiod of sixteen hours. The ambient air temperature ranged between 22° C. and 32° C.

To determine the effect of foliar treatment with plant growth regulators, eighteen different treatments were randomly assigned to seedlings in a 3×3×2 factorial design (thus providing eight seedlings per treatment per replication). Nine different combinations of varying strengths of gibberellic acids (an approximately 50/50 mixture of GA-4 and GA-7) and [6]N-benzyladenine plant growth regulator solutions were foliarly applied, i.e., 0, 50 and 500 ppm of each growth regulator. At each combination of growth regulator solution strength, two strengths of NPK nutrient solutions were used. Chemical sources of N, P and K were reagent grade ammonium nitrate, urea, phosphorus pentoxide, and potassium chloride. One nutrient solution contained 750 ppm nitrogen, 375 ppm phosphorus, and 375 ppm potassium, while the other contained 375 ppm nitrogen, 187.5 ppm phosphorus, and 187.5 ppm potassium. Deionized water was used in the preparation of all the plant growth regulator and nutrient solutions.

Both the nutrient and plant growth regulator solutions were foliarly applied twice weekly with a pump sprayer which coated the leaves with a fine mist. Misting was discontinued upon the occurrence of dripping, thus minimizing the introduction of nutrients and plant growth regulators into the growth medium. Once a week Hoagland's solution (100 ml) was added to each seedling cavity. The seedlings were irrigated from above with tap water every 48 hours.

Eighteen weeks after germination, all seedlings were removed from the containers and the growth medium washed from the root system. Shoot length and dry weight, root collar diameter, root dry weight, and leaf area were ascertained for each seedling. Leaf surface areas were measured, using a Lambda Model LI-3000 meter. Seedling growth data were subjected to analysis of variance and the least significant difference test at the 95% confidence level.

Set forth in Table XXIV are the averages of the shoot length, shoot weight, root weight, and leaf area data for the two levels of foliar fertilization.

TABLE XXIV

Shoot and Root Growth of Container-Grown White Oak Seedlings Foliar Fertilized With Two NPK Solutions

| | Shoot Length (cm) | Shoot Weight (g) | Root Weight (g) | Leaf Area (cm$^2$) |
|---|---|---|---|---|
| 1500 NPK | 12.1 | 0.50 | 1.94[1] | 696.9 |
| 750 NPK | 11.9 | 0.45 | 1.65 | 663.2 |

[1]Differs significantly at the 0.05 level of probability.
Means based on 144 plants.

No toxicity or leaf necrosis was observed at either fertilizer concentration at any combination of growth regulator solution.

A summary of the effect of the various combinations of growth regulator solution strength on shoot length, root collar diameter and total dry weight is set forth in Table XXV. A graphic summary of the effect of these various treatments on leaf area and root system weight is illustrated in FIG. 1.

TABLE XXV

Shoot Growth and Total Dry Weight of Container-Grown White Oak Seedlings Foliarly Treated with Gibberellic Acid, [6]Benzyladenine, and Two Concentrations of an NPK Solution.

| [6]Benzyladenine (ppm) | 500 | | | 50 | | | 0 | | | |
|---|---|---|---|---|---|---|---|---|---|---|
| GA-4/GA-7 (ppm) | 500 | 50 | 0 | 500 | 50 | 0 | 500 | 50 | 0 | LSD |
| | | | | 1500 ppm NPK | | | | | | |
| Shoot Length (cm) | 9.8[1] | 9.1 | 9.6 | 10.9 | 14.0 | 11.4 | 18.4 | 13.2 | 11.4 | 4.2 |
| Root Collar Diameter (mm) | 0.28 | 0.27 | 0.22 | 0.33 | 0.50 | 0.32 | 0.38 | 0.28 | 0.39 | 0.06 |
| Total Dry Weight (g) | 2.31 | 2.47 | 2.24 | 2.80 | 4.23 | 4.04 | 2.93 | 3.80 | 2.57 | 0.56 |
| | | | | 750 ppm NPK | | | | | | |
| Shoot Length (cm) | 14.2 | 7.9 | 12.4 | 12.4 | 10.0 | 12.4 | 17.2 | 12.1 | 8.7 | 4.1 |
| Root Collar Diameter (mm) | 0.39 | 0.24 | 0.39 | 0.36 | 0.46 | 0.30 | 0.30 | 0.44 | 0.24 | 0.04 |
| Total Dry | 2.40 | 2.41 | 2.59 | 2.47 | 2.79 | 2.55 | 3.37 | 2.92 | 2.78 | 0.50 |

TABLE XXV-continued

Shoot Growth and Total Dry Weight of Container-Grown White Oak Seedlings Foliarly Treated with Gibberellic Acid, [6]Benzyladenine, and Two Concentrations of an NPK Solution.

| [6]Benzyladenine (ppm) | 500 | | | 50 | | | 0 | | | |
|---|---|---|---|---|---|---|---|---|---|---|
| GA-4/GA-7 (ppm) | 500 | 50 | 0 | 500 | 50 | 0 | 500 | 50 | 0 | LSD |
| Weight (g) | | | | | | | | | | |

[1]Means based on 16 plants.

At the 95% confidence level, a significant increase was observed in root collar diameter at high nutrient concentration with both 50 ppm gibberellic acid and 50 ppm N-benzyladenine. The combination of 50 ppm N-benzyladenine and 50 ppm gibberellic acid produced a significant increase in both root collar diameter and total dry weight at the 1500 ppm NPK treatment. At 50 ppm N-benzyladenine without gibberellic acid, a significant increase in total dry weight was observed at the high nutrient concentration level. By contast, both shoot length and root collar diameter were decreased at all levels of gibberellic acid and at the high nutrient concentration where a 500 ppm N-benzyladenine solution was applied. However, 500 ppm N-benzyladenine significantly increased shoot length and root collar diameter when applied in combination with 500 ppm gibberellic acid at the low nutrient concentration.

At high nutrient concentration, foliage applications of 500 ppm gibberellic acid stimulated a significant increase in shoot length in the absence of N-benzyladenine. The 500 ppm gibberellic acid treatment also significantly increased shoot growth at the 500 ppm and zero N-benzyladenine concentrations when combined with application of the low concentration nutrient solution. At the low fertilization level, root collar diameter was significantly increased by all growth regulator treatments except the combination of 500 ppm N-benzyladenine with 50 ppm gibberellic acid.

At the high fertilization level, an increase in root system dry weight and leaf area was observed with the application of 50 ppm N-benzyladenine, either alone or in combination with 50 ppm gibberellic acid. However, the increase obtained by treatment with 50 ppm N-benzyladenine alone was not statistically significant. Significant increases in root dry weight were observed with both 50 ppm N-benzyladenine alone and the combination of 50 ppm of both N-benzyladenine and gibberellic acid. There was little or no influence of foliarly applied plant growth regulators on root system dry weight or leaf area at low nutrient concentrations.

From the results of the studies of this example, it appears that endogenous cytokinins are involved in leaf morphogenesis and development, as well as in stimulating cell division in the root system. The complementary relationship between the root system and leaf area development in seedlings receiving 50 ppm N-benzyladenine supports the hypothesis that endogenous cytokinins play a key regulatory role in the sink-source relationships of nutrient ion and photosynthate distribution. See Menary and Van Staden, "Effect of Phosphorus Nutrition and Cytokinins on Flowering in the Tomato *Lycopersicon esculentum,*" *Mill. Aust. J. Plant Physiol.,* 3:201–205 (1976). The stimulation of shoot elongation through foliar applications of gibberellic acid also supports the hypothesis that endogenous gibberellic acids promote cell extension and division in many plants. See Jones, "Gibberellins: Their Physiological Role", *Ann. Rev. Plant Phsyiol.,* 24: 571–598 (1973).

EXAMPLE 10

Determination of the effect of foliar fertilization on the carbohydrate (sugar) content of the roots of shortleaf pine was carried out in the manner described below.

A Putnam silt loam soil and river sand were sieved using a 10 mm screen and mixed in a ratio of 1 part soil to 2 parts river sand. The resulting medium was analyzed for nutrients. Potassium was measured by flame emission, magnesium and calcium by atomic absorption, nitrogen by the ammonium electrode method of Gallaher et al., "A Simulated Procedure for Total Nitrogen in Plant and Soil Samples", *Soil Science Society of America Journal,* 40:887–880 (1976), phosphorus by the molybdate-blue method of Murphy and Riley, "A Modified Single Solution Method for the Determination of Phosphate in Natural Waters", *Anal. Chem. Acta,* 27:31–36 (1962), and sulfur by the turbidimetric procedure of Blanchar et al. "Sulfur in Plant Materials by Digestion with Nitric and Perchloric Acids", *Sol. Science Society of America Procedures,* 29:71–72 (1965). Results of analysis of the sand/soil mixture is set forth in Table XXVI.

TABLE XXVI

Nutrient Levels In Sand-Soil Mixture as Obtained From Kjeldahl Digest.

| Nutrient | Concentration (mg/kg) |
|---|---|
| N | 700 |
| P | 39 |
| K | 370 |
| Mg | 114 |
| Ca | 1530 |

Four-cavity, Spencer LeMaire book-planters were each filled with 200 g of the aforesaid sand-soil mixture, planted with stratified shortleaf pine seeds (two per cavity) and watered twice daily to facilitate germination. Two weeks after emergence of the pine seedlings, the medium in each cavity was fertilized with 20 ml of modified Hoagland's nutrient solution and this fertilization of the medium was repeated on a weekly basis for a total of eight weeks. In the ninth week, the seedlings were foliarly fertilized using a hand spray gun. Nutrient solution was applied until droplets formed at the ends of the needles, which usually occurred after application of approximately 15–20 ml. Foliar treatments consisted of nitrogen/iron, nitrogen/zinc, nitrogen/magnesium, and boron, the compositions of which are shown in Table XXVII.

TABLE XXVII

Fertilizer Type and Relative Concentration Used in Foliar Fertilization

| Type | Concentration (mg/kg) | |
|---|---|---|
| NFe | 493 ppm N | 170 ppm Fe |

TABLE XXVII-continued

Fertilizer Type and
Relative Concentration Used in Foliar Fertilization

| Type | Concentration (mg/kg) | |
|---|---|---|
| NMg | 493 ppm N | 100 ppm Mg |
| NZn | 493 ppm N | 164 ppm Zn |
| B | 25 ppm | |

Foliar fertilization was carried out twice weekly from week 9 to week 16.

The control seedlings received only weekly application of modified Hoagland's solution to the growth medium in an amount of 20 ml per seedling.

Beginning in the 14th week, samples were collected for carbohydrate assay of the roots. Sampling was continued until week 16. To prevent variation due to sampling time, root samples were collected at 6:00 a.m. every morning.

For purposes of carbohydrate assay, pine seedlings were randomly selected from each treatment, removed from the growth medium, shaken to remove excess medium, quickly rinsed in distilled water at room temperature, and blotted dry with paper toweling. All roots were immediately dipped in liquid nitrogen (or liquid air) to arrest enzymatic activity, comminuted, and either stored in screw cap test tubes or freeze dried.

A 100 mg sample of the comminuted freeze-dried roots of each seedling was placed in a polyethylene centrifuge tube to which a 70% ethanol-water (v/v) solution (20 ml) and a solution of D-glucoheptitol (125 mg equivalent) were added. The resultant mixture was homogenized for three minutes and centrifuged in a refrigerated centrifuge at 10,000 rpm for 15 minutes. The supernatant solution was separated from the solid phase and rotavapored to dryness, leaving a film which was taken up in deionized distilled water (3 ml) and placed in a test tube. Centrifugation was then repeated using a bench centrifuge to pellet-out water insoluble materials. Thereafter, the clear supernatant solution was passed through a cation (H+) and an anion ($CO_3=$) exchange resin (Dowex 8× 100-200 mesh). A neutral eluate containing the free sugars was collected and placed in a 3 ml capacity reacti-vial.

The sample in each reactivial was air dried using a multi-channel laboratory-air supplier. Fructose and glucose contained in the sample were oximated by addition of an oximating cocktail prepared as described by Mawhinney et al., "The Rapid Quantitative Determination of Neutral Sugars (as Aldonitrile Acetates) and Amino Sugars (as O-Methyloxime Acetate) in Glycoproteins by Gas Liquid Chromatagraph" *Anal. Biochem.* 101:112-117 (1980). Oximation was achieved upon heating the sample containing the cocktail at 70° C. for approximately 15 minutes. Subsequently, both the oximated and non-oximated sugars were converted to their trimethylsilyl ethers by successive addition of trimethylsilyl imidazole and N,O-bis(trimethylsilyl)trifluoroacetamide. Silylation occurred upon dissolution at room temperature.

Gas-liquid chromatographic analysis of soluble sugars in the root samples was performed using a Sigma 1 (Perkin-Elmer) gas-liquid chromatograph unit equipped with dual flame ionization detectors. A nickel tube (1.72 m×3.17 mm o.d.) packed with 3% SP2250 DB 100-200 supelcoport (Supelco, Inc., Bellefonte, Pa.) was used for partitioning the sugar components in the sample. Nitrogen at a flow rate of 24 cc/min was used as the carrier gas while hydrogen and oxygen served as fuel gases. The temperature program ranged from 150° C. to 280° C. at a rate of 10° C./min. Total time required from injection to completion of a sample chromatogram was 15 minutes. Injected sample sizes ranged from 2 to 3 microliters. Sample peaks, peak areas, and concentration of component sugars were calculated using an automated printer-plotter-integrator system.

Figure 2:
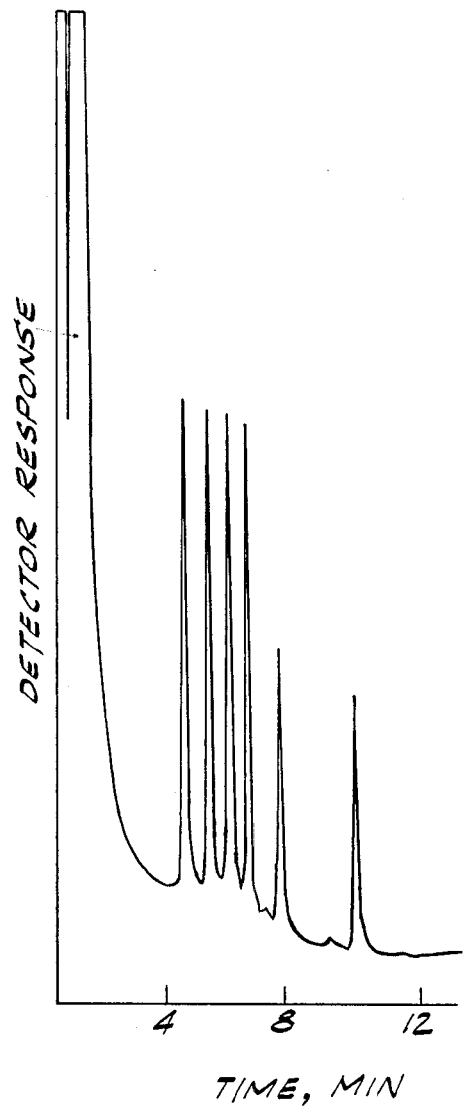
FIG. 2 is a gas-liquid chromatograph of a calibration mix of sugars, used in the determination of the sugar content of the roots of foliarly fertilized shortleaf pine seedlings.
Figure 3:
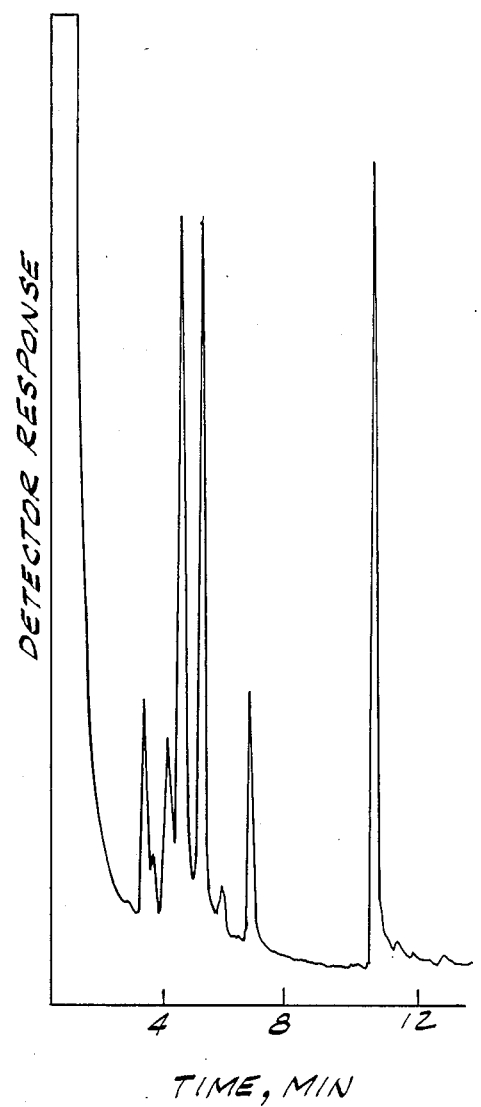
FIG. 3 is a chromatograph showing the distribution of sugars in an extract from the roots of a foliarly fertilized shortleaf pine seedling.

Illustrated in FIG. 2 is a chromatogram of various sugars from a calibration mix. In this chromatogram, the peak designated A is for mannitol, peak B is for fructose, peak C for glucose, peak D for inositol, peak E for D-glucoheptitol (the internal standard), and peak F for sucrose. Illustrated in FIG. 3 is a comparable chromatogram for the extract of a short leaf pine root sample after treatment for 15 weeks with NFe solution in accordance with this example. In the chromatogram of FIG. 3, peak 1 is for pinitol, peaks 2 and 3 for unknown sugars, peak 4 for fructose, peak 5 for glucose, peak 6 for inositol, peak 7 for d-glucoheptitol and peak 8 for sucrose.

A statistical analysis of the data for root sugar content of short leaf pine seedlings is set forth in Table XXVIII for seedlings foliarly fertilized with nitrogen-iron solution, in Table XXIX for seedlings foliarly fertilized with nitrogen-magnesium solution, in Table XXX for seedlings foliarly fertilized with nitrogen-zinc solution, and in Table XXXI for seedlings foliarly fertilized with the boron solution. For purposes of comparison, Table XXXII sets forth a statistical analysis of the root sugars in the control short-leaf pine seedlings, which received only modified Hoagland's nutrient solution to the rooting medium.

TABLE XXVIII

Data of Statistical Analysis for Root
Sugars in Shortleaf Pine Seedlings Foliar-Fertilized With
Nitrogen-Iron

| Date | Mean* | Standard Error Of Mean | Standard Deviation | Coefficient of Variation |
|---|---|---|---|---|
| | | FRUCTOSE | | |
| 1 | 4.4461 | 0.7009 | 1.2139 | 27.30 |
| 2 | 4.0515 | 0.1830 | 0.3170 | 7.82 |
| 3 | 4.9522 | 0.2884 | 0.4976 | 10.02 |
| 4 | 4.6762 | 0.1509 | 0.2613 | 5.58 |
| 5 | 4.9947 | 0.9566 | 1.6568 | 33.17 |
| 6 | 3.2656 | 0.9689 | 1.6782 | 51.39 |
| 7 | 4.5149 | 0.4016 | 0.6956 | 15.40 |
| 8 | 3.9441 | 0.6711 | 1.1625 | 29.47 |
| 9 | 4.2851 | 0.4028 | 0.6977 | 16.28 |
| 10 | 4.7466 | 0.7039 | 1.2193 | 25.68 |
| 11 | 3.8399 | 0.5557 | 0.9626 | 25.06 |
| 12 | 3.6768 | 0.4782 | 0.8282 | 22.52 |
| 13 | 4.2367 | 1.0739 | 1.8599 | 43.90 |
| 14 | 5.7757 | 1.0544 | 1.8262 | 31.61 |
| | | GLUCOSE | | |
| 1 | 3.5429 | 0.5129 | 0.8885 | 25.08 |
| 2 | 3.2161 | 0.0617 | 0.1068 | 3.32 |
| 3 | 3.7092 | 0.3201 | 0.5544 | 14.94 |
| 4 | 3.6169 | 0.1465 | 0.2538 | 7.01 |
| 5 | 3.9155 | 0.7519 | 1.3023 | 33.26 |
| 6 | 2.4609 | 0.7741 | 1.3408 | 54.48 |
| 7 | 3.6086 | 0.2806 | 0.4859 | 13.46 |
| 8 | 2.8237 | 0.3996 | 0.6920 | 24.50 |
| 9 | 2.9776 | 0.1818 | 0.3148 | 10.57 |
| 10 | 3.6420 | 0.6376 | 1.1043 | 30.32 |
| 11 | 2.6920 | 0.3307 | 0.5728 | 21.27 |
| 12 | 2.6093 | 0.5057 | 0.8759 | 29.58 |
| 13 | 3.6210 | 0.7749 | 1.3422 | 37.06 |
| 14 | 5.0921 | 1.0806 | 1.8716 | 36.75 |
| | | SUCROSE | | |
| 1 | 4.2944 | 0.5957 | 1.0318 | 24.02 |
| 2 | 4.2854 | 0.4565 | 0.7907 | 18.45 |

TABLE XXVIII-continued

Data of Statistical Analysis for Root Sugars in Shortleaf Pine Seedlings Foliar-Fertilized With Nitrogen-Iron

| Date | Mean* | Standard Error Of Mean | Standard Deviation | Coefficient of Variation |
|---|---|---|---|---|
| 3 | 5.1439 | 0.5147 | 0.8915 | 17.33 |
| 4 | 3.7798 | 0.4701 | 0.8142 | 21.50 |
| 5 | 1.7261 | 0.1564 | 0.2709 | 15.69 |
| 6 | 4.0199 | 0.9837 | 1.7038 | 42.30 |
| 7 | 5.6399 | 0.3120 | 0.5405 | 9.58 |
| 8 | 5.9477 | 0.2352 | 0.4073 | 6.84 |
| 9 | 3.1816 | 0.3482 | 0.6031 | 18.95 |
| 10 | 4.1197 | 0.6097 | 1.0560 | 25.65 |
| 11 | 4.5189 | 0.8548 | 1.4805 | 32.76 |
| 12 | 5.1517 | 0.6131 | 1.0618 | 20.61 |
| 13 | 3.3284 | 0.0405 | 0.0701 | 2.10 |
| 14 | 2.9722 | 0.5221 | 0.9043 | 30.42 |

*Mean of three replications for mg sugar/g freeze-dried root.

TABLE XXIX

Data of Statistical Analysis for Root Sugars in Shortleaf Pine Seedlings Foliar-Fertilized With Nitrogen-Magnesium

| Date | Mean* | Standard Error Of Mean | Standard Deviation | Coefficient of Variation |
|---|---|---|---|---|
| \multicolumn{5}{c}{FRUCTOSE} |
| 1 | 3.5348 | 0.4064 | 0.7039 | 19.91 |
| 2 | 3.6279 | 0.0613 | 0.1062 | 2.92 |
| 3 | 3.5643 | 0.0323 | 0.0456 | 1.28 |
| 4 | 3.4598 | 0.4118 | 0.7133 | 20.61 |
| 5 | 3.8614 | 0.4464 | 0.7732 | 20.02 |
| 6 | 3.4333 | 0.1136 | 0.1968 | 5.73 |
| 7 | 4.2657 | 0.6229 | 0.8809 | 20.65 |
| 8 | 3.8954 | 0.3642 | 0.6307 | 16.19 |
| 9 | — | — | — | — |
| 10 | 4.1399 | 0.6964 | 1.2062 | 29.13 |
| 11 | 3.3649 | 0.1820 | 0.3153 | 9.37 |
| 12 | 3.8411 | 0.8444 | 1.4625 | 38.07 |
| 13 | 4.1701 | 0.3433 | 0.5945 | 14.25 |
| 14 | 4.2651 | 0.8053 | 1.1388 | 26.70 |
| \multicolumn{5}{c}{GLUCOSE} |
| 1 | 2.7526 | 0.4724 | 0.8183 | 29.72 |
| 2 | 2.7835 | 0.1522 | 0.2636 | 9.47 |
| 3 | 3.2193 | 0.3128 | 0.4423 | 13.73 |
| 4 | 2.5366 | 0.2715 | 0.4703 | 18.53 |
| 5 | 3.1200 | 0.5079 | 0.2933 | 16.28 |
| 6 | 2.7032 | 0.0863 | 0.1495 | 5.53 |
| 7 | 3.4676 | 0.4622 | 0.6536 | 18.84 |
| 8 | 3.0069 | 0.2897 | 0.5018 | 16.68 |
| 9 | — | — | — | — |
| 10 | 3.1468 | 0.5349 | 0.9265 | 29.44 |
| 11 | 2.4347 | 0.0837 | 0.1449 | 5.95 |
| 12 | 3.0713 | 0.7416 | 1.2845 | 41.82 |
| 13 | 3.4555 | 0.2715 | 0.4702 | 13.60 |
| 14 | 3.2167 | 0.6185 | 0.8746 | 27.19 |
| \multicolumn{5}{c}{SUCROSE} |
| 1 | 3.8383 | 0.9089 | 1.5743 | 41.01 |
| 2 | 5.1346 | 0.6161 | 1.0671 | 20.78 |
| 3 | 3.5762 | 1.1287 | 1.5963 | 44.63 |
| 4 | 5.0935 | 0.8562 | 1.4830 | 29.11 |
| 5 | 4.1591 | 0.8105 | 1.4037 | 33.75 |
| 6 | 4.6871 | 0.5212 | 0.9028 | 19.26 |
| 7 | 3.7310 | 0.0171 | 0.0242 | 0.64 |
| 8 | 3.5512 | 0.7540 | 1.3060 | 36.77 |
| 9 | — | — | — | — |
| 10 | 2.7628 | 0.6441 | 1.1156 | 40.37 |
| 11 | 4.0416 | 0.6000 | 1.0393 | 25.71 |
| 12 | 4.2134 | 0.5687 | 0.9849 | 23.37 |
| 13 | 3.2085 | 0.2227 | 0.3856 | 12.01 |
| 14 | 2.9972 | 0.2420 | 0.3422 | 11.41 |

*Mean of three replications for mg sugar/g freeze-dried root.

TABLE XXX

Data of Statistical Analysis for Root Sugars in Shortleaf Pine Seedlings Foliar-Fertilized With Nitrogen-Zinc

| Date | Mean* | Standard Error Of Mean | Standard Deviation | Coefficient of Variation |
|---|---|---|---|---|
| \multicolumn{5}{c}{FRUCTOSE} |
| 1 | 3.1429 | 0.2597 | 0.3672 | 11.68 |
| 2 | 3.6183 | 0.3133 | 0.5427 | 14.99 |
| 3 | 2.0603 | 0.1253 | 0.2170 | 7.09 |
| 4 | 3.7596 | 0.4779 | 0.8277 | 22.01 |
| 5 | 3.6506 | 0.9201 | 1.3012 | 35.64 |
| 6 | 3.3863 | 0.8021 | 1.8927 | 41.02 |
| 7 | 3.8305 | 0.7702 | 1.0892 | 28.43 |
| 8 | 4.2227 | 0.3445 | 0.5967 | 14.13 |
| 9 | — | — | — | — |
| 10 | 2.5991 | 0.0951 | 0.1344 | 5.17 |
| 11 | 2.5241 | 0.3716 | 0.6436 | 25.49 |
| 12 | 4.3725 | 0.5657 | 0.9799 | 22.41 |
| 13 | 4.4645 | 0.5657 | 0.8000 | 17.92 |
| 14 | — | — | — | — |
| \multicolumn{5}{c}{GLUCOSE} |
| 1 | 2.0315 | 0.0573 | 0.0810 | 3.98 |
| 2 | 2.6539 | 0.3090 | 0.5352 | 20.16 |
| 3 | 2.2838 | 0.2278 | 0.3946 | 17.27 |
| 4 | 2.7887 | 0.4982 | 0.8629 | 30.94 |
| 5 | 2.6418 | 0.9100 | 1.2869 | 48.71 |
| 6 | 2.6573 | 0.6978 | 1.2086 | 45.48 |
| 7 | 3.0834 | 0.8121 | 1.1485 | 37.24 |
| 8 | 3.1535 | 0.5147 | 0.8916 | 28.27 |
| 9 | — | — | — | — |
| 10 | 1.8848 | 0.0908 | 0.1285 | 6.81 |
| 11 | 2.0985 | 0.4443 | 0.7694 | 36.67 |
| 12 | 3.2221 | 0.4849 | 0.8400 | 26.07 |
| 13 | 3.3655 | 0.4564 | 0.6454 | 19.17 |
| 14 | — | — | — | — |
| \multicolumn{5}{c}{SUCROSE} |
| 1 | 1.2857 | 0.0836 | 0.1183 | 9.19 |
| 2 | 3.1541 | 0.4247 | 0.7355 | 23.32 |
| 3 | 4.2998 | 0.2609 | 0.4518 | 10.50 |
| 4 | 4.1185 | 0.5318 | 0.9211 | 22.36 |
| 5 | 5.4461 | 0.9088 | 1.2852 | 23.59 |
| 6 | 3.3883 | 0.3565 | 0.6175 | 18.22 |
| 7 | 3.1891 | 0.7584 | 1.0725 | 33.63 |
| 8 | 3.9956 | 0.2957 | 0.5121 | 12.81 |
| 9 | — | — | — | — |
| 10 | 2.5955 | 1.0813 | 1.5292 | 33.27 |
| 11 | 3.1704 | 0.5066 | 0.8774 | 27.67 |
| 12 | 3.4701 | 0.4673 | 0.8128 | 23.42 |
| 13 | 3.1694 | 0.3542 | 0.5009 | 15.80 |
| 14 | — | — | — | — |

*Mean of three replications for mg sugar/g freeze-dried root.

TABLE XXXI

Data of Statistical Analysis for Root Sugars in Shortleaf Pine Seedlings Foliar-Fertilized With Boron

| Date | Mean* | Standard Error Of Mean | Standard Deviation | Coefficient of Variation |
|---|---|---|---|---|
| \multicolumn{5}{c}{FRUCTOSE} |
| 1 | 3.9228 | 0.8278 | 1.4339 | 36.55 |
| 2 | 4.7704 | 0.1617 | 0.2801 | 5.87 |
| 3 | 3.3654 | 1.3723 | 2.3771 | 70.63 |
| 4 | 5.3882 | 0.3882 | 0.5489 | 10.18 |
| 5 | 5.7465 | 0.1221 | 0.2116 | 3.68 |
| 6 | 5.1000 | 0.4914 | 0.8511 | 10.68 |
| 7 | 4.8850 | 0.3373 | 0.5842 | 12.00 |
| 8 | 4.9582 | 0.1885 | 0.3266 | 6.58 |
| 9 | 3.4608 | 0.5381 | 0.9321 | 26.93 |
| 10 | 4.3309 | 0.1667 | 0.2887 | 6.66 |
| 11 | 4.0650 | 0.3691 | 0.6393 | 15.72 |
| 12 | 5.1555 | 0.5206 | 0.9017 | 17.49 |
| 13 | 5.9759 | 0.8590 | 1.4878 | 24.89 |
| 14 | 5.2563 | 0.3231 | 0.5595 | 10.64 |
| \multicolumn{5}{c}{GLUCOSE} |
| 1 | 3.0157 | 0.5886 | 1.0196 | 33.80 |
| 2 | 3.8291 | 0.1171 | 0.2028 | 5.29 |
| 3 | 4.3578 | 0.5293 | 0.9168 | 21.03 |

TABLE XXXI-continued

Data of Statistical Analysis for Root Sugars in Shortleaf Pine Seedlings Foliar-Fertilized With Boron

| Date | Mean* | Standard Error Of Mean | Standard Deviation | Coefficient of Variation |
|---|---|---|---|---|
| 4 | 4.3251 | 0.1299 | 0.1836 | 4.24 |
| 5 | 4.5053 | 0.1193 | 0.2066 | 4.58 |
| 6 | 4.3646 | 0.3468 | 0.6006 | 13.76 |
| 7 | 3.6814 | 0.1824 | 0.3159 | 8.58 |
| 8 | 3.7042 | 0.2100 | 0.3638 | 9.82 |
| 9 | 2.6578 | 0.3812 | 0.6603 | 24.84 |
| 10 | 3.3032 | 0.0847 | 0.1467 | 4.44 |
| 11 | 3.2179 | 0.3876 | 0.6713 | 20.86 |
| 12 | 4.4591 | 0.5399 | 0.9352 | 20.97 |
| 13 | 4.7485 | 0.7006 | 1.2136 | 25.55 |
| 14 | 4.1267 | 0.1219 | 0.2112 | 5.11 |
| SUCROSE | | | | |
| 1 | 0.7707 | 0.0381 | 0.0659 | 8.55 |
| 2 | 1.6975 | 0.2594 | 0.4493 | 26.4 |
| 3 | 2.2109 | 0.4399 | 0.7619 | 34.4 |
| 4 | 1.2792 | 0.7424 | 1.0498 | 82. |
| 5 | 1.1872 | 0.1253 | 0.2169 | 18.2 |
| 6 | 1.9386 | 0.4212 | 0.7295 | 37.6 |
| 7 | 1.6765 | 0.6130 | 1.0618 | 63.33 |
| 8 | 1.8111 | 0.5329 | 0.9230 | 50.9 |
| 9 | 1.1937 | 0.5550 | 0.9614 | 80.55 |
| 10 | 2.0183 | 0.0211 | 0.0366 | 1.81 |
| 11 | 2.6851 | 0.2494 | 0.4319 | 16.08 |
| 12 | 1.5909 | 0.5123 | 0.8872 | 55.7 |
| 13 | 1.3838 | 0.2023 | 0.3503 | 25.3 |
| 14 | 1.4200 | 0.2646 | 0.4584 | 32.2 |

*Mean of three replications for mg sugar/g freeze-dried root.

TABLE XXXII

Data of Statistical Analysis for Root Sugars in Shortleaf Pine Seedlings Grown With Application of Modified Hoagland's Nutrient Solution in Their Rooting Medium

| Date | Mean* | Standard Error Of Mean | Standard Deviation | Coefficient of Variation |
|---|---|---|---|---|
| 1 | 3.7557 | 0.2897 | 0.5018 | 13.36 |
| 2 | 5.0446 | 0.3148 | 0.5453 | 10.81 |
| 3 | 4.5767 | 0.5558 | 0.6163 | 13.46 |
| 4 | 4.8068 | 0.2800 | 0.4850 | 10.09 |
| 5 | 4.8964 | 0.1080 | 0.1871 | 3.82 |
| 6 | 5.9668 | 0.8035 | 1.3917 | 23.32 |
| 7 | 5.8231 | 0.2452 | 0.4246 | 7.29 |
| 8 | 7.3856 | 0.9007 | 1.5601 | 21.12 |
| 9 | 5.9714 | 0.6799 | 1.777 | 19.72 |
| 10 | 5.0194 | 1.3768 | 2.3847 | 47.51 |
| 11 | 5.1215 | 0.5579 | 0.9665 | 18.87 |
| 12 | 4.7327 | 0.8704 | 1.5076 | 31.85 |
| 13 | 5.9079 | 0.4581 | 0.7934 | 13.43 |
| 14 | 4.7887 | 0.5713 | 0.9896 | 20.66 |
| GLUCOSE | | | | |
| 1 | 3.1834 | 0.2667 | 0.4620 | 14.51 |
| 2 | 3.9278 | 0.2516 | 0.4358 | 11.09 |
| 3 | 3.6826 | 0.3119 | 0.5403 | 14.67 |
| 4 | 3.8144 | 0.2721 | 0.4712 | 12.35 |
| 5 | 3.7468 | 0.1025 | 0.1775 | 4.73 |
| 6 | 4.7899 | 0.7068 | 1.2241 | 25.55 |
| 7 | 4.5963 | 0.3000 | 0.5197 | 11.30 |
| 8 | 6.1201 | 1.1732 | 2.0321 | 33.20 |
| 9 | 4.9526 | 0.6516 | 1.1287 | 22.79 |
| 10 | 4.1771 | 1.1749 | 2.0349 | 48.71 |
| 11 | 4.3474 | 0.6009 | 1.0408 | 23.94 |
| 12 | 3.7946 | 0.7389 | 1.2799 | 33.73 |
| 13 | 4.6678 | 0.3248 | 0.5626 | 12.05 |
| 14 | 4.1371 | 0.3466 | 0.6004 | 14.51 |
| SUCROSE | | | | |
| 1 | 1.3576 | 0.4382 | 0.7590 | 55.90 |
| 2 | 2.6659 | 0.1534 | 0.2657 | 9.95 |
| 3 | 1.7729 | 0.2721 | 0.4714 | 26.58 |
| 4 | 2.1528 | 0.3245 | 0.5622 | 26.11 |
| 5 | 2.3229 | 0.4532 | 0.7849 | 33.79 |
| 6 | 2.4589 | 0.5707 | 0.9885 | 40.20 |
| 7 | 1.9525 | 0.4775 | 0.8271 | 42.36 |
| 8 | 1.5742 | 0.1688 | 0.2924 | 18.57 |
| 9 | 1.3654 | 0.5412 | 0.9375 | 68.65 |
| 10 | 1.5438 | 0.2503 | 0.4335 | 28.08 |
| 11 | 1.2783 | 0.0739 | 0.1279 | 10.01 |
| 12 | 2.0637 | 0.7104 | 1.2300 | 59.60 |
| 13 | 1.2938 | 0.0852 | 0.1476 | 11.41 |
| 14 | 2.3552 | 0.1319 | 0.2285 | 9.70 |

*Mean of three replications for mg sugar/g freeze-dried root.

Figure 4:
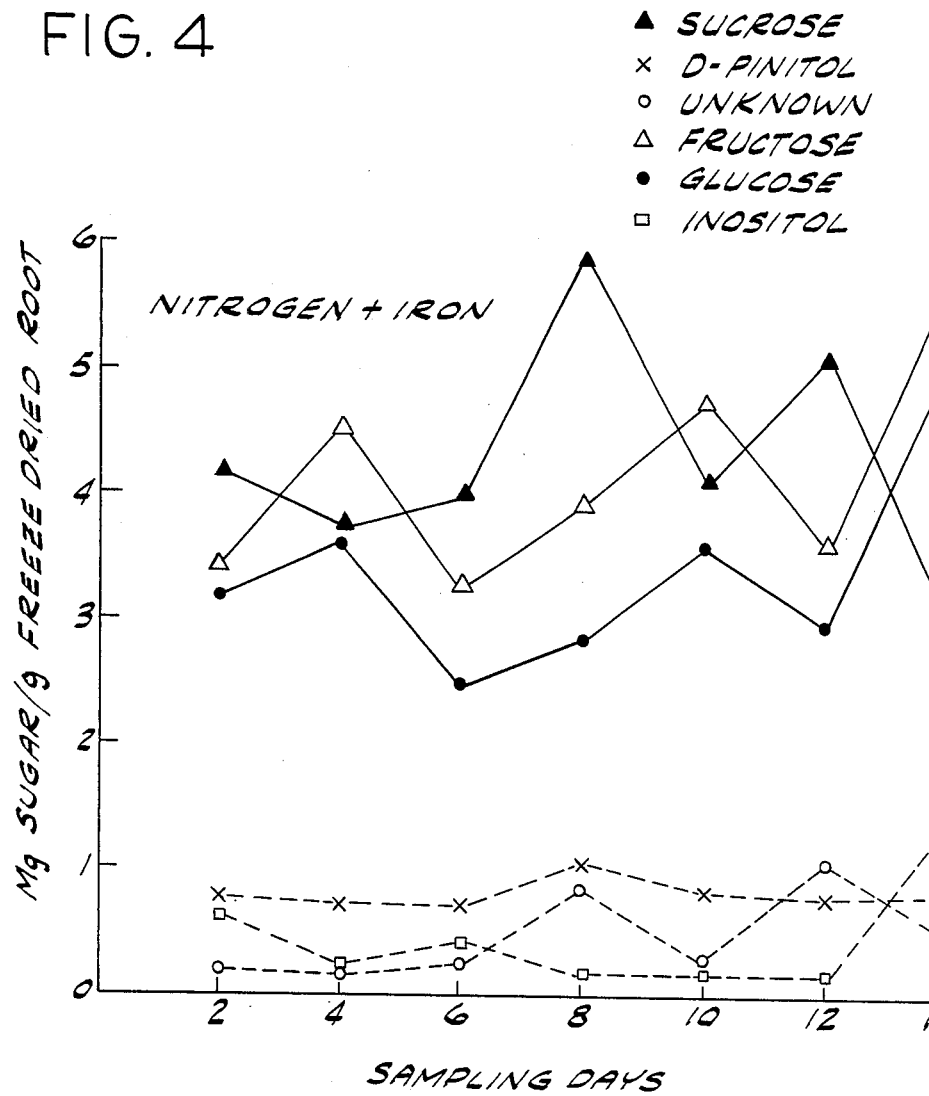
FIG. 4 is a plot of the average sugar content of the freeze dried roots of shortleaf pine seedlings as a function of sampling day for seedlings foliarly fertilized with a nitrogen-iron solution.
Figure 5:
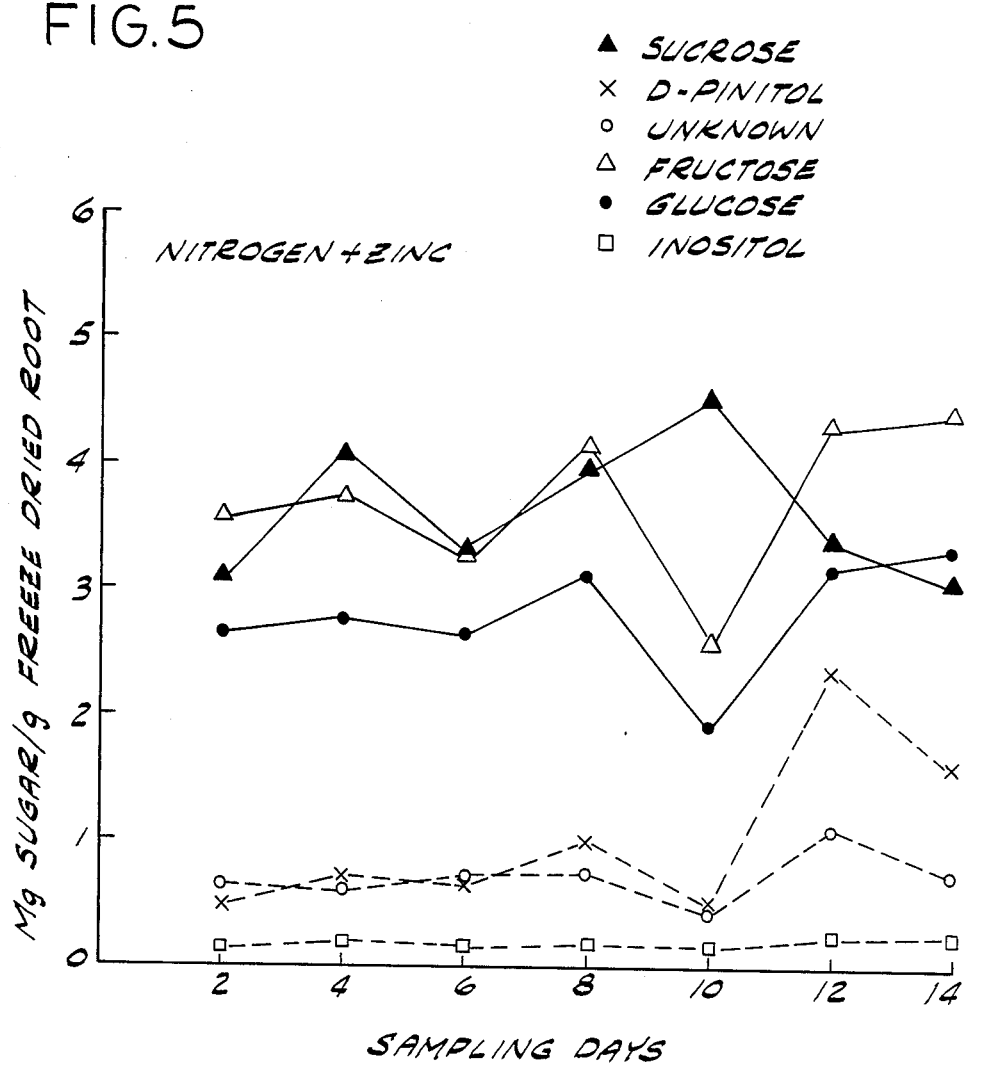
FIGS. 5 through 8 present data comparable to FIG. 4 for shortleaf pine seedlings foliarly fertilized with nitrogen-zinc solution, nitrogen-magnesium solution and boron solution, and via the growth medium with Hoagland's solution respectively.
Figure 6:
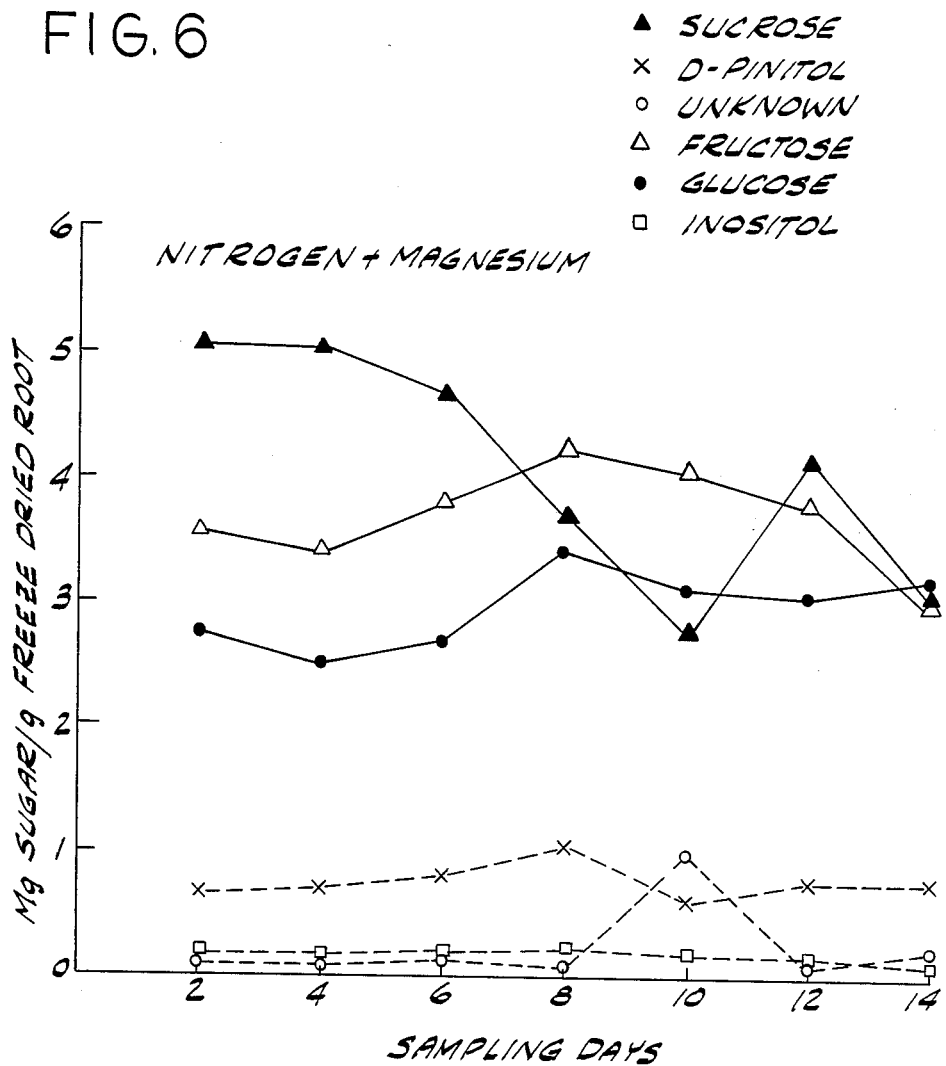
Figure 7:
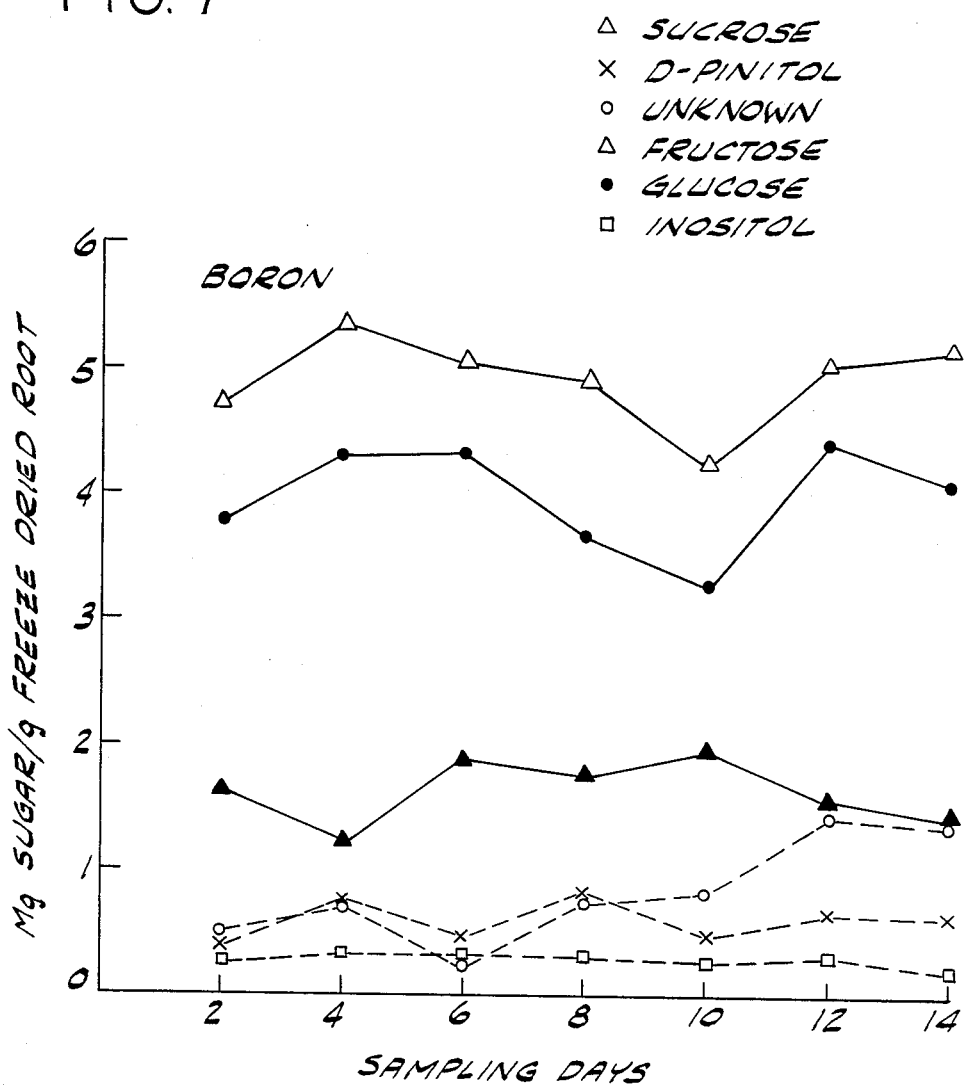
Figure 8:
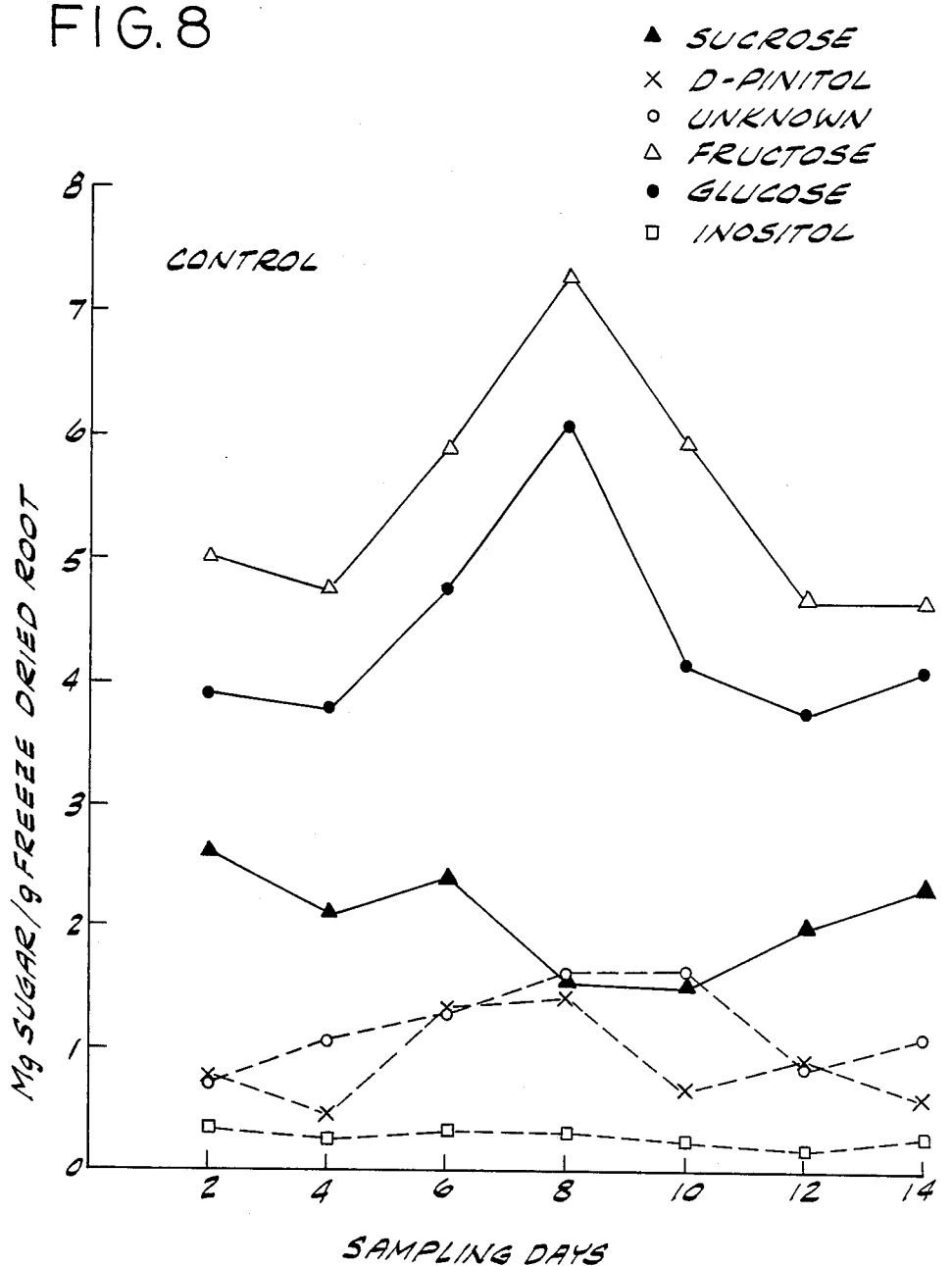
Figure 9:
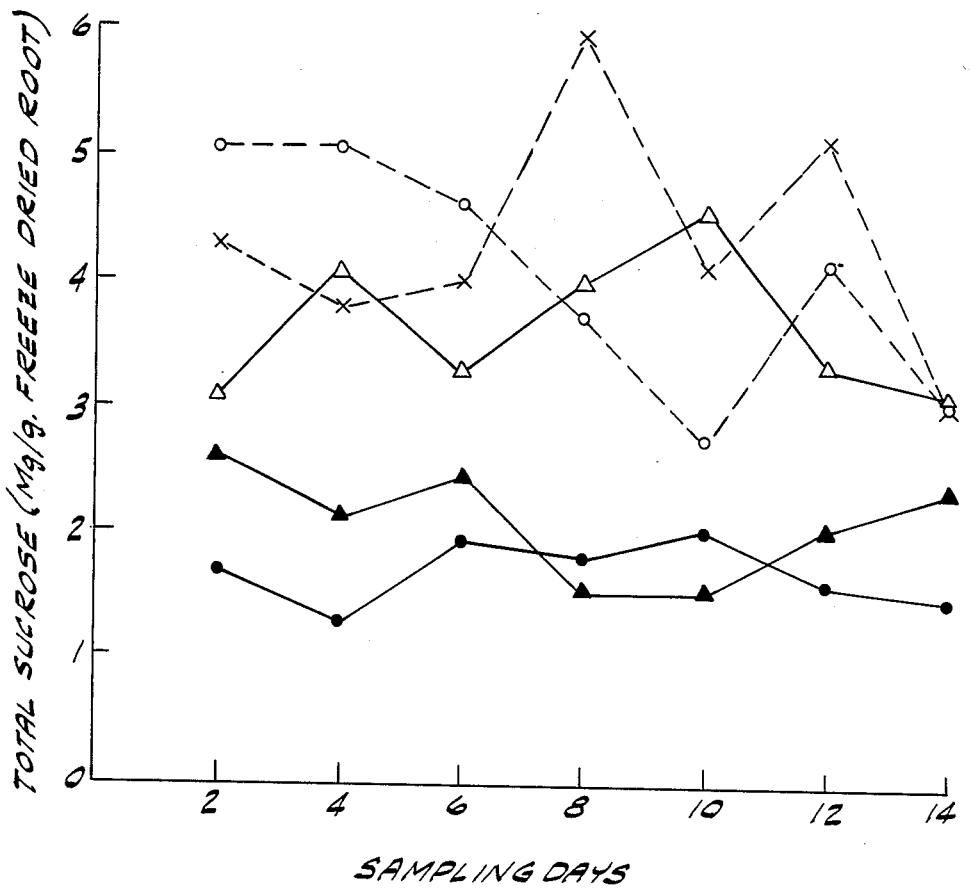
FIG. 9 comprises a series of plots of the sucrose content of roots of shortleaf pine seedlings as a function of sampling day for seedling subjects to various nutrient treatments.
Figure 10:
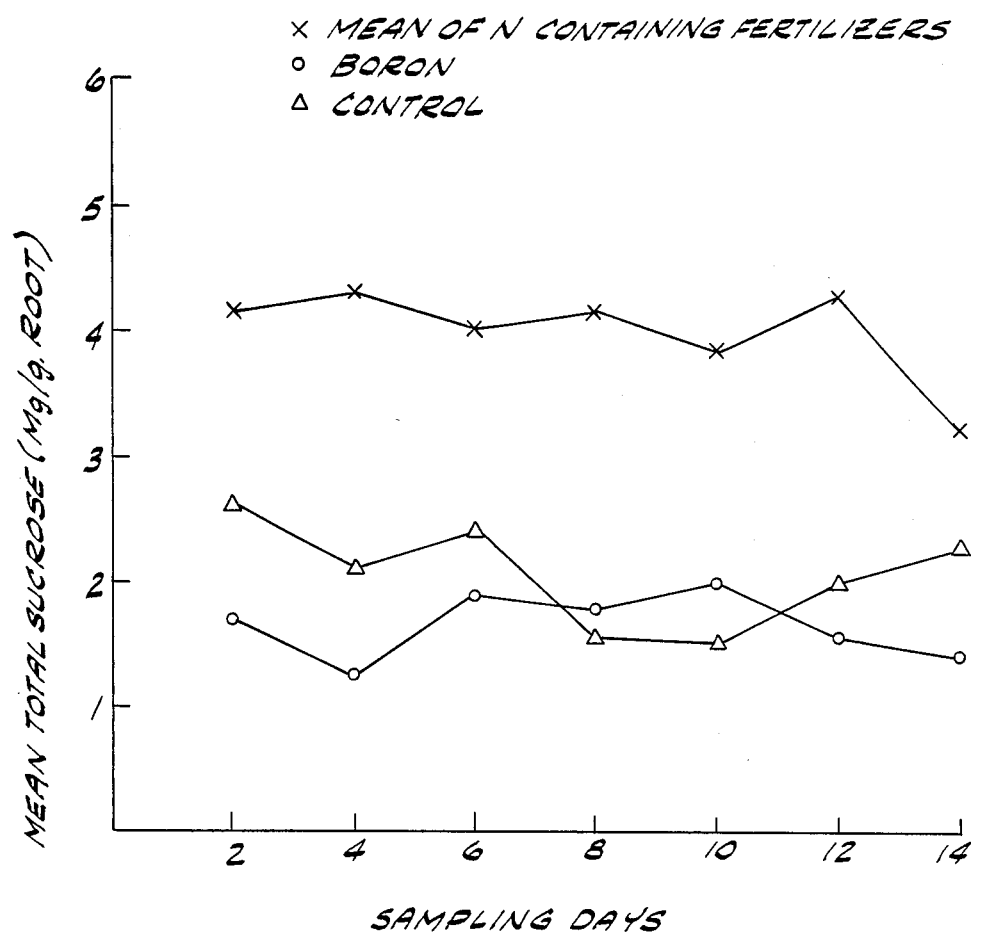
FIG. 10 comprises a series of plots of mean sucrose content vs. sampling day for shortleaf pine seedlings respectively subjected to foliar fertilization with various nitrogen solutions, foliar fertilization with boron solution, and fertilization via the growth medium with Hoagland's solution.
Figure 11:
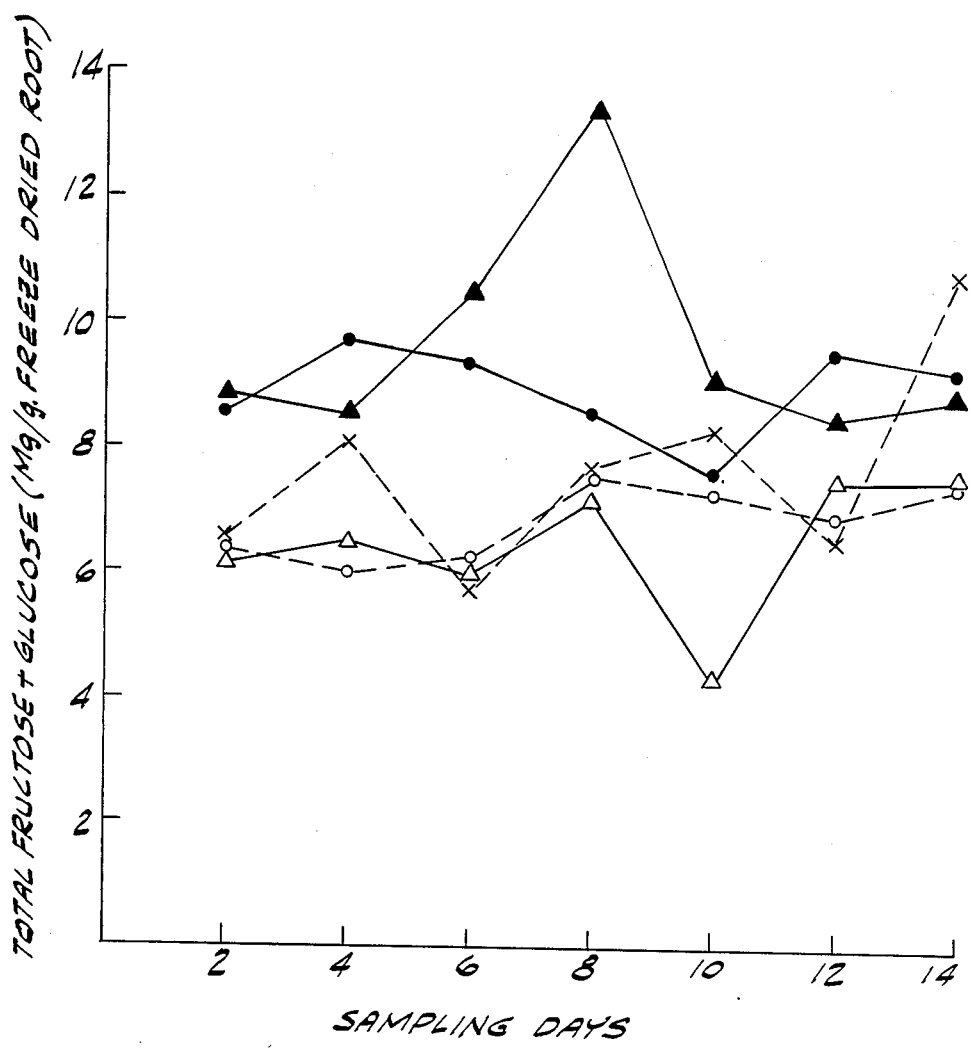
FIG. 11 is a comparative plot of total fructose and glucose content as a function of sampling day for shortleaf pine seedlings subjected to various foliar fertilization treatments and treatment only of the growth medium with Hoagland's solution.
Figure 12:
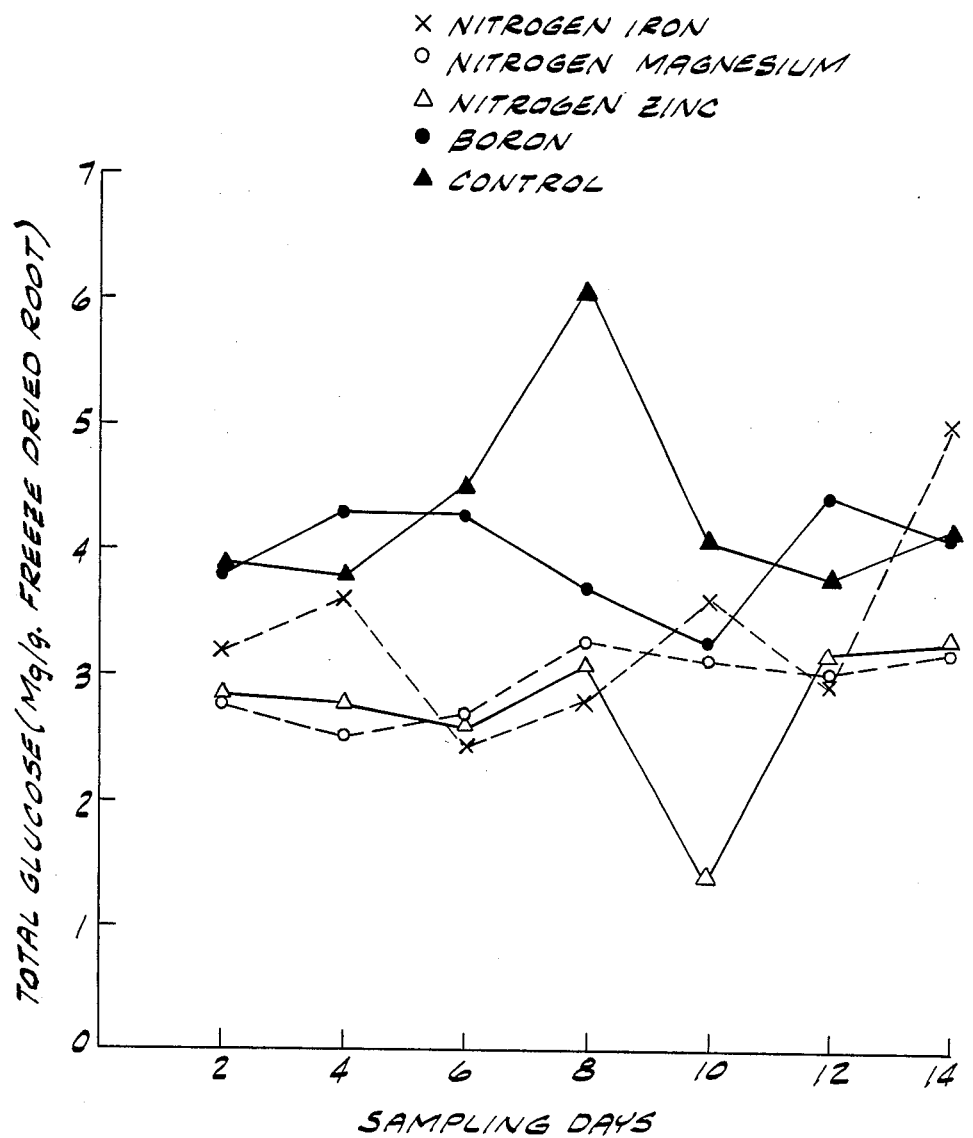
FIG. 12 is a plot similar to FIG. 11, but for glucose only.
Figure 13:
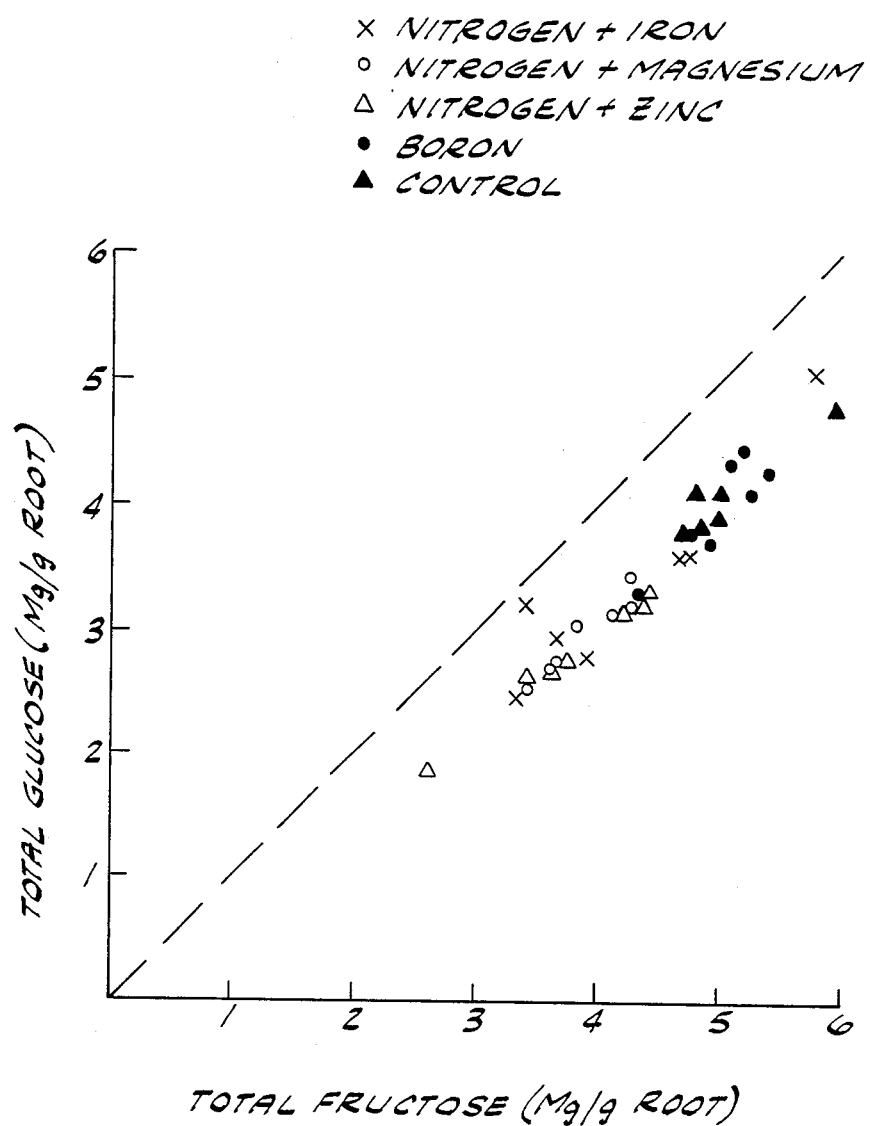
FIG. 13 is a cross-plot showing the total glucose content vs. total fructose content for foliarly fertilized shortleaf pine seedlings, with points labeled to indicate the particular nutrient application for the seedlings from which the points were taken.

FIG. 4 is a plot of the sugar content of freeze-dried root as a function of sampling day for pine seedlings foliarly fertilized with nitrogen-iron solution. Comparable data for nitrogen-zinc solution, nitrogen-magnesium solution, boron solution, and the control seedlings is set forth in FIGS. 5 through 8, respectively. Comparative plots of sucrose content against sampling day for the various nutrient systems are set forth in FIG. 9. FIG. 10 contains a plot of the mean total sucrose content for the roots of shortleaf pine seedlings foliarly fertilized with nitrogen-iron, nitrogen-magnesium, and nitrogen-zinc together with comparative data for seedlings foliarly fertilized with boron solution, and seedlings treated only by fertilization of the growth medium with Hoagland's solution. FIG. 11 is a comparative plot showing total glucose plus fructose content of the roots as a function of sampling day for seedlings subjected to the various treatments of this example, while FIG. 12 shows the same data as FIG. 11 but for glucose only. FIG. 13 is a cross-plot showing total glucose content versus total fructose content of the roots with points labeled to indicate the particular nutrient applications for the seedlings from which the points were taken. FIGS. 14a–e present a series of cross-plots showing a slight negative correlation between total sucrose content and total fructose plus glucose content for seedlings subjected to the various nutrient applications of this example.

EXAMPLE 11

A study was carried out on the relationship between foliar fertilization and growth, mycorrhizal development and carbohydrate and cytokinin relationships of containerized rough lemon seedlings.

A loamy sand containing 11 ppm phosphorus, as determined by Bray II analysis, was sterilized with Dowfume MC-2 (98% methyl bromide, 2% chloropicrin; 680 g/m$^3$) as provided by Dow Chemical Company of Midland, Michigan. Phosphorus in the form of finely ground superphosphate, i.e. $Ca(H_2PO_4)_2 \cdot H_2O$ was incorporated into the soil at a concentration of 30 ppm. Containers were filled with this soil as a potting medium. The soil in certain of the containers was inoculated with about three spores of per gram *G. fasiculatum*. The remaining containers were left uninoculated but received a sieved inoculum leachate in order to standarize associated microflora.

Sterilized pre-germinated rough lemon seeds were sown in the containers and maintained in a glasshouse under a 16-hour photoperiod (700 E/m$^2$/s) supported by high intensity sodium lamps. Ambient glasshouse temperature was maintained in the range of 28°–32° C. during the daytime and 22°–25° C. at night. Water was maintained near field capacity in the potting medium which was supplemented with 50 ml per seedling of one-half concentration Hoagland's nutrient solution (minus phosphorus).

Following emergence of the first full flush of leaves, one half of both the inoculated and uninoculated seedlings were subjected to foliar fertilization with an NPKSMg solution which had been determined earlier to maximize the extent of mycorrhizal colonization. The foliar nutrient composition comprised 1750 ppm nitrogen, 1250 ppm phosphorus, 1250 ppm potassium, 600 ppm sulfur, and 300 ppm magnesium, respectively. The solution contained nitrogen in the form of ammonium and nitrate ions, phosphorus as $K_2HPO_4.3H_2O$, potassium and sulfur as $K_2SO_4$ and magnesium as $Mg(HO_3)_2.6H_2O$. Foliar nutrient solutions were applied twice weekly with a pump atomizer which coated the seedlings with a fine spray mist. Both abaxial and adaxial leaf surfaces were misted. Misting was discontinued upon occurrence of drip, thus minimizing movement of nutrients into the growth medium.

During the period of the foliar fertilization trials of this example, the pH of the soil in the various propagation beds ranged from 5.5-7.0 and the phosphorus content progressively decreased from 34.8 to 20 parts per million. Nitrate nitrogen, potassium, sodium, magnesium, calcium, iron, manganese, zinc, and copper contents of the medium were 6.8, 36, 3.5, 40, 112, 9.4, 2.1, 1.1 and 0.7 ppm, respectively. Organic matter content exclusive of inoculum and sieved inoculum leachate was 0.5% of the potting media.

There were about 25 seedlings in each treatment combination, i.e. foliar fertilized inoculated; foliar fertilized uninoculated; no foliar fertilizer inoculated; no foliar fertilizer uninoculated. Beginning with the initiation of foliar fertilization of the seedlings, two plants per application were harvested at weekly intervals for four weeks to assess seedling total dry weight, percent vesicular arbuscular (VA) endomycorrhizal infection, and phosphorus, starch, reducing sugar, total sugar, and cytokinin content of the roots and the leaves. In addition, root exudations of amino acids, reducing sugars, and total sugars were measured weekly on two seedlings per replication.

During each weekly harvest of the seedlings, one gram of freshly harvested root and leaf tissue was homogenized in absolute alcohol and the resultant extract centrifuged for 15 minutes at 10,000 rpm. Aliquots of the supernatant were tested for starch, glucose, total sugar and cytokinin content. Seedling dry weight was determined after oven-drying at 80° C. for 24 hours. Phosphorus content of leaves and roots was determined with a Jerrel-Ash 975 ATOM-COMP inductively-coupled plasma spectrophotometer following nitric/perchloric acid wet digestion of tissue. VA mycorrhizal development was also assessed.

Collection of root exudates was accomplished by carefully removing each seedling from the potting medium and carefully washing soil from the root system. Each such plant was immediately placed in a 30 ml test tube with roots submerged in an aerated 0.05M $CaSO_4$ solution containing 0.05 g/l gentamicin (Sigma Chemical Company, St. Louis, Missouri) and incubated for two hours. Antibiotics were found to virtually eliminate bacterial populations. After antibiotic treatment, the roots were rinsed in 0.05M $CaSO_4$ and then allowed to stand in 25 ml of fresh 0.05M $CaSO_4$ for 22 hours in continuous light at 23° C. to 28° C. The plants were thereafter removed from the test tubes and the fresh weight of the roots determined. The exudate solution was immediately passed through a 0.45 μm filter to remove debris. The filtered solution was tested for total amino acids and reducing sugars. These analytical procedures were performed in duplicate for each replicate sample. Concentrations of amino acids and reducing sugars were expressed as mg equivalents of leucine and glucose, respectively, per gram of leaf or root tissue.

Seedling growth, VA mycorrhizal development, carbohydrate and cytokinin content of leaves and roots, and reducing sugar content of root exudates were statistically analyzed using analysis of variance. Weekly harvests were analyzed as split-plots in time.

After four weeks of growth, significant differences in size appeared among the rough lemon seedlings. These differences were closely associated with the amount of VA mycorrhizal development. Set forth in Table XXXIII are total dry weight, percent mycorrhizal infection, reducing sugar exudate and amino acid exudate for the various combinations of treatment at each of weeks 1-4. From this table it may be seen that, after two weeks, seedlings inoculated with *G. fasiculatum* were twice as large as uninoculated seedlings. Foliar fertilization significantly increased VA cychorrhizal development on the inoculated seedling during the third and fourth week of study. Uninoculated seedlings did not develop any VA mychorrhizae.

A trend of increasing amounts of reducing sugar and amino acid exudation by the foliar fertilized seedling was evident during the second sample period. During the third sample period, roots of the uninoculated seedlings exuded five times more reducing sugars and over four times more amino acids than inoculated seedlings regardless of foliar fertilization treatment. Greater amounts of amino acid and reducing sugar exudation by the uninoculated seedlings were also evident after four weeks. However, the levels of exudation had declined over time. This data suggests that root exudates in the rhizosphere stimulate the growth and development of mycorrhizal fungi propagules, leading to greater root penetration by the fungi, after which the fungi provide an alternative sink so that exudation decreases.

TABLE XXXIII

Total Dry Weight, Percentage Vesicular-Arbuscular (VA) Mycorrhizal Development, and Amino Acid and Reducing Sugar Content of Root Exudates of *G. fasiculatum* Inoculated (VAM) and Uninoculated (—) Rough Lemon Seedlings With (ff) and Without (—) Foliar Fertilization During Infection Process (Experiment I, Weeks 1-4)

| | Total Dry Weight | VA Mycorrhizae % | Root Exudates Reducing Sugar (mg/g) | Amino Acid (mg/l) |
|---|---|---|---|---|
| WEEK 1 | | | | |
| VAM ff | 0.1a[1] | 0.0a | 0.3a | 3.8a |
| VAM — | 0.1a | 0.0a | 0.4a | 2.9a |
| — ff | 0.1a | 0.0a | 0.3a | 3.7a |
| — — | 0.1a | 0.0a | 0.4a | 2.4a |
| WEEK 2 | | | | |
| VAM ff | 0.3a | 16.2a | 0.6a | 2.7ab |
| VAM — | 0.3a | 14.9a | 0.4b | 1.9b |
| — ff | 0.1b | 0.0b | 0.6a | 3.6a |
| — — | 0.1b | 0.0b | 0.6a | 3.1ab |
| WEEK 3 | | | | |
| VAM ff | 0.5a | 25.7a* | 0.1a* | 0.3b* |
| VAM — | 0.4a | 20.1b* | 0.1a* | 0.1b |
| — ff | 0.2b | 0.0c | 0.5b | 1.4a |
| — — | 0.2b | 0.0c | 0.5b | 1.2a |
| WEEK 4 | | | | |

TABLE XXXIII-continued

Total Dry Weight, Percentage Vesicular-Arbuscular (VA) Mycorrhizal Development, and Amino Acid and Reducing Sugar Content of Root Exudates of *G. fasiculatum* Inoculated (VAM) and Uninoculated (—) Rough Lemon Seedlings With (ff) and Without (—) Foliar Fertilization During Infection Process (Experiment I, Weeks 1–4)

|  | Total Dry Weight | VA Mycorrhizae % | Root Exudates | |
|---|---|---|---|---|
|  |  |  | Reducing Sugar (mg/g) | Amino Acid (mg/l) |
| VAM ff | 0.8a*[2] | 34.7a | 0.1a | 0.2bc |
| VAM — | 0.6a | 28.2b | 0.1a | 0.1c |
| — ff | 0.3b | 0.0c | 0.3b | 0.4b |
| — — | 0.3b | 0.0c | 0.4b | 0.8a |

[1]Each value represents the mean of eight determinations. Values within a row and week not followed by a common letter are significantly different (P = 0.05).
[2]Within a row, each weekly mean with an asterisk (*) superscript is significantly different than the mean from previous weekly determination (P = 0.05).

Set forth in Table XXXIV are the reducing sugar, total soluble sugar, starch and phosphorus contents of the roots for weeks 1–4 of the trials of this example. Comparable data for the reducing sugar, total soluble sugar, starch and phosphorus content of the rough lemon seedling leaves is set forth in Table XXXV. In contrast to the trend for soluble carbohydrates, the starch content of the roots of inoculated seedlings was significantly lower following the formation of VA mychorrizae. Foliar fertilization generally increased levels of reducing sugars and total soluble sugars in the roots, regardless of inoculation treatment. As a probable result of VA mycorrhizae infection, there were significant increases in phosphorus content of roots when compared to uninoculated controls after three weeks.

TABLE XXXIV

Reducing Sugar, Total Soluble Sugar, Starch, and Phosphorus Content of Roots From *G. fasiculatum* Inoculated (VAM) and Uninoculated (—) Rough Lemon Seedlings With (ff) and Without (—) Foliar Fertilization During Infection Process (Experiment I, Weeks 1–4)

|  | Reducing Sugar (mg/g fw) | Total Soluble Sugar (mg/g fw) | Starch (mg/g fw) | Phosphorus (% d. wt.) |
|---|---|---|---|---|
| WEEK 1 |  |  |  |  |
| VAM ff | 1.7a[1] | 3.6a | 3.1a | 0.1a |
| VAM — | 1.8a | 3.4a | 2.9a | 0.1a |
| — ff | 1.5a | 3.7a | 2.8a | 0.1a |
| — — | 1.6a | 3.3a | 3.0a | 0.1a |
| WEEK 2 |  |  |  |  |
| VAM ff | 3.9a | 12.6a* | 5.4b | 0.1a |
| VAM — | 3.4a | 9.1b | 5.6ab | 0.1a |
| — ff | 2.6ab | 7.8b | 6.9a* | 0.1a |
| — — | 1.9b | 4.9c | 6.8a | 0.1a |
| WEEK 3 |  |  |  |  |
| VAM ff | 9.6a*[2] | 17.4a | 14.2b* | 0.2a* |
| VAM — | 8.9a* | 16.1a* | 14.1b* | 0.2a* |
| — ff | 6.4b | 15.7a | 16.8a* | 0.1a |
| — — | 5.8b | 15.8a | 17.5a* | 0.1a |
| WEEK 4 |  |  |  |  |
| VAM ff | 13.7a | 29.4a* | 20.7b* | 0.2a |
| VAM — | 13.1a | 27.8a* | 21.5b* | 0.2a |
| — ff | 10.1b | 25.2b* | 30.7a* | 0.2a |
| — — | 9.7b | 26.6b* | 29.2a* | 0.1b |

[1]Each value represents the mean of eight determinations duplicated two times. Values within a row and week not followed by a common letter are significantly different (P = 0.05).
[2]Within a row, each weekly mean with an asterisk (*) superscript is significantly different than the mean from previous weekly determination (P = 0.05).

TABLE XXXV

Reducing Sugar, Total Soluble Sugar, Starch, and Phosphorus Content of Leaves From *G. fasiculatum* Inoculated (VAM) and Uninoculated (—) Rough Lemon Seedlings With (ff) and Without (—) Foliar Fertilization During Infection Process (Experiment I, Weeks 1–4)

|  | Reducing Sugar (mg/g fw) | Total Soluble Sugar (mg/g fw) | Starch (mg/g fw) | Phosphorus (% d. wt.) |
|---|---|---|---|---|
| WEEK 1 |  |  |  |  |
| VAM ff | 3.5a[1] | 4.6a | 4.6a | 0.1a |
| VAM — | 3.8a | 4.7a | 5.1a | 0.1a |
| — ff | 3.0a | 3.9a | 4.7a | 0.1a |
| — — | 3.1a | 4.2a | 4.8a | 0.2a |
| WEEK 2 |  |  |  |  |
| VAM ff | 7.8a | 19.9a* | 6.8a | 0.2a* |
| VAM — | 8.1a | 11.3b* | 6.3a | 0.2a* |
| — ff | 6.7a | 10.3b* | 6.4a | 0.2a* |
| — — | 6.2a | 6.7c | 7.0a | 0.1b |
| WEEK 3 |  |  |  |  |
| VAM ff | 14.9a* | 26.6a* | 20.6a* | 0.2a |
| VAM — | 14.2ab* | 25.2a* | 18.9a* | 0.2a |
| — ff | 13.5b* | 21.3ab* | 17.7a* | 0.2a |
| — — | 12.9b* | 18.6b* | 16.2a* | 0.1b |
| WEEK 4 |  |  |  |  |
| VAM ff | 29.2a* | 45.0a* | 25.8a | 0.2a |
| VAM — | 26.8a* | 38.9a* | 24.0a | 0.2a |
| — ff | 22.1ab* | 25.1b | 17.1b | 0.2a |
| — — | 20.59b* | 26.1b | 17.9b | 0.1b |

[1]Each value represents the mean of eight determinations duplicated two times. Values within a row and week not followed by a common letter are significantly different (P = 0.05).
[2]Within a row, each weekly mean with an asterisk (*) superscript is significantly different than the mean from previous weekly determination (P = 0.05).

As reflected in Table XXXV, the leaves of foliarly fertilized rough lemon seedlings exhibited increased concentrations of total soluble sugars, reducing sugars and phosphorus after two weeks. However, in contrast to the experience observed with the roots, the leaves of *G. fasiculatum* inoculated rough lemon seedlings contained significantly more starch compared with uninoculated plants following the development of VA mychorrizae (weeks 3 and 4). Foliar fertilization generally increased levels of reducing sugars, total soluble sugars, and starch content in both inoculated and uninoculated seedlings at harvest times of 2, 3, and 4 weeks. As indicated in Table XXXVI, analysis of leaf and root cytokinin content during the mycorrhizal infection period revealed no significant changes in quantity or type of cytokinins until the fourth seedling harvest. Seedlings inoculated with *G. fasiculatum* had significantly greater leaf zeatin, zeatin riboside and conjugated cytokinin concentrations than did uninoculated plants of the fourth harvest. Significant differences in root zeatin and conjugated cytokinins were also detected in those seedlings inoculated with *G. fasiculatum*. No trend was observed in cytokinin concentrations in root or leaf tissue extract as a function of foliar fertilizer treatments. Accordingly, the data presented in Table XXXVI are pooled across foliar fertilizer treatments. Concentrations of all cytokinins were relatively low when compared to 15 week old plants. Moreover, the concentrations of dihydrozeatin and zeatin riboside were much lower than zeatin.

TABLE XXXVI

Cytokinin Concentration in Leaves and Roots of *G. fasiculatum* Inoculated (VAM) and Uninoculated Rough Lemon Seedlings During the Fourth Week of the Infection Process (Experiment I)

|  | VAM | Uninoculated |
|---|---|---|
| Leaf Cytokinin (ng/g) | | |
| Zeatin | 15.0a[1] | 3.5b |
| Zeatin Riboside | 7.1a | 1.8b |
| Dihydrozeatin | 2.4a | 1.0a |
| Conjugated Cytokinins | 22.7a | 6.8b |
| Root Cytokinin (ng/g) | | |
| Zeatin | 8.0a | 1.0b |
| Zeatin Riboside | 2.1a | 1.0a |
| Dihydrozeatin | 1.7a | 1.8a |
| Conjugated Cytokinins | 11.9a | 3.3b |

[1] Each value represents the mean of 16 determinations duplicated two times. Values within a row not followed by a common letter are significantly different ($P = 0.05$).

Although the reducing sugar in the exudate of the roots of foliarly fertilized lemon seedlings was not identified, it may be glucose. If so, the increase in reducing sugars may be due to the hydrolysis of starch which is depleted in cells surrounding and occupied by the fungus.

Citrus seedlings growing in phosphorus deficient soil or in soil void of VA mycorrhizal fungi are typically slow growing, nutrient deficient and have yellow-green leaves that are smaller than normal. Results of the present example demonstrate that these symptoms in rough lemon are corrected by inoculation with *G. fasiculatum* or partially corrected by foliar fertilization with an NPKSMg fertilizer. By providing minimal levels of macronutrients, especially phosphorus, foliar fertilized plants partially mimic the normal growth pattern of citrus inoculated with VA mycorrhizal fungi. Evidence has been developed in the art that photosynthesis and subsequent photosynthate transport are increased by VA mycorrhizal infection. Higher phosphorus and cytokinin concentrations in leaf tissue of mycorrhizal citrus plants may offer an explanation for increased photosynthesis. Nutrient supply and plant growth regulators, particularly cytokinins and phosphorus, are essential in high energy conversions of light, water and carbon into photosynthate, as well as regulation of source-sink relationships between the leaf and root. Similarly, foliar fertilization with nitrogen/phosphorus/potassium solutions results in concomitant increases in leaf photosynthesis and carbohydrate accumulation in roots.

The fact that vesicular-arbuscular mycorrhizal infection did not influence cytokinin concentrations in root and leaf extracts until the fourth week of seedling analysis is consistent with the art-recognized lack of significant differences in growth regulator concentrations between mycorrhizal and non-mycorrhizal plants until after the fungal partner is established in the root cortex. This may also explain the fact that foliar fertilization did not influence cytokinin concentration in the root or leaf extracts during the four week study. These various results may also be accounted for in part by the fact that accumulation of a measurable quantities of cytokinins in citrus leaves following root or fungal synthesis is reported to require a period of up to seven days.

Results obtained in the trials of this example show an association between low phosphorus levels in root and leaf tissue and reduced cytokinin levels of tissue extracts. This is consistent with work previously known to the art showing an apparent correlation between phosphorus deficiency and reduced concentration of cytokinins in birch. Investigations with sunflower (*Helianthus annus L.*) have demonstrated that if roots are removed from shoots or if individual leaves are removed and the shoots and leaves are supplied with deionized water, there is a rapid decline in tissue levels of endogenous cytokinins. However, if inorganic nutrients (e.g. phosphorus and nitrogen) are supplied to detached leaves, the decline in cytokinin levels is arrested. Thus, it appears that mechanisms which supply inorganic phosphorus to leaf and root tissue, such as mycorrhizal symbiosis, may stimulate synthesis of endogenous cytokinins in that tissue.

EXAMPLE 12

Rough lemon seedlings, inoculated with *G. fasiculatum* were grown in book planters (Spencer-LeMaire Ltd., Edmonton, Alberta, Canada) which each contained four 500 cm³ cavities filled with loamy sand. The loamy sand (soil phosphorus 30 ppm) and the conditions of cultivation were the same as described in Example 11.

Four weeks following complete seedling emergence, nine foliar fertilizer treatments, including NPKSMg (control), MPKSMgFe, NPKSMgZn, NPKSMgB, NPKSMgBFe, NPKSMgBZn, NPKSMgZnFe, NPKSMgBFeZn, and a second control NPKSMg (soil phosphorus, 60 ppm) were established. Each of these nutrient solutions contained 1750 ppm nitrogen, 1250 ppm phosphorous, 1250 ppm potassium, and 600 ppm sulfur. Micronutrient concentratrions were 200 ppm for iron, 100 ppm for zinc, 100 ppm for magnesium and 50 ppm for boron. Nitrogen, phosphorus, potassium, sulfur and magnesium were supplied in the form described in Example 11. Zinc and iron were applied in citrate form and boron was supplied as $Na_2B_4O_7 \cdot H_2O$. The foliar fertilizers were applied twice weekly utilizing the techniques described in Example 11. Each foliar fertilizer treatment contained 8 seedlings and was replicated four times in randomized complete blocks.

The plants were harvested after twenty weeks and total dry weight (after holding at 70° C. for 72 hours), leaf area (Lambda Model LI-3000 meter), and stem length were measured. Percentage VA mycorrhizae was determined. Leaf nitrogen, phosphorus, potassium, magnesium, zinc, iron and boron concentrations were also determined. Seedling data was subjected to analysis of variance and the least significant oifference test at the 0.05 confidence level. Results of the trials of this example are set forth in Table XXXVII.

TABLE XXXVII

Growth and Vesicular-Arbuscular (VA) Mycorrhizal Development Of 20-Week-Old Rough Lemon Seedlings Inoculated With *G. fasiculatus* And Foliar Fertilized With Factorial Combinations of B, Zn, and Fe In An NPKS Mg Base Solution (Experiment II). Base Soil Fertility Was 30 ppm Phosphorous.

|  | B | Fe | Zn | BFe | BZn | ZnFe | BFeZn | Control | Control |
|---|---|---|---|---|---|---|---|---|---|
| Stem Length (cm) | 28.6a[3] | 27.1a | 21.7cd | 24.6ab | 20.8d | 21.7cd | 22.5bcd | 27.2a | 25.2ab |
| Leaf Area (cm²) | 348.5a | 291.8ab | 240.3b | 297.2ab | 243.1b | 276.4ab | 250.3b | 351.4a | 302.9ab |
| Total Dry Weight (g) | 4.6abc | 4.2bcd | 4.1cd | 4.0cd | 4.1cd | 4.1cd | 3.5d | 5.0ab | 5.2a |

TABLE XXXVII-continued

Growth and Vesicular-Arbuscular (VA) Mycorrhizal Development Of 20-Week-Old Rough Lemon Seedlings Inoculated With *G. fasiculatus* And Foliar Fertilized With Factorial Combinations of B, Zn, and Fe In An NPKS Mg Base Solution (Experiment II). Base Soil Fertility Was 30 ppm Phosphorous.

|  | B | Fe | Zn | BFe | BZn | ZnFe | BFeZn | Control | Control |
|---|---|---|---|---|---|---|---|---|---|
| VA Mycorrhizae (%) | 88.1a | 88.9a | 72.3ab | 71.4ab | 70.6ab | 69.3ab | 60.1b | 94.0a | 34.0c |
| Chlamydospores | 15.4ab | 16.1ab | 11.0bc | 9.0bc | 13.0ab | 4.0c | 9.6bc | 19.8a | 3.2c |

[1] Seedlings foliar fertilized with NPKS Mg base solution; soil phosphorous initially 30 ppm.
[2] Seedlings foliar fertilized with NPKS Mg base solution; soil phosphorous initially 60 ppm.
[3] Each value represents the mean of 24 seedlings. Values within each row not followed by a common letter are significantly different ($P = 0.05$).

As reflected in Table XXXVII, foliar applications of the NPKSMg solution with combinations of boron and iron significantly increase stem length and leaf area as compared to seedlings receiving foliarly applied zinc. Total seedling dry weight of control seedlings growing in 30 ppm phosphorus soil and foliarly fertilized with NPKSMg solution was also significantly greater than in seedlings foliarly fertilized with zinc. A factorial analysis of variance, testing iron, zinc and boron effects on seedling growth, indicated that foliar applications of boron significantly increased leaf area.

Foliar fertilization and soil phosphorus treatment significantly influence the percentage VA mycorrhizal infection and chlamydospore production. Vesicular-arbuscular ycorrhizal development varied widely among plants growing in 30 ppm phosphorus soil, but few significant differences were observed to result from foliar fertilizer treatment. Seedlings foliarly fertilized with NPKSMg and growing in 30 ppm soil phosphorus had the greatest VA mycorrhizal development, whereas seedlings receiving the same foliar fertilizer solution, but grown in 60 ppm soil phosphorus had significantly less mycorrhizal colonization. Foliar fertilization with a complete combination of NPKSMg plus boron, iron, and zinc significantly depressed VA mycorrhizal development below that of the control seedlings which received NPKSMg only. Chlamydospore production was greatest in the seedlings foliarly fertilized with NPKSMg and growing in 30 ppm phosphorus. A factorial analysis of variance testing zinc, iron and boron effects on percentage VA mycorrhizal infection and chlamydospore production indicated that zinc significantly reduced chlamydospore production.

Foliage nutrient concentrations of *G. fasiculatum* inoculated rough lemon seedlings that were foliarly fertilized with factorial combinations of boron, iron and zinc and an NPKSMg base solution are set forth in Table XXXVIII. Concentrations of nitrogen, phosphorus and potassium in leaves did not differ significantly among foliar fertilization treatments.

TABLE XXXVIII

Foliage Nutrient Concentrations of 20-Week-Old Rough Lemon Seedlings Inoculated with *G. fasiculatus* and Fertilized with Factorial Combinations of B, Zn, and Fe in an NPKS Mg Base Solution (Experiment II)

|  | B | Fe | Zn | BFe | BZn | ZnFe | BFeZn | NPKSMg[1] Control | NPKSMg[2] Control |
|---|---|---|---|---|---|---|---|---|---|
| N % | 2.1a[3] | 2.4a | 2.0a | 2.3a | 1.9a | 2.1a | 2.0a | 2.4a | 2.3a |
| P % | 2.2a | 2.1a | 2.0a | 2.2a | 2.1a | 2.1a | 2.0a | 2.2a | 2.1a |
| K % | 1.3a | 1.4a | 1.2a | 1.2a | 1.2a | 1.4a | 1.3a | 1.5a | 1.4a |
| Mg % | 0.4ab | 0.4ab | 0.4ab | 0.5ab | 0.4ab | 0.4ab | 0.3b | 0.6a | 0.6a |
| B (ppm) | 41a | 28abcd | 22cd | 38ab | 39ab | 18d | 35abc | 26bcd | 25bcd |
| Zn (ppm) | 25b | 27b | 70a | 24b | 61a | 58a | 64a | 23b | 18b |
| Fe (ppm) | 40bcd | 91a | 37cd | 82a | 31d | 63abc | 69ab | 37cd | 31d |

[1] Seedlings foliar fertilized with NPKSMg base solution; soil phosphorous initially 30 ppm.
[2] Seedlings foliar fertilized with NPKS Mg base solution; soil phosphorous initially 60 ppm.
[3] Each value represents the mean of 24 seedlings. Values within each row not followed by a common letter are significantly different ($P = 0.05$).

Cytokinin analysis of root and leaf extracts of rough lemon seedlings inoculated with *G. fasiculatum* and foliarly fertilized with combinations of boron, iron and zinc and an NPKSMg base solution revealed few significant treatment effects. See Table XXXIX. There were no significant differences in root cytokinins among foliar fertilization treatments. Zeatin concentrations were usually significantly greater in leaves of seedlings foliarly fertilized either with a base NPKSMg solution or a base solution plus boron. Similar trends were observed with zeatin riboside concentrations in leaf extracts, and no significant differences in dihydrozeatin concentrations were observed. Conjugated cytokinins were present in greatest concentrations in leaves of NPKSMg fertilized seedlings.

TABLE XXXIX

Cytokinin Concentrations of Leaves of 20-Week-Old Rough Lemon Seedlings Inoculated with *G. fasiculatus* and Foliar Fertilized with Factorial Combinations of B, Zn, and Fe in an NPKSMg Base Solution (Experiment II).

| Leaf Cytokinin (ng/g) | B | Fe | Zn | BFe | BZn | ZnFe | BFeZn | NPKSMg[1] Cotrol | NPKSMg[2] Control |
|---|---|---|---|---|---|---|---|---|---|
| Zeatin | 31.8a[3] | 25.0ab | 19.0b | 28.1ab | 25.0ab | 24.0b | 21.0b | 34.0a | 35.0a |
| Zeatin Riboside | 12.9abc | 17.8a | 3.6bc | 4.8bc | 3.4bc | 1.0c | 6.0abc | 14.0ab | 10.2abc |
| Dihydroxy-zeatin | 4.5a | 2.0a | 1.0a | 11.9a | 6.8a | 1.0a | 1.0a | 6.4a | 12.5a |
| Conjugated | 39.7ab | 30.4b | 24.8b | 34.3b | 29.3b | 26.0b | 69.4a | 45.0ab | |

TABLE XXXIX-continued

Cytokinin Concentrations of Leaves of 20-Week-Old Rough Lemon Seedlings
Inoculated with *G. fasiculatus* and Foliar Fertilized with Factorial Combinations
of B, Zn, and Fe in an NPKSMg Base Solution (Experiment II).

| Leaf Cytokinin (ng/g) | B | Fe | Zn | BFe | BZn | ZnFe | BFeZn | NPKSMg[1] Cotrol | NPKSMg[2] Control |
|---|---|---|---|---|---|---|---|---|---|
| Cytokinins | | | | | | | | | |

[1]Seedlings foliar fertilized with NPKSMg base solution; soil phosphorous initially 30 ppm.
[2]Seedlings foliar fertilized with NPKSMg base solution; soil phosphorous initially 60 ppm.
[3]Each value represents the mean of 24 seedlings. Values within each row not followed by a common letter are significantly different (P = 0.05).

The results of this example demonstrate that growth and mycorrhizal development of rough lemon seedlings inoculated with *G. fasiculatum* are significantly influenced by foliar fertilization treatment. Application by foliar spraying by NPKSMg and NPKSMgB solutions proved superior to other combinations of foliarly applied nutrients in stimulating VA mycorrhizal development and subsequent increases in seedling growth. It is not clear what physiological mechanism increases the mycorrhizal development of plants foliarly fertilized with boron and magnesium. However, there are several factors which may contribute to the stimulation of this relationship. Foliar fertilization with an NPKSMg solution has been shown to significantly increase root exudation of reducing sugars and amino acids which result in subsequent increases in VA mycorrhizal development. Furthermore, a significant increase in reducing sugar and total soluble sugar content of uninoculated roots has been found to occur following fertilization with an NPKSMg solution. The dependence of VA mycorrhizae on a large root flux of carbohydrates is widely recognized. Similarly, root boron concentrations are known to influence soluble carbohydrate translocation to the roots as well as root morphogenesis. Because host photosynthate is rapidly synthesized into lipids and stored in vesicles and inorganic nutrients are stored in arbuscules, the physiological consequences of adequate boron nutrition are increased mycorrhizal activity and subsequent increases in plant growth.

Cytokinin concentrations were observed to be greatest in the leaves of seedlings foliarly fertilized with NPKMg and NPKSMgB solutions. The elevated concentrations of cytokinins in leaves of seedlings from these two treatments were associated with improved growth and VA mycorrhizal development. It has been demonstrated that the superior growth of VA mycorrhizal seedlings is associated with improved phosphorus and micronutrient nutrition, and elevated concentrations of cytokinins and carbohydrates. The precise physiological impact of NPKSMg and NPKSMgB foliar treatments on cytokinin metabolism is unknown. A significant influence of foliar fertilization on VA mycorrhizal development may have had an indirect impact on the metabolism of cytokinins in leaf tissue. Reduction in cytokinin levels in seedlings foliarly fertilized with zinc may be associated with toxic accumulation of zinc in leaf tissue. However, no visual symptoms of leaf toxicity or necrosis were observed, and nutrient analysis of leaf tissue indicated that zinc concentrations were in the normal range for citrus.

EXAMPLE 13

To assess the interaction between mycorrhizae and foliar fertilization with various nutrient solutions, a screening study was conducted on shortleaf pine. Both noninoculated plants and plants inoculated with propagules of *Pisolithus tinctorius* were included in the studies of this example, with foliar fertilization being commenced in the third week of growth. A number of combinations of NPKS and micronutrient solutions were utilized in the foliar spray fertilization of the shortleaf pine seedlings. In all, twelve separate fertilizer treatments were used, with sixteen seedlings per replication per fertilizer and four replications. Of these treatments, eleven involved foliar fertilization while the twelfth involved application of full strength Hoagland solution to the growth medium. In the foliar spray application, the nutrient solution was applied as a fine mist. Compositions of the foliar fertilization solutions as set forth in Table XL.

TABLE XL

Foliar Fertilization Solution for Shortleaf Pine Studies

| Treatment Number | Components | N | P | K | S | Other |
|---|---|---|---|---|---|---|
| 1 | Base | 0.27 | 1.00 | 0.99 | 0.01 | — |
|  | Urea | 1.04 | — | — | — | — |
|  | NH$_4$NO$_3$ | 0.35 | — | — | — | — |
|  | (NH$_4$)$_2$SO$_4$ | 0.34 | — | — | 0.39 | — |
|  | K$_2$SO$_4$ | — | — | 0.51 | 0.21 | — |
|  | Solubor | — | — | — | — | 0.05 B |
|  | Mg(NO$_3$)$_2$—6H$_2$O | 0.35 | — | — | — | 0.3 mg |
|  | Total | 2.35 | 1.00 | 1.50 | 0.61 | 0.05 B 0.3 mg |
| 2 | Base | 0.27 | 1.00 | 0.99 | 00.1 | — |
|  | Urea | 0.695 | — | — | — | — |
|  | NH$_4$NO$_3$ | 0.695 | — | — | — | — |
|  | (NH$_4$)$_2$SO$_4$ | 0.34 | — | — | 0.39 | — |
|  | K$_2$SO$_4$ | — | — | 0.51 | 0.21 | — |
|  | Solubor | — | — | — | — | 0.05 B |
|  | Mg(NO$_3$)$_2$—6H$_2$O | 90.35 | — | — | 0.3 mg | |
|  | Total | 2.35 | 1.00 | 1.50 | 0.61 | 0.05 B 0.3 mg |
| 3 | Base | 0.27 | 1.00 | 0.99 | 0.01 | — |
|  | Urea | 0.35 | — | — | — | — |
|  | NH$_4$NO$_3$ | 1.04 | — | — | — | — |
|  | (NH$_4$)$_2$SO$_4$ | 0.34 | — | — | 0.39 | — |
|  | K$_2$SO$_4$ | — | — | 0.51 | 0.21 | — |
|  | Solubor | — | — | — | — | 0.05 B |
|  | Mg(NO$_3$)$_2$—6H$_2$O | 0.35 | — | — | 0.3 mg | |
|  | Total | 2.35 | 1.00 | 1.50 | 0.61 | 0.05 B |
| 4 | Base | 0.27 | 1.00 | 0.99 | 0.01 | — |
|  | Urea | 1.42 | — | — | — | — |
|  | (NH$_4$)$_2$SO$_4$ | 0.31 | — | — | 0.36 | — |
|  | K$_2$SO$_4$ | — | — | 0.51 | 0.21 | — |
|  | Solubor | — | — | — | — | 0.05 B |
|  | Total | 2.00 | 1.00 | 1.50 | 0.58 | 0.05 B |
| 5 | Base | 0.27 | 1.00 | 0.99 | 0.01 | — |
|  | Urea | 1.42 | — | — | — | — |
|  | (NH$_4$)$_2$SO$_4$ | 0.31 | — | — | 0.36 | — |
|  | K$_2$SO$_4$ | — | — | 0.51 | 0.21 | — |
|  | Solubor | — | — | — | — | 0.05 B | plants, percent ectomycorrhizae. Results of these measurements are set forth in Table XLI.

TABLE XLI

Growth and Ectomycorrhizal Development of Mycorrhizal and Nonmycorrhizal Shortleaf Pine Seedlings Foliar Fertilized with NPKS Base Solution in Combination with Selected Micronutrients

| | FERTILIZER TREATMENTS | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 5% LSD |
| | Inoculated | | | | | | | | | | | | |
| Stem length (cm) | 9.0 | 9.9 | 9.3 | 7.7 | 7.8 | 8.9 | 5.8 | 8.5 | 6.9 | 8.0 | 9.3 | 7.1 | 0.8 |
| Root Collar Diameter (mm) | 3.05 | 3.15 | 2.97 | 2.88 | 3.09 | 2.95 | 2.16 | 2.93 | 3.19 | 2.74 | 3.47 | 2.68 | 0.30 |
| Total Dry Weight (g) | 1.03 | 1.47 | 1.34 | 1.32 | 1.36 | 1.28 | 0.66 | 1.33 | 1.56 | 1.99 | 1.76 | 1.10 | 0.26 |
| Percent Infection Ectomycorrhizae | 85 | 87 | 90 | 92 | 78 | 48 | 31 | 58 | 58 | 60 | 86 | 67 | 8.0 |
| | Noninoculated | | | | | | | | | | | | |
| Stem length (cm) | 8.6 | 8.4 | 8.6 | 7.6 | 7.3 | 8.2 | 5.8 | 5.8 | 6.2 | 7.71 | 7.9 | 6.6 | 0.7 |
| Root Collar Diameter (mm) | 1.95 | 2.53 | 2.67 | 2.51 | 3.12 | 3.28 | 2.10 | 2.60 | 2.31 | 2.20 | 2.97 | 2.40 | 0.31 |
| Total Dry Weight (g) | 0.94 | 0.95 | 1.00 | 0.98 | 1.27 | 1.28 | 0.58 | 1.15 | 0.77 | 0.89 | 1.24 | 1.11 | 0.28 |
| Total Dry Weight Pooled (g) | 0.99 | 1.21 | 1.17 | 1.15 | 1.32 | 1.28 | 0.62 | 1.24 | 1.17 | 0.94 | 1.50 | 1.10 | 0.39 |

Foliar Fertilization Solution for Shortleaf Pine Studies

| Treatment Number | Components | N | P | K | S | Other |
|---|---|---|---|---|---|---|
| | Total | 2.00 | 1.00 | 1.50 | 0.58 | 0.05 B |
| 6 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | Mn Citrate | 0.15 | — | — | — | 0.1 Mn |
| | Total | 2.15 | 1.00 | 1.50 | 0.58 | 0.1 Mn |
| 7 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | Cu Citrate | 0.09 | — | — | — | 0.1 Cu |
| | Total | 2.09 | 1.00 | 1.50 | 0.58 | 0.1 Cu |
| 8 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | $(NH_4)_2Mo_7O_{24}\cdot 4H_2O$ | 0.03 | — | — | — | 0.2 Mo |
| | Total | 2.03 | 1.00 | 1.50 | 0.58 | 0.2 Mo |
| 9 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | $Zn(NO_3)_2\cdot 6H_2O$ | 0.15 | — | — | — | 0.35 Zn |
| | Total | 2.15 | 1.00 | 1.50 | 0.58 | 0.35 Zn |
| 10 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | Zn Citrate | 0.24 | — | — | — | 0.35 Zn |
| | Total | 2.24 | 1.00 | 1.50 | 0.58 | 0.35 Zn |
| 11 | Base | 0.27 | 1.00 | 0.99 | 0.01 | — |
| | Urea | 1.42 | — | — | — | — |
| | $(NH_4)_2SO_4$ | 0.31 | — | — | 0.36 | — |
| | $K_2SO_4$ | — | — | 0.51 | 0.21 | — |
| | $MgNa_2$ EDTA | 0.35 | — | — | — | 0.35 Mg |
| | Total | 2.35 | 1.00 | 1.50 | 0.58 | 0.35 Mg |

The study of this example was completed after 20 weeks of growth. Each of the seedlings grown in the study was measured for stem length, root collar diameter, total dry weight and, in the case of inoculated From the data in Table XLI, it may be seen that inoculation of shortleaf pine with *Pisolithus tinctorius* generally produced taller, heavier seedlings in all foliar fertilization treatments with the exception of copper (treatment 7). However, nonmycorrhizal plants did not show a consistently strong growth response to foliar fertilization.

Among the *P. t.* inoculated plants, foliar fertilization treatments which contained magnesium, i.e., treatments 1, 2, 3 and 11, stimulated a consistent growth response and abundant mycorrhizal development. Fertilization treatments 2 and 11 stimulated attainment of the largest values of stem length, root collar diameter and total dry weight among the inoculated plants. Mycorrhizal infection was greatest in treatment 4 (NPKSB) and significantly greater generally in fertilizer treatments containing magnesium and boron.

EXAMPLE 14

Rough lemon seedlings (*Citrus limon L.*) were grown in loamy sand soil. All procedures, techniques, soil analyses, and growth conditions were identical to those described in Example 5, except where stated otherwise hereinbelow.

The seedlings were inoculated with *G. etunicatum* and soil phosphorus levels were initially brought to 30 ppm. *G. etunicatum* was utilized as the inoculum in lieu of *G. fasiculatum* in order to determine if species differences exist in fungal species' response to foliar fertilization. The seedlings were foliarly fertilized as described in Example 5, using complete factorial combinations of magnesium, boron, and molybdenum in an NPKS base solution, with or without zinc and iron. These foliar fertilization combinations were selected on the basis of a preliminary screening of foliar fertilizer solution combinations. Composition of the nutrient solution was 1750, 1250, 1250, 600, 300, 200, 100, and 150 ppm for nitrogen, phosphorus, potassium, sulfur, magnesium, iron, zinc, molybdenum, and boron, respectively. The forms of NPKSMgB were identical to those described in Example 5. Molybdenum was applied in the form of $(NH_4)_6Mo_7O_{24}\cdot 4H_2O$, iron as a ferric citrate, and zinc as zinc citrate. Each foliar fertilization treatment contained six seedlings replicated four times in randomized complete blocks. Plants were harvested after 25 weeks, and physical and chemical measurements were completed as described in Example 5. Seedling growth data were subjected to analyses of variance and orthogonal contrasts at the 0.05 confidence level.

Orthogonal contrasts testing the effects of zinc and iron addition to the NPKS base solution indicated that the addition of these micronutrients did not significantly influence any seedling growth variable when compared to seedlings foliarly fertilized with an NPKS base solution (see Tables XLII, XLIII, and XLIV). However, within the treatments involving each of the three base solutions, foliar fertilization with combinations of boron, magnesium, and molybdenum influenced seedling growth and mycorrhizal development.

Within the group of treatments involving NPKS base solution, the incorporation of boron or magnesium singly, but not in combination, stimulated increases in stem length, leaf area, and total dry weight. See Table XLII. Seedlings foliarly fertilized with NPKSB solution yielded a 42% increase in total dry weight as compared to control seedlings which received only the NPKS base solution. In contrast, addition of magnesium singly, or in combination with boron, also significantly increased VA mycorrhizal development and chlamydospore production. In general, the addition of molybdenum, singly or in combination with boron and magnesium, depressed seedling growth and VA mycorrhizal development.

Trends of seedling growth and VA mycorrhizal development in response to NPKSFe base solutions containing combinations of magnesium, boron, and molybdenum, were similar to those observed with the NPKS solution. See Table XLIII. The incorporation of boron and/or molybdenum in NPKSFe solution generally depressed seedling growth and VA mycorrhizal development. The fertilizer combination of NPKSFeMg gave the best seedling growth response when compared to the other combinations containing boron and molybdenum. However, growth of seedlings foliarly fertilized with the NPKSFeMg solution was not significantly different from that observed in control seedlings. The addition of magnesium to the NPKSFe solution significantly increased VA mycorrhizal development when compared to all other combinations of micronutrients with that base solution.

Few significant differences in seedling growth and VA mycorrhizal development were observed with the addition of magnesium, boron, and molybdenum to the NPKSZn solution. See Table XLIV. In general, control seedlings receiving foliar applications of NPKSZn and seedlings receiving NPKSZnMg exhibited the best growth and VA mycorrhizal development.

Foliage nutrient content was similar for seedlings foliarly fertilized with factorial combinations of magnesium, boron, and molybdenum in the NPKS and the NPKSFe solution. See Table XLV. Few significant differences in the foliage nitrogen, phosphorus, and potassium content were observed among the various fertilization treatments. However, foliar fertilization with the NPKSFe solution significantly increased the foliage iron concentration as compared to fertilization with the NPKS base solution. Foliar fertilization with magnesium, boron, or molybdenum, mixed with the NPKS or NPKSFe base solution, significantly increased foliage nutrient content of those same elements. With the exception of zinc, the foliage nutrient content of seedlings foliarly fertilized with the NPKSZn solution followed the same general patterns found for seedlings fertilized with the NPKSFe solution. Foliar fertilization with the NPKSZn solution significantly increased the zinc content of seedlings in all treatment combinations.

TABLE XLII

Growth and VA Mycorrhizal Development of Rough Lemon Seedlings Inoculated with *G. etunicatum* and Foliar Fertilized with Factorial Combinations of Mg, B, and Mo in NPKS Base Solution (Experiment II)

| SEEDLING CHARACTERISTIC | FOLIAR FERTILIZER TREATMENT | | | | | | | Control (NPKS) |
|---|---|---|---|---|---|---|---|---|
| | Mg | B | Mo | Mg,B | Mg,Mo | Mo,B | Mo,B,Mg | |
| Stem Length (cm) | 15.9a[1] | 14.2abc | 13.8bcd | 13.6cd | 13.6cd | 12.5cd | 11.8d | 15.7ab |
| Leaf Area (cm$^2$) | 168.0a | 166.0a | 169.0a | 119.3bc | 144.3ab | 107.5bc | 99.5c | 191.4a |
| Total Dry Weight (g) | 3.5b | 5.1a | 3.1b | 3.1b | 3.2b | 2.8bc | 1.6c | 3.6b |
| VA Mycorrhizae (%) | 89.2a | 77.3d | 60.6e | 88.3ab | 78.9cd | 63.3e | 86.4ab | 83.6bc |
| Chlamydospores/100 g soil | 13.2a | 14.6a | 12.9a | 14.1a | 13.0a | 7.9a | 13.8a | 13.1a |

[1]Each value is the mean of 24 seedlings. Values within each row not followed by a common letter are significantly different (P = 0.05).

TABLE XLIII

Growth and VA Mycorrhizal Development of Rough Lemon Seedlings Inoculated with *G. etunicatum* and Foliar Fertilized with Factorial Combinations of Mg, B, and Mo in NPKSFe Base Solution (Experiment II)

| SEEDLING CHARACTERISTIC | FOLIAR FERTILIZER TREATMENT | | | | | | | Control (NPKSFe) |
|---|---|---|---|---|---|---|---|---|
| | Mg | B | Mo | Mg,B | Mg,Mo | Mo,B | Mo,B,Mg | |
| Stem Length (cm) | 14.6a[1] | 11.3b | 12.2ab | 10.6b | 11.9b | 11.5b | 11.2b | 14.6a |
| Leaf Area (cm$^2$) | 167.3a | 103.5c | 117.3bc | 105.4c | 110.2bc | 110.2bc | 115.1bc | 143.9a |
| Total Dry Weight (g) | 3.3ab | 2.0b | 2.7ab | 2.1b | 2.5ab | 2.9b | 1.9b | 3.6a |
| VA Mycorrhizae (%) | 81.3a | 69.3b | 69.8b | 70.4b | 65.7b | 64.5bc | 65.4bc | 66.9bc |
| Chlamydospores/100 g soil | 14.6a | 15.4a | 13.7a | 14.0a | 13.4a | 13.1a | 8.6b | 13.0a |

[1]Each value is the mean of 24 seedlings. Values within each row not followed by a common letter are significantly different (P = 0.05).

TABLE XLIV

Growth and VA Mycorrhizal Development of Rough Lemon Seedlings
Inoculated with *G. etunicatum* and Foliar Fertilized with Factorial
Combinations of Mg, B, and Mo in NPKSZn Base Solution (Experiment II)

| SEEDLING CHARACTERISTIC | FOLIAR FERTILIZER TREATMENT | | | | | | | |
|---|---|---|---|---|---|---|---|---|
| | Mg | B | Mo | Mg,B | Mg,Mo | Mo,B | Mo,B,Mg | Control (NPKSZn) |
| Stem Length (cm) | 11.3a[1] | 11.2a | 12.9a | 11.5a | 13.8a | 13.2a | 12.1a | 13.1a |
| Leaf Area (cm²) | 118.1a | 113.1a | 137.9a | 118.2a | 147.3a | 146.5a | 128.0a | 124.0a |
| Total Dry Weight (g) | 2.5a | 2.6a | 2.7a | 2.1a | 2.6a | 2.6a | 2.0a | 2.5a |
| VA Mycorrhizae (%) | 79.1a | 84.0a | 63.6bc | 63.6bc | 62.1c | 72.1ab | 60.1c | 71.3ab |
| Chlamydospores/100 g soil | 10.4a | 8.6a | 8.7a | 9.8a | 9.9a | 10.1a | 6.4a | 11.0a |

[1]Each value is the mean of 24 seedlings. Values within each row not followed by a common letter are significantly different (P = 0.05).

TABLE XLV

Foliage Nutrient Content of Rough Lemon Seedlings
Inoculated with *G. etunicatum* and Foliar Fertilized with Factorial
Combinations of Mg, B, and Mo in NPKS and NPKSFe Base Solution (Experiment II)

| NUTRIENT | Fe | FOLIAR FERTILIZER TREATMENT | | | | | | | |
|---|---|---|---|---|---|---|---|---|---|
| | | Mg | B | Mo | Mg,B | Mg,Mo | Mo,B | Mo,B,Mg | Control |
| N (%) | + | 2.9a[1] | 2.1a | 3.0a | 2.7a | 2.8a | 2.8a | 2.0a | 2.4a |
| | − | 2.6a | 2.0a | 2.4a | 2.6a | 2.8a | 2.6a | 2.0a | 2.3a |
| P (%) | + | 0.17a | 0.16a | 0.17a | 0.16a | 0.19a | 0.18a | 0.15a | 0.16a |
| | − | 0.16a | 0.17a | 0.15a | 0.15a | 0.17a | 0.17a | 0.15a | 0.17a |
| K (%) | + | 0.99a | 1.04a | 1.01a | 1.07a | 0.99a | 1.04a | 1.15a | 1.10a |
| | − | 1.00a | 1.01a | 1.18a | 0.96a | 0.98a | 1.13a | 1.12a | 1.12a |
| Mg (%) | + | 0.51a | 0.17b | 0.19b | 0.45a | 0.41a | 0.16b | 0.43a | 0.20b |
| | − | 0.57a | 0.18b | 0.17b | 0.58a | 0.56a | 0.14b | 0.45a | 0.19b |
| B (ppm) | + | 34.7ab | 59.3a | 33.1b | 56.9ab | 37.8ab | 59.1a | 55.1a | 29.4b |
| | − | 31.0b | 57.3a | 35.0b | 48.5ab | 37.2b | 61.0a | 57.3a | 31.6b |
| Zn (ppm) | + | 22.9a | 20.4a | 15.7a | 19.6a | 21.1a | 16.3a | 14.5a | 18.7a |
| | − | 14.3a | 19.1a | 15.8a | 17.9a | 16.9a | 17.1a | 13.8a | 20.9a |
| Fe (ppm) | + | 89.6a | 77.7a | 92.3a | 88.4a | 84.7a | 91.3a | 78.2a | 18.0b |
| | − | 30.1a | 32.5a | 44.1a | 29.2a | 38.7a | 34.6a | 20.1a | 20.7a |
| Mo (ppm) | + | 41.2b | 39.7b | 66.9a | 60.7ab | 55.7ab | 71.3a | 70.3a | 39.0b |
| | − | 40.6ab | 32.1b | 57.ab | 54.9ab | 68.0a | 56.4ab | 62.1ab | 44.6ab |

[1]Each value is the mean of 24 seedlings. Values within each row not followed by a common letter are significantly different (P = 0.05).

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A nutrient composition adapted for foliar fertilization of a plant to enhance the development of mycorrhizae in the root system thereof, said composition having a pH of between about 5.5 and about 6.5 and comprising at least about 0.01 parts by weight magnesium in the form of elemental magnesium, magnesium sulfate or chelated magnesium ions, at least about 0.01 parts by weight boron in the form of borax, another alkali metal borate or an alkali metal boride, between about 0.04 and about 1.75 parts by weight nitrogen in the form of urea, an ammonium sulfate, an ammonium phosphate or ammonium nitrate, between about 0.01 and about 1.4 parts by weight phosphorus in the form of a potassium phosphate or an ammonium phosphate, between about 0.02 and about 2.8 parts by weight potassium in the form of a potassium phosphate or an ammonium phosphate, at least about 0.01 parts by weight sulfur in the form of an ammonium sulfate, potassium sulfate, or elemental sulfur, and up to about 1000 parts by weight water.

2. A nutrient composition as set forth in claim 1 comprising not more than about 1 part by weight magnesium, not more than about 1 part by weight boron, and not more than about 0.6 part by weight sulfur.

3. A nutrient composition as set forth in claim 1 comprising between about 0.05 and about 5 parts by weight of a source of boron selected from the group consisting of borax, other alkali metal borates, and alkali metal borides, between about 0.1 and about 7 parts by weight of a source of nitrogen selected from the group consisting of urea, ammonium nitrate, and ammonium phosphates, between about 0.05 and about 7 parts by weight of a source of potassium selected from the group consisting of potassium phosphates, and between about 0.05 and about 3 parts by weight of ammonium sulfate.

* * * * *